US009915545B2

(12) United States Patent
Chen et al.

(10) Patent No.: US 9,915,545 B2
(45) Date of Patent: Mar. 13, 2018

(54) SMART NECKLACE WITH STEREO VISION AND ONBOARD PROCESSING

(71) Applicant: Toyota Motor Engineering & Manufacturing North America, Inc., Erlanger, KY (US)

(72) Inventors: Tiffany L. Chen, Santa Clara, CA (US); Joseph M.A. Djugash, San Jose, CA (US); Kenichi Yamamoto, San Jose, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 14/562,478

(22) Filed: Dec. 5, 2014

(65) Prior Publication Data
US 2015/0198455 A1 Jul. 16, 2015

Related U.S. Application Data

(63) Continuation-in-part of application No. 14/480,575, filed on Sep. 8, 2014, which is a continuation-in-part of application No. 14/154,714, filed on Jan. 14, 2014.

(51) Int. Cl.
*G01C 21/36* (2006.01)
*G06F 3/01* (2006.01)
(Continued)

(52) U.S. Cl.
CPC ......... *G01C 21/3629* (2013.01); *A61H 3/061* (2013.01); *G01C 21/206* (2013.01);
(Continued)

(58) Field of Classification Search
CPC ............ G01C 21/3617; G01C 21/3623; G01C 21/3629; G01C 21/3652; G06F 3/011;
(Continued)

(56) References Cited

U.S. PATENT DOCUMENTS

| 4,520,501 A | 5/1985 | DuBrucq |
| 4,586,827 A | 5/1986 | Hirsch et al. |

(Continued)

FOREIGN PATENT DOCUMENTS

| CN | 201260746 | 6/2009 |
| CN | 101527093 | 9/2009 |

(Continued)

OTHER PUBLICATIONS

Hesch et al.; "Design and Analysis of a Portable Indoor Localization Aid for the Visually Impaired"; *International Journal of Robotics Research*; vol. 29; Issue 11; pp. 1400-1415; Sep. 2010.

(Continued)

*Primary Examiner* — Jerrah Edwards
*Assistant Examiner* — Donald J Wallace
(74) *Attorney, Agent, or Firm* — Snell & Wilmer LLP

(57) ABSTRACT

A method for providing directions to a blind user of a smart device is described. The method includes detecting, by at least two sensors and in response to a selection of a find mode of the smart device, image data corresponding to a surrounding environment of the smart device and positioning data corresponding to a positioning of the smart device. The method also includes receiving, by an input device, the desired object or the desired location. The method also includes determining, by a processor, the initial location of the smart device based on the image data, the positioning data and map data stored in a memory of the smart device. The method also includes providing, by the output device, the directions to the desired object based on the initial location of the smart device and the map data.

17 Claims, 24 Drawing Sheets

(51) Int. Cl.
  *G01C 21/20* (2006.01)
  *A61H 3/06* (2006.01)
  *H04N 13/02* (2006.01)

(52) U.S. Cl.
  CPC ..... *G01C 21/3617* (2013.01); *G01C 21/3623* (2013.01); *G01C 21/3652* (2013.01); *G06F 3/016* (2013.01); *A61H 2003/063* (2013.01); *A61H 2201/165* (2013.01); *A61H 2201/1609* (2013.01); *A61H 2201/501* (2013.01); *A61H 2201/5007* (2013.01); *A61H 2201/5043* (2013.01); *A61H 2201/5048* (2013.01); *A61H 2201/5058* (2013.01); *A61H 2201/5064* (2013.01); *A61H 2201/5071* (2013.01); *A61H 2201/5082* (2013.01); *A61H 2201/5084* (2013.01); *A61H 2201/5089* (2013.01); *A61H 2201/5092* (2013.01); *A61H 2201/5097* (2013.01); *H04N 13/025* (2013.01); *H04N 13/0239* (2013.01)

(58) Field of Classification Search
  CPC ..... G06F 3/016; G06F 3/167; H04N 13/0239; H04N 13/025; A61H 3/06; A61H 3/061; A61H 3/063
  See application file for complete search history.

(56) References Cited

U.S. PATENT DOCUMENTS

| | | | |
|---|---|---|---|
| 4,786,966 A | 11/1988 | Hanson | |
| 5,047,952 A | 9/1991 | Kramer | |
| 5,097,856 A | 3/1992 | Chi-Sheng | |
| 5,129,716 A | 7/1992 | Holakovszky et al. | |
| 5,233,520 A * | 8/1993 | Kretsch | G01G 19/4146 128/921 |
| 5,265,272 A | 11/1993 | Kurcbart | |
| 5,463,428 A | 10/1995 | Lipton et al. | |
| 5,508,699 A | 4/1996 | Silverman | |
| 5,539,665 A | 7/1996 | Lamming et al. | |
| 5,543,802 A * | 8/1996 | Villevieille | G01C 21/20 342/357.51 |
| 5,544,050 A | 8/1996 | Abe | |
| 5,568,127 A | 10/1996 | Bang | |
| 5,636,038 A | 6/1997 | Lynt | |
| 5,659,764 A | 8/1997 | Sakiyama | |
| 5,701,356 A | 12/1997 | Stanford et al. | |
| 5,733,127 A | 3/1998 | Mecum | |
| 5,807,111 A * | 9/1998 | Schrader | A61F 9/08 367/116 |
| 5,872,744 A | 2/1999 | Taylor | |
| 5,953,693 A | 9/1999 | Sakiyama | |
| 5,956,630 A | 9/1999 | Mackey | |
| 5,982,286 A | 11/1999 | Vanmoor | |
| 6,009,577 A | 1/2000 | Day | |
| 6,055,048 A | 4/2000 | Langevin et al. | |
| 6,067,112 A | 5/2000 | Wellner et al. | |
| 6,199,010 B1 * | 3/2001 | Richton | G01C 21/26 340/7.29 |
| 6,229,901 B1 | 5/2001 | Mickelson et al. | |
| 6,230,135 B1 | 5/2001 | Ramsay | |
| 6,230,349 B1 | 5/2001 | Silver et al. | |
| 6,285,757 B1 | 9/2001 | Carroll et al. | |
| 6,307,526 B1 | 10/2001 | Mann | |
| 6,323,807 B1 | 11/2001 | Golding et al. | |
| 6,349,001 B1 | 2/2002 | Spitzer | |
| 6,466,232 B1 * | 10/2002 | Newell | G06F 1/163 345/3.1 |
| 6,477,239 B1 | 11/2002 | Ohki | |
| 6,542,623 B1 | 4/2003 | Kahn | |
| 6,580,999 B2 | 6/2003 | Maruyama et al. | |
| 6,594,370 B1 * | 7/2003 | Anderson | H01Q 1/273 381/315 |
| 6,603,863 B1 | 8/2003 | Nagayoshi | |
| 6,619,836 B1 | 9/2003 | Silvant et al. | |
| 6,701,296 B1 | 3/2004 | Kramer | |
| 6,774,788 B1 | 8/2004 | Balfe | |
| 6,825,875 B1 | 11/2004 | Strub et al. | |
| 6,826,477 B2 | 11/2004 | Ladetto et al. | |
| 6,834,373 B2 | 12/2004 | Dieberger | |
| 6,839,667 B2 | 1/2005 | Reich | |
| 6,857,775 B1 | 2/2005 | Wilson | |
| 6,920,229 B2 | 7/2005 | Boesen | |
| D513,997 S | 1/2006 | Wilson | |
| 7,027,874 B1 | 4/2006 | Sawan et al. | |
| D522,300 S | 6/2006 | Roberts | |
| 7,069,215 B1 | 6/2006 | Bangalore | |
| 7,106,220 B2 | 9/2006 | Gourgey et al. | |
| 7,228,275 B1 | 6/2007 | Endo | |
| 7,299,034 B2 | 11/2007 | Kates | |
| 7,308,314 B2 | 12/2007 | Havey et al. | |
| 7,336,226 B2 | 2/2008 | Jung et al. | |
| 7,356,473 B2 | 4/2008 | Kates | |
| 7,413,554 B2 | 8/2008 | Kobayashi et al. | |
| 7,417,592 B1 | 8/2008 | Hsiao et al. | |
| 7,428,429 B2 | 9/2008 | Gantz et al. | |
| 7,463,188 B1 | 12/2008 | McBurney | |
| 7,496,445 B2 * | 2/2009 | Mohsini | G01C 21/20 340/944 |
| 7,501,958 B2 | 3/2009 | Saltzstein et al. | |
| 7,525,568 B2 * | 4/2009 | Raghunath | H04N 5/782 340/539.21 |
| 7,564,469 B2 | 7/2009 | Cohen | |
| 7,565,295 B1 | 7/2009 | Hernandez-Rebollar | |
| 7,598,976 B2 | 10/2009 | Sofer et al. | |
| 7,618,260 B2 | 11/2009 | Daniel et al. | |
| D609,818 S | 2/2010 | Tsang et al. | |
| 7,656,290 B2 * | 2/2010 | Fein | A61H 3/061 235/375 |
| 7,659,915 B2 | 2/2010 | Kurzweil et al. | |
| 7,743,996 B2 | 6/2010 | Maciver | |
| D625,427 S | 10/2010 | Lee | |
| 7,843,351 B2 * | 11/2010 | Bourne | A61B 5/1116 340/573.1 |
| 7,843,488 B2 | 11/2010 | Stapleton | |
| 7,848,512 B2 | 12/2010 | Eldracher | |
| 7,864,991 B2 | 1/2011 | Espenlaub et al. | |
| 7,938,756 B2 | 5/2011 | Rodetsky et al. | |
| 7,991,576 B2 | 8/2011 | Roumeliotis | |
| 8,005,263 B2 | 8/2011 | Fujimura | |
| 8,035,519 B2 | 10/2011 | Davis | |
| D649,655 S | 11/2011 | Petersen | |
| 8,123,660 B2 | 2/2012 | Kruse et al. | |
| D656,480 S | 3/2012 | McManigal et al. | |
| 8,138,907 B2 | 3/2012 | Barbeau et al. | |
| 8,150,107 B2 | 4/2012 | Kurzweil et al. | |
| 8,177,705 B2 | 5/2012 | Abolfathi | |
| 8,239,032 B2 | 8/2012 | Dewhurst | |
| 8,253,760 B2 | 8/2012 | Sako et al. | |
| 8,300,862 B2 | 10/2012 | Newton et al. | |
| 8,325,263 B2 | 12/2012 | Kato et al. | |
| D674,501 S | 1/2013 | Petersen | |
| 8,359,122 B2 | 1/2013 | Koselka et al. | |
| 8,395,968 B2 | 3/2013 | Vartanian et al. | |
| 8,401,785 B2 | 3/2013 | Cho et al. | |
| 8,414,246 B2 | 4/2013 | Tobey | |
| 8,418,705 B2 | 4/2013 | Ota et al. | |
| 8,428,643 B2 | 4/2013 | Lin | |
| 8,483,956 B2 | 7/2013 | Zhang | |
| 8,494,507 B1 | 7/2013 | Tedesco et al. | |
| 8,494,859 B2 | 7/2013 | Said | |
| 8,538,687 B2 | 9/2013 | Plocher et al. | |
| 8,538,688 B2 | 9/2013 | Prehofer | |
| 8,571,860 B2 | 10/2013 | Strope | |
| 8,583,282 B2 | 11/2013 | Angle et al. | |
| 8,588,464 B2 | 11/2013 | Albertson et al. | |
| 8,588,972 B2 | 11/2013 | Fung | |
| 8,591,412 B2 * | 11/2013 | Kovarik | A61B 5/1114 340/573.1 |
| 8,594,935 B2 | 11/2013 | Cioffi et al. | |
| 8,606,316 B2 | 12/2013 | Evanitsky | |
| 8,610,879 B2 | 12/2013 | Ben-Moshe et al. | |
| 8,630,633 B1 | 1/2014 | Tedesco et al. | |

(56) References Cited

U.S. PATENT DOCUMENTS

| | | | |
|---|---|---|---|
| 8,676,274 B2 | 3/2014 | Li | |
| 8,676,623 B2 | 3/2014 | Gale et al. | |
| 8,694,251 B2 | 4/2014 | Janardhanan et al. | |
| 8,704,902 B2 | 4/2014 | Naick et al. | |
| 8,718,672 B2* | 5/2014 | Xie | G01C 22/00 455/404.1 |
| 8,743,145 B1 | 6/2014 | Price | |
| 8,750,898 B2 | 6/2014 | Haney | |
| 8,768,071 B2 | 7/2014 | Tsuchinaga et al. | |
| 8,786,680 B2 | 7/2014 | Shiratori | |
| 8,797,141 B2 | 8/2014 | Best et al. | |
| 8,797,386 B2 | 8/2014 | Chou et al. | |
| 8,803,699 B2 | 8/2014 | Foshee et al. | |
| 8,805,929 B2* | 8/2014 | Erol | G06F 17/30884 709/204 |
| 8,812,244 B2* | 8/2014 | Angelides | A61B 5/0002 702/19 |
| 8,814,019 B2 | 8/2014 | Dyster et al. | |
| 8,825,398 B2 | 9/2014 | Alexandre | |
| 8,836,532 B2 | 9/2014 | Fish, Jr. et al. | |
| 8,836,580 B2 | 9/2014 | Mendelson | |
| 8,836,910 B2 | 9/2014 | Cashin et al. | |
| 8,902,303 B2 | 12/2014 | Na'Aman et al. | |
| 8,909,534 B1 | 12/2014 | Heath | |
| D721,673 S | 1/2015 | Park et al. | |
| 8,926,330 B2 | 1/2015 | Taghavi | |
| 8,930,458 B2 | 1/2015 | Lewis | |
| 8,981,682 B2 | 3/2015 | Delson et al. | |
| 8,994,498 B2 | 3/2015 | Agrafioti | |
| D727,194 S | 4/2015 | Wilson | |
| 9,004,330 B2 | 4/2015 | White | |
| 9,025,016 B2 | 5/2015 | Wexler et al. | |
| 9,042,596 B2* | 5/2015 | Connor | G06K 9/00771 348/158 |
| 9,053,094 B2 | 6/2015 | Yassa | |
| 9,076,450 B1 | 7/2015 | Sadek | |
| 9,081,079 B2 | 7/2015 | Chao et al. | |
| 9,081,385 B1* | 7/2015 | Ferguson | G06K 9/00798 |
| D736,741 S | 8/2015 | Katz | |
| 9,104,806 B2* | 8/2015 | Shann | G06F 11/3664 |
| 9,111,545 B2 | 8/2015 | Jadhav et al. | |
| D738,238 S | 9/2015 | Pede et al. | |
| 9,137,484 B2 | 9/2015 | DiFrancesco et al. | |
| 9,137,639 B2 | 9/2015 | Garin et al. | |
| 9,140,554 B2* | 9/2015 | Jerauld | G02B 27/017 |
| 9,148,191 B2 | 9/2015 | Teng et al. | |
| 9,158,378 B2 | 10/2015 | Hirukawa | |
| D742,535 S | 11/2015 | Wu | |
| D743,933 S | 11/2015 | Park et al. | |
| 9,185,489 B2* | 11/2015 | Gerber | A61B 5/0031 |
| 9,190,058 B2 | 11/2015 | Klein | |
| 9,230,430 B2 | 1/2016 | Civelli et al. | |
| 9,232,366 B1 | 1/2016 | Charlier et al. | |
| 9,267,801 B2 | 2/2016 | Gupta et al. | |
| 9,269,015 B2* | 2/2016 | Boncyk | G06F 17/30259 |
| 9,275,376 B2* | 3/2016 | Barraclough | G06Q 10/109 |
| 9,304,588 B2 | 4/2016 | Aldossary | |
| D756,958 S | 5/2016 | Lee et al. | |
| D756,959 S | 5/2016 | Lee et al. | |
| 9,335,175 B2 | 5/2016 | Zhang et al. | |
| 9,341,014 B2 | 5/2016 | Oshima et al. | |
| 9,355,547 B2 | 5/2016 | Stevens et al. | |
| 2001/0023387 A1 | 9/2001 | Rollo | |
| 2002/0067282 A1 | 6/2002 | Moskowitz et al. | |
| 2002/0071277 A1 | 6/2002 | Starner et al. | |
| 2002/0075323 A1* | 6/2002 | O'Dell | G01C 21/3647 715/835 |
| 2002/0173346 A1 | 11/2002 | Wang | |
| 2002/0178344 A1 | 11/2002 | Bourguet | |
| 2003/0026461 A1 | 2/2003 | Arthur Hunter | |
| 2003/0133008 A1* | 7/2003 | Stephenson | H04N 5/2251 348/47 |
| 2003/0133085 A1 | 7/2003 | Tretiakoff | |
| 2003/0179133 A1 | 9/2003 | Pepin et al. | |
| 2004/0056907 A1 | 3/2004 | Sharma | |
| 2004/0232179 A1 | 11/2004 | Chauhan | |
| 2004/0267442 A1 | 12/2004 | Fehr et al. | |
| 2005/0020845 A1 | 9/2005 | Fink et al. | |
| 2005/0221260 A1 | 10/2005 | Kikuchi | |
| 2005/0259035 A1* | 11/2005 | Iwaki | G06F 3/011 345/8 |
| 2005/0283752 A1 | 12/2005 | Fruchter | |
| 2006/0004512 A1* | 1/2006 | Herbst | G01C 21/3638 701/431 |
| 2006/0028550 A1* | 2/2006 | Palmer, Jr. | G08B 13/19619 348/155 |
| 2006/0029256 A1 | 2/2006 | Miyoshi | |
| 2006/0129308 A1 | 6/2006 | Kates | |
| 2006/0171704 A1 | 8/2006 | Bingle et al. | |
| 2006/0177086 A1 | 8/2006 | Rye et al. | |
| 2006/0184318 A1* | 8/2006 | Yoshimine | A61F 9/08 701/433 |
| 2006/0292533 A1 | 12/2006 | Selod | |
| 2007/0001904 A1 | 1/2007 | Mendelson | |
| 2007/0052672 A1 | 3/2007 | Ritter et al. | |
| 2007/0173688 A1 | 7/2007 | Kim | |
| 2007/0202865 A1* | 8/2007 | Moride | H04W 88/06 455/419 |
| 2007/0230786 A1 | 10/2007 | Foss | |
| 2007/0296572 A1* | 12/2007 | Fein | A61H 3/061 340/539.13 |
| 2008/0024594 A1 | 1/2008 | Ritchey | |
| 2008/0068559 A1* | 3/2008 | Howell | G01C 22/006 351/158 |
| 2008/0120029 A1 | 5/2008 | Zelek et al. | |
| 2008/0144854 A1* | 6/2008 | Abreu | G02C 3/003 381/74 |
| 2008/0145822 A1 | 6/2008 | Bucchieri | |
| 2008/0174676 A1 | 7/2008 | Squilla et al. | |
| 2008/0198222 A1 | 8/2008 | Gowda | |
| 2008/0198324 A1 | 8/2008 | Fuziak | |
| 2008/0208455 A1 | 8/2008 | Hartman | |
| 2008/0251110 A1 | 10/2008 | Pede | |
| 2008/0260210 A1 | 10/2008 | Kobeli | |
| 2009/0012788 A1 | 1/2009 | Gilbert | |
| 2009/0040215 A1 | 2/2009 | Afzulpurkar | |
| 2009/0058611 A1* | 3/2009 | Kawamura | H04N 7/185 340/10.1 |
| 2009/0106016 A1 | 4/2009 | Athsani | |
| 2009/0118652 A1 | 5/2009 | Carlucci | |
| 2009/0122161 A1 | 5/2009 | Bolkhovitinov | |
| 2009/0122648 A1 | 5/2009 | Mountain et al. | |
| 2009/0157302 A1 | 6/2009 | Tashev et al. | |
| 2009/0177437 A1 | 7/2009 | Roumeliotis | |
| 2009/0189974 A1 | 7/2009 | Deering | |
| 2009/0210596 A1 | 8/2009 | Furuya | |
| 2010/0041378 A1* | 2/2010 | Aceves | H04L 67/306 455/414.1 |
| 2010/0080418 A1* | 4/2010 | Ito | G06K 9/00228 382/103 |
| 2010/0109918 A1 | 5/2010 | Liebermann | |
| 2010/0110368 A1 | 5/2010 | Chaum | |
| 2010/0179452 A1 | 7/2010 | Srinivasan | |
| 2010/0182242 A1 | 7/2010 | Fields et al. | |
| 2010/0182450 A1* | 7/2010 | Kumar | H04N 1/00002 348/229.1 |
| 2010/0198494 A1* | 8/2010 | Chao | G01C 21/32 701/532 |
| 2010/0199232 A1 | 8/2010 | Mistry et al. | |
| 2010/0241350 A1 | 9/2010 | Cioffi et al. | |
| 2010/0245585 A1 | 9/2010 | Fisher et al. | |
| 2010/0267276 A1 | 10/2010 | Wu | |
| 2010/0292917 A1 | 11/2010 | Emam et al. | |
| 2010/0298976 A1 | 11/2010 | Sugihara et al. | |
| 2010/0305845 A1 | 12/2010 | Alexandre et al. | |
| 2010/0308999 A1 | 12/2010 | Chornenky | |
| 2011/0066383 A1* | 3/2011 | Jangle | A61B 5/1116 702/19 |
| 2011/0071830 A1 | 3/2011 | Kim | |
| 2011/0092249 A1 | 4/2011 | Evanitsky | |
| 2011/0124383 A1 | 5/2011 | Garra et al. | |
| 2011/0125735 A1 | 5/2011 | Patrou | |

(56) References Cited

U.S. PATENT DOCUMENTS

| | | |
|---|---|---|
| 2011/0181422 A1 | 7/2011 | Tran |
| 2011/0187640 A1 | 8/2011 | Jacobsen |
| 2011/0211760 A1* | 9/2011 | Boncyk .............. G06F 17/30259 382/190 |
| 2011/0216006 A1 | 9/2011 | Litschel |
| 2011/0221670 A1 | 9/2011 | King, III et al. |
| 2011/0234584 A1* | 9/2011 | Endo .................... G02B 27/017 345/419 |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1* | 12/2012 | Mutoh ................ G01C 21/3617 701/428 |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1* | 7/2013 | DeLuca ................ G01C 21/343 701/400 |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1* | 8/2013 | Zelek ................ G01C 21/3652 701/412 |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1* | 12/2013 | Jarvis .................. G06F 17/3087 707/724 |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1* | 2/2014 | Takahama ................ G06F 3/012 345/156 |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0160250 A1* | 6/2014 | Pomerantz ......... H04N 5/23229 348/47 |
| 2014/0184384 A1 | 7/2014 | Zhu et al. |
| 2014/0184775 A1* | 7/2014 | Drake ...................... A61B 3/14 348/78 |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1* | 9/2014 | Wexler ...................... A61F 9/08 348/62 |
| 2014/0278070 A1* | 9/2014 | McGavran ............. G01C 21/00 701/465 |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1* | 12/2014 | Miskin ...................... H04R 5/02 381/334 |
| 2014/0379251 A1* | 12/2014 | Tolstedt .................. A61H 3/061 701/411 |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1* | 2/2015 | Bailey .................... G08C 17/02 705/319 |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1* | 5/2015 | Haque .................... H04L 67/24 709/204 |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1* | 7/2015 | Jerauld ................ G02B 27/017 701/541 |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0324646 A1* | 11/2015 | Kimia ........................ G06T 7/80 348/62 |
| 2015/0330787 A1 | 11/2015 | Cioffi et al. |

(56) References Cited

U.S. PATENT DOCUMENTS

| | | | |
|---|---|---|---|
| 2015/0336276 A1 | 11/2015 | Song | |
| 2015/0338917 A1* | 11/2015 | Steiner | H04L 9/3231 345/156 |
| 2015/0341591 A1 | 11/2015 | Kelder et al. | |
| 2015/0346496 A1 | 12/2015 | Haddick et al. | |
| 2015/0356345 A1 | 12/2015 | Velozo | |
| 2015/0356837 A1* | 12/2015 | Pajestka | A61H 3/061 340/4.14 |
| 2015/0364943 A1 | 12/2015 | Vick | |
| 2015/0367176 A1 | 12/2015 | Bejestan | |
| 2015/0375395 A1 | 12/2015 | Kwon | |
| 2016/0007158 A1 | 1/2016 | Venkatraman | |
| 2016/0028917 A1 | 1/2016 | Wexler | |
| 2016/0042228 A1 | 2/2016 | Opalka | |
| 2016/0078289 A1 | 3/2016 | Michel | |
| 2016/0098138 A1 | 4/2016 | Park | |
| 2016/0156850 A1 | 6/2016 | Werblin et al. | |
| 2016/0198319 A1 | 7/2016 | Huang | |
| 2016/0350514 A1 | 12/2016 | Rajendran | |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 201012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO1995004440 | 2/1995 |
| WO | WO 9949656 | 9/1999 |
| WO | WO 0010073 | 2/2000 |
| WO | WO 0038393 | 6/2000 |
| WO | WO 179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008/096134 | 8/2008 |
| WO | WO2008127316 | 10/2008 |
| WO | WO 2010/062481 | 6/2010 |
| WO | WO 2010/109313 | 9/2010 |
| WO | WO 2012/040703 | 3/2012 |
| WO | WO2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Joseph et al.; "Visual Semantic Parameterization—To Enhance Blind User Perception for Indoor Navigation"; *Multimedia and Expo Workshops (ICMEW), 2013 IEEE International Conference*; 6 pages; Jul. 15, 2013.

Katz et al; "NAVIG: Augmented Reality Guidance System for the Visually Impaired"; *Virtual Reality*; vol. 16; pp. 253-269; 2012.

Rodríguez et al.; "Assisting the Visually Impaired: Obstacle Detection and Warning System by Acoustic Feedback"; *Sensors 2012*; vol. 12; pp. 17476-17496; 2012.

Treuillet; "Outdoor/Indoor Vision-Based Localization for Blind Pedestrian Navigation Assistance"; *WSPC/Instruction File*; 16 pages; May 23, 2010.

Ran et al.; "Drishti: An Integrated Indoor/Outdoor Blind Navigation System and Service"; *Proceeding PERCOM '04 Proceedings of the Second IEEE International Conference on Pervasive Computing and Communications (PerCom'04)*; 8 pages; 2014.

Guerrero et al.; "An Indoor Navigation System for the Visually Impaired"; *Sensors 2012*, 12; pp. 3236-3258; 2012.

Nordin et al.; "Indoor Navigation and localization for Visually Impaired People Using Weighted Topological Map"; *J. Computer Sci.*; vol. 5; Issue 11; pp. 883-889; 2009.

The Nex Band; http://www.mightycast.com/#faq; May 19, 2015; 4 pages.

Cardonha et al.; "*A Crowdsourcing Platform for the Construction of Accessibility Maps*"; W4A'13 Proceedings of the 10th International Cross-Disciplinary Conference on Web Accessibility; Article No. 26; 2013; 5 pages.

Bujacz et al.; "*Remote Guidance for the Blind—A Proposed Teleassistance System and Navigation Trials*"; Conference on Human System Interactions; May 25-27, 2008; 6 pages.

Rodriguez et al; "*CrowdSight: Rapidly Prototyping Intelligent Visual Processing Apps*"; AAAI Human Computation Workshop (HCOMP); 2011; 6 pages.

Chaudary et al.; "*Alternative Navigation Assistance Aids for Visually Impaired Blind Persons*"; Proceedings of ICEAPVI; Feb. 12-14, 2015; 5 pages.

Garaj et al.; "*A System for Remote Sighted Guidance of Visually Impaired Pedestrians*"; The British Journal of Visual Impairment; vol. 21, No. 2, 2003; 9 pages.

Coughlan et al.; "*Crosswatch: A System for Providing Guidance to Visually Impaired Travelers at Traffic Intersections*"; Journal of Assistive Technologies 7.2; 2013; 17 pages.

Sudol et al.; "*LookTel—A Comprehensive Platform for Computer-Aided Visual Assistance*"; Computer Vision and Pattern Recognition Workshops (CVPRW), 2010 IEEE Computer Society Conference; Jun. 13-18, 2010; 8 pages.

Paladugu et al.; "*GoingEasy® with Crowdsourcing in the Web 2.0 World for Visually Impaired Users: Design and User Study*"; Arizona State University; 8 pages.

Kammoun et al.; "*Towards a Geographic Information System Facilitating Navigation of Visually Impaired Users*"; Springer Berlin Heidelberg; 2012; 8 pages.

Bigham et al.; "*VizWiz: Nearly Real-Time Answers to Visual Questions*" Proceedings of the 23nd annual ACM symposium on User interface software and technology; 2010; 2 pages.

Guy et al; "*CrossingGuard: Exploring Information Content in Navigation Aids for Visually Impaired Pedestrians*" Proceedings of the SIGCHI Conference on Human Factors in Computing Systems; May 5-10, 2012; 10 pages.

(56) References Cited

OTHER PUBLICATIONS

Zhang et al.; "A Multiple Sensor-Based Shoe-Mounted User Interface Designed for Navigation Systems for the Visually Impaired"; 5th Annual ICST Wireless Internet Conference (WICON); Mar. 1-3, 2010; 9 pages.
Shoval et al.; "Navbelt and the Guidecane—Robotics-Based Obstacle Avoidance Systems for the Blind and Visually Impaired"; IEEE Robotics & Automation Magazine, vol. 10, Issue 1; Mar. 2003; 12 pages.
Dowling et al.; "Intelligent Image Processing Constraints for Blind Mobility Facilitated Through Artificial Vision"; 8th Australian and NewZealand Intelligent Information Systems Conference (ANZIIS); Dec. 10-12, 2003; 7 pages.
Heyes, Tony; "The Sonic Pathfinder An Electronic Travel Aid for the Vision Impaired"; http://members.optuszoo.com.au/aheyew40/pa/pf_blerf.html; Dec. 11, 2014; 7 pages.
Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.
Wilson, Jeff, et al. "Swan: System for Wearable Audio Navigation"; 11th IEEE International Symposium on Wearable Computers; Oct. 11-13, 2007; 8 pages.
Borenstein et al.; "The GuideCane—A Computerized Travel Aid for the Active Guidance of Blind Pedestrians"; IEEE International Conference on Robotics and Automation; Apr. 21-27, 1997; 6 pages.
Bhatlawande et al.; "Way-finding Electronic Bracelet for Visually Impaired People"; IEEE Point-of-Care Healthcare Technologies (PHT), Jan. 16-18, 2013; 4 pages.
Blenkhorn et al.; "An Ultrasonic Mobility Device with Minimal Audio Feedback"; Center on Disabilities Technology and Persons with Disabilities Conference; Nov. 22, 1997; 5 pages.
Mann et al.; "Blind Navigation with a Wearable Range Camera and Vibrotactile Helmet"; 19th ACM International Conference on Multimedia; Nov. 28, 2011; 4 pages.
Shoval et al.; "The Navbelt—A Computerized Travel Aid for the Blind"; RESNA Conference, Jun. 12-17, 1993; 6 pages.
Kumar et al.; "An Electronic Travel Aid for Navigation of Visually Impaired Persons"; Communications Systems and Networks (COMSNETS), 2011 Third International Conference; Jan. 2011; 5 pages.
Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.
Pagliarini et al.; "Robotic Art for Wearable"; Proceedings of EUROSIAM: European Conference for the Applied Mathematics and Infoiiiiatics 2010; 10 pages.
Greenberg et al.; "Finding Your Way: A Curriculum for Teaching and Using the Braillenote with Sendero GPS 2011"; California School for the Blind; 2011; 190 pages.
Helal et al.; "Drishti: An Integrated Navigation System for Visually Impaired and Disabled"; Fifth International Symposium on Wearable Computers; Oct. 8-9, 2001; 8 pages.
Parkes, Don; "Audio Tactile Systems for Designing and Learning Complex Environments as a Vision Impaired Person: Static and Dynamic Spatial Information Access"; EdTech-94 Proceedings; 1994; 8 pages.
Zeng et al.; "Audio-Haptic Browser for a Geographical Information System"; ICCHP 2010, Part II, LNCS 6180; Jul. 14-16, 2010; 8 pages.
AlZuhair et al.; "NFC Based Applications for Visually Impaired People—A Review"; IEEE International Conference on Multimedia and Expo Workshops (ICMEW), Jul. 14, 2014; 7 pages.
Graf, Christian; "Verbally Annotated Tactile Maps—Challenges and Approaches"; Spatial Cognition VII, vol. 6222; Aug. 15-19, 2010; 16 pages.
Hamid, Nazatul Naquiah Abd; "Facilitating Route Learning Using Interactive Audio-Tactile Maps for Blind and Visually Impaired People"; CHI 2013 Extended Abstracts; Apr. 27, 2013; 6 pages.

Ramya, et al.; "Voice Assisted Embedded Navigation System for the Visually Impaired"; International Journal of Computer Applications; vol. 64, No. 13, Feb. 2013; 7 pages.
Caperna et al.; "A Navigation and Object Location Device for the Blind"; Tech. rep. University of Maryland College Park; May 2009; 129 pages.
Burbey et al.; "Human Information Processing with the Personal Memex"; ISE 5604 Fall 2005; Dec. 6, 2005; 88 pages.
Ghiani, et al.; "Vibrotactile Feedback to Aid Blind Users of Mobile Guides"; Journal of Visual Languages and Computing 20; 2009; 13 pages.
Wang, et al.; "Camera-Based Signage Detection and Recognition for Blind Persons"; 13th International Conference (ICCHP) Part 2 Proceedings; Jul. 11-13, 2012; 9 pages.
Krishna et al.; "A Systematic Requirements Analysis and Development of an Assistive Device to Enhance the Social Interaction of People Who are Blind or Visually Impaired"; Workshop on Computer Vision Applications for the Visually Impaired; Marseille, France; 2008; 12 pages.
Lee et al.; "A Walking Guidance System for the Visually Impaired"; International Journal of Pattern Recognition and Artificial Intelligence; vol. 22; No. 6; 2008; 16 pages.
Ward et al.; "Visual Experiences in the Blind Induced by an Auditory Sensory Substitution Device"; Journal of Consciousness and Cognition; Oct. 2009; 30 pages.
Merino-Garcia, et al.; "A Head-Mounted Device for Recognizing Text in Natural Sciences"; CBDAR'11 Proceedings of the 4th International Conference on Camera-Based Document Analysis and Recognition; Sep. 22, 2011; 7 pages.
Yi, Chucai; "Assistive Text Reading from Complex Background for Blind Persons"; CBDAR'11 Proceedings of the 4th International Conference on Camera-Based Document Analysis and Recognition; Sep. 22, 2011; 7 pages.
Yang, et al.; "Towards Automatic Sign Translation"; The Interactive Systems Lab, Carnegie Mellon University; 2001; 5 pages.
Meijer, Dr. Peter B.L.; "Mobile OCR, Face and Object Recognition for the Blind"; The vOICe, www.seeingwithsound.com/ocr.htm; Apr. 18, 2014; 7 pages.
OMRON; Optical Character Recognition Sensor User's Manual; 2012; 450 pages.
Park, Sungwoo; "Voice Stick"; www.yankodesign.com/2008/08/21/voice-stick; Aug. 21, 2008; 4 pages.
Rentschler et al.; "Intelligent Walkers for the Elderly: Performance and Safety Testing of VA-PAMAID Robotic Walker"; Department of Veterans Affairs Journal of Rehabilitation Research and Development; vol. 40, No. 5; Sep./Oct. 2013; 9pages.
Science Daily; "Intelligent Walker Designed to Assist the Elderly and People Undergoing Medical Rehabilitation"; http://www.sciencedaily.com/releases/2008/11/081107072015.htm; Jul. 22, 2014; 4 pages.
Glover et al.; "A Robotically-Augmented Walker for Older Adults"; Carnegie Mellon University, School of Computer Science; Aug. 1, 2003; 13 pages.
OrCam; www.orcam.com; Jul. 22, 2014; 3 pages.
Eccles, Lisa; "Smart Walker Detects Obstacles"; Electronic Design; http://electronicdesign.com/electromechanical/smart-walker-detects-obstacles; Aug. 20, 2001; 2 pages.
Graft, Birgit; "An Adaptive Guidance System for Robotic Walking Aids"; Journal of Computing and Information Technology—CIT 17; 2009; 12 pages.
Frizera et al.; "The Smart Walkers as Geriatric Assistive Device. The SIMBIOSIS Purpose"; Gerontechnology, vol. 7, No. 2; Jan. 30, 2008; 6 pages.
Rodriquez-Losada et al.; "Guido, The Robotic Smart Walker for the Frail Visually Impaired"; IEEE International Conference on Robotics and Automation (ICRA); Apr. 18-22, 2005; 15 pages.
Kayama et al.; "Outdoor Environment Recognition and Semi-Autonomous Mobile Vehicle for Supporting Mobility of the Elderly and Disabled People"; National Institute of Information and Communications Technology, vol. 54, No. 3; Aug. 2007; 11 pages.
Kalra et al.; "A Braille Writing Tutor to Combat Illiteracy in Developing Communities"; Carnegie Mellon University Research Showcase, Robotics Institute; 2007; 10 pages.

(56) References Cited

OTHER PUBLICATIONS

Blaze Engineering; "*Visually Impaired Resource Guide: Assistive Technology for Students who use Braille*"; Braille 'n Speak Manual; http://www.blaize.com; Nov. 17, 2014; 5 pages.
AppleVis; *An Introduction to Braille Screen Input on iOS 8*; http://www.applevis.com/guides/braille-ios/introduction-braille-screen-input-ios-8, Nov. 16, 2014; 7 pages.
Dias et al.; "*Enhancing an Automated Braille Writing Tutor*"; IEEE/RSJ International Conference on Intelligent Robots and Systems; Oct. 11-15 ,2009; 7 pages.
D'Andrea, Frances Mary; "*More than a Perkins Brailler: A Review of the Mountbatten Brailler*, Part 1"; AFB AccessWorld Magazine; vol. 6, No. 1, Jan. 2005; 9 pages.
Trinh et al.; "*Phoneme-based Predictive Text Entry Interface*"; Proceedings of the 16th International ACM SIGACCESS Conference on Computers & Accessibility; Oct. 2014; 2 pgs.
Merri et al.; "*The Instruments for a Blind Teacher of English: The challenge of the board*"; European Journal of Psychology of Education, vol. 20, No. 4 (Dec. 2005), 15 pages.
Kirinic et al.; "*Computers in Education of Children with Intellectual and Related Developmental Disorders*"; International Journal of Emerging Technologies in Learning, vol. 5, 2010, 5 pages.
Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.
Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?item41912d18c:g:~pMAAOSwe-FU6zDa ; 4 pages.
Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.
Wu et al. "Fusing Multi-Modal Features for Gesture Recognition", Proceedings of the 15$^{th}$ ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10$^{th}$ USENIX Symposium on Networked Systems Design and Implementation (NSDF'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Singhal; "The Development of an Intelligent Aid for Blind and Old People;" *Emerging Trends and Applications in Computer Science (ICETACS)*, 2013 1$^{st}$ International Conference; pp. 182-185; Sep. 13, 2013.
Aggarwal et al.; "All-in-One Companion for Visually Impaired;" *International Journal of Computer Applications*; vol. 79, No. 14; pp. 37-40; Oct. 2013.
"Light Detector" *EveryWare Technologies*; 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.
Zhang, Shanjun; Yoshino, Kazuyoshi; A Braille Recognition System by the Mobile Phone with Embedded Camera; 2007; IEEE.
Diallo, Amadou; Sep. 18, 2014; Apple iOS8: Top New Features, Forbes Magazine.
N. Kalar, T. Lawers, D. Dewey, T. Stepleton, M.B. Dias; Iterative Design of a Braille Writing Tutor to Combat Illiteracy; Aug. 30, 2007; IEEE.

\* cited by examiner

SMART NECKLACE WITH STEREO VISION AND ONBOARD PROCESSING

CROSS REFERENCE TO RELATED APPLICATIONS

This application is a continuation-in-part of U.S. application Ser. No. 14/480,575, filed on Sep. 8, 2014, which is a continuation-in-part of U.S. application Ser. No. 14/154,714, filed on Jan. 14, 2014, the entire contents of both applications are hereby incorporated by reference herein.

BACKGROUND

Field

The present disclosure relates to a wearable device which provides haptic and audio feedback based on stereo camera input.

Description of the Related Art

Wearable cameras provide recording and documenting of a user's experience, often from the same or similar point of view or field of view (FOV) of the user. However, these devices are passive recorders, and do not generally provide real time processing and information about the scene in the FOV. Certain users, such as blind persons, may desire additional feedback relating to the environment. Other wearable cameras may be designed to assist blind persons. However, such devices lack stereo cameras for reliable depth perception information.

Thus, there is a need for an unobtrusive device which augments a user's environmental awareness and social interaction with depth perception and object recognition.

SUMMARY

What is described is a method for providing directions to a blind user of a smart device. The directions are from an initial location of the smart device to a location of a desired object or a desired location. The method includes detecting, by at least two sensors and in response to a selection of a find mode of the smart device, image data corresponding to a surrounding environment of the smart device and positioning data corresponding to a positioning of the smart device. The method also includes receiving, by an input device, the desired object or the desired location. The method also includes determining, by a processor, the initial location of the smart device based on the image data, the positioning data and map data stored in a memory of the smart device. The method also includes providing, by the output device, the directions to the desired object based on the initial location of the smart device and the map data.

Also described is a method for describing at least one object or person within a predetermined distance and angle of a smart device to a blind user of the smart device. The method includes storing, in a memory, stored image data associated with a plurality of stored objects and people and a plurality of identifiers such that each identifier is associated with a stored object or person. The method also includes detecting, by a camera and in response to a selection of an explore mode or a scan mode of the smart device, detected image data corresponding to the at least one object or person. The method also includes determining, by a processor, at least a first identifier from the plurality of identifiers corresponding to the at least one object or person within the predetermined distance and angle of the camera based on the detected image data and the stored image data. The method also includes outputting, via a speaker, the at least first identifier.

Also described is a method for storing a first location of a smart device and providing directions to a blind user from a second location of the smart device to the first location of the smart device. The method includes detecting, by a positioning sensor, a first positioning data corresponding to a first location of the smart device and a second positioning data corresponding to a second location of the smart device. The method also includes storing, in a memory and in response to a first selection of the capture mode of the smart device, the first positioning data on a map. The method also includes determining, by a processor and in response to a second selection of a capture mode of the smart device, directions to the first location from the second location based on the first positioning data and the second positioning data. The method also includes providing, by an output device, the directions.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
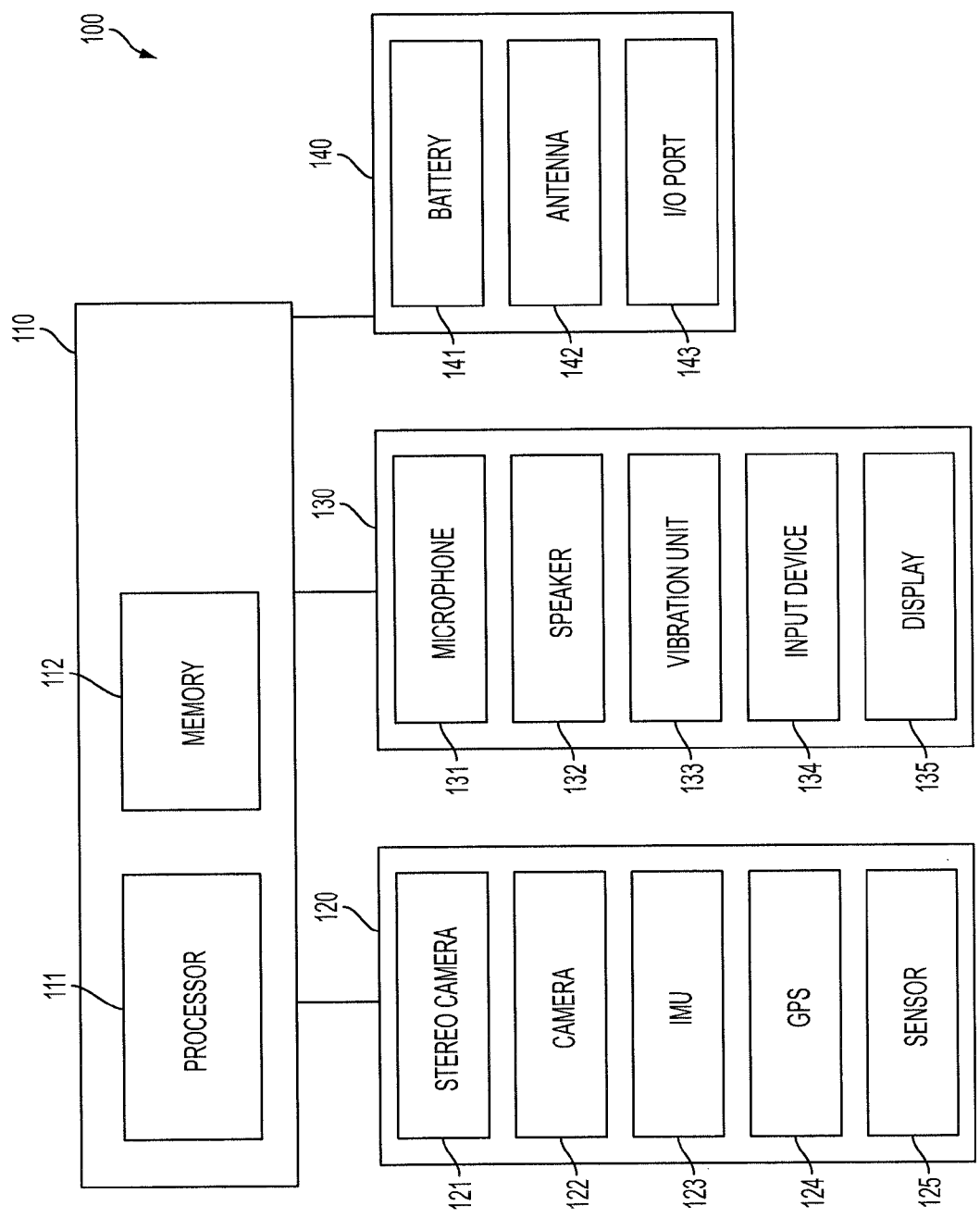
FIG. 1A is a block diagram of a smart necklace according to an embodiment of the present invention.

Blind people may be at a disadvantage because of a lack of ability to sense their environment through their vision. Described herein is a smart necklace that is to be worn around a neck of a user and is capable of providing environmental and social awareness to a user. The smart necklace can detect image and location information within the user's environment and use this image information to assist the user in their daily life.

The smart necklace is particularly well suited to assist blind or visually impaired users in their daily lives. The smart necklace is adapted to provide a variety of information based on requests from the user and detected environmental data. For example, the smart necklace can identify objects within a particular field of view (FOV) as well as provide depth information regarding the objects to the user, provide navigation instructions to the user to indoor and outdoor locations as well as learn labels for new objects, people and places so that the smart necklace can later identify the labeled objects, people and places.

The use of stereo cameras within a device such as the smart necklace is advantageous over the current state of the art. The use of stereo cameras allows depth information to be detected. This depth information can be extremely valuable, especially to a blind user who has limited distance detection capabilities. Similarly, the combinations of inputs and outputs provide benefits not currently available. The selection of inputs, including cameras that are always detecting image data, a GPS that collects location data and an IMU that collects acceleration data, allows the smart necklace to navigate the user within an enclosed area where location data alone may not be helpful. Similarly, the combination of stereo audio output and stereo haptic output ensures that the user can always receive output data from the smart necklace in an easy to comprehend manner.

This disclosure further discloses methods to be performed by a wearable device for assisting blind or visually impaired users. The methods are designed to determine data to provide to the user based on data from a pair of stereo cameras, an IMU and a GPS. The methods may help identify objects in the user's surroundings, navigate the user to a particular location and learn new people, places and things based on input from the user.

The first method is adapted to direct a user to a location of an object, person or place. The second method and the third method are adapted to describe objects within a predetermined area of the smart device. The fourth method is adapted to capture a present location of the smart device, store the location and then direct the user to the stored location from a second location. These methods are advantageous over the current state of the art because they allow data to be detected and provided to the user based on a combination of positioning data and image data. In particular, the use of an IMU and cameras in determining location information provides more accurate positioning than a traditional GPS based device.

In one implementation, a smart necklace 100 (or blind aid necklace) includes an onboard processing array 110, which communicates with a sensor array 120, an interface array 130, and a component array 140. The onboard processing array 110, the sensor array 120, the interface array 130, and the component array 140 are exemplary groupings to visually organize the components of the smart necklace 100 in the block diagram of FIG. 1A and are not limiting or necessarily representative of any physical groupings. In addition, certain implementations may have more or less components than illustrated in FIG. 1A.

The onboard processing array 110 includes a processor 111 and a memory 112. The processor 111 may be a computer processor such as an ARM processor, DSP processor, distributed processor, or other form of central processing. The processor 111 may be positioned on the smart necklace 100, may be a remote processor or it may be a pairing of a local and a remote processor.

The memory 112 may be one or any combination of the following: a RAM or other volatile or nonvolatile memory, a non-transitory memory or a data storage device, such as a hard disk drive, a solid state disk drive, a hybrid disk drive, or other appropriate data storage, and may further store machine-readable instructions, which may be loaded into the memory 112 and executed by the processor 111. As with the processor 111, the memory 112 may be positioned on the smart necklace 100, may be positioned remote from the smart necklace 100 or it may be a pairing of a local and a remote memory.

The sensor array 120 includes stereo cameras 121, a camera 122, an inertial measurement unit (IMU) 123, a global positioning system (GPS) 124, and a sensor 125. The stereo cameras 121 may be a stereo camera pair comprising two cameras offset by a stereo distance. The stereo distance may be optimized for the two cameras. The smart necklace 100 may have more than one pair of stereo cameras 121. The camera 122 may be a camera or other optical sensor not part of a stereo camera pair. The IMU 123 may be an IMU which may further comprise one or more of an accelerometer, a gyroscope, a magnetometer or the like. The GPS 124 may be one or more GPS units. The sensor 125 may be one or more sensors which provide further information about the environment in conjunction with the rest of the sensor array 120. The sensor 125 may be one or more of a camera, a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, a light sensor or other sensor.

The interface array 130 includes a microphone 131, a speaker 132, a vibration unit 133, an input device 134, and a display 135. The microphone 131 may be a microphone or other device capable of receiving sounds, such as voice activation/commands or other voice actions from the user, and may be integrated with or external to the smart necklace 100. The speaker 132 may be one or more speakers or other devices capable of producing sounds and/or vibrations. The vibration unit 133 may be a vibration motor or actuator capable of providing haptic and tactile output. In certain implementations, the vibration unit 133 may also be capable of producing sounds, such that the speaker 132 and the vibration unit 133 may be the same or integrated. The vibration unit 133 may include a left vibration motor in the left portion, and a right vibration motor in the right portion. This advantageously allows various combinations of haptic feedback using a left-side vibration that may differ from a right-side vibration.

The input device 134 may be an input device such as a touch sensor and/or one or more buttons. For example, the input device 134 may be a plurality of buttons, such that each button corresponds to a different activity of the smart necklace 100. In various embodiments, the microphone 131 may be considered an input device, such that the term "input device" may refer to the microphone, a button or buttons, a touchpad, a touchscreen or the like.

The display 135 may be a display, integrated into the smart necklace 100 or wirelessly connected to the smart necklace 100, and may be capable of displaying visual data from the stereo cameras 121 and/or the camera 122. In other implementations, the display 135 may be another visual alert device, such as one or more LEDs or similar light source. In various embodiments, the input device 134 and the display 135 may be the same or integrated, such as a touchscreen.

The component array 140 includes a battery 141, an antenna 142, and an input/output port (I/O port) 143. The battery 141 may be a battery or other power supply capable of powering the smart necklace 100. The battery 141 may have a connection port for recharging, or may be wirelessly recharged, such as through induction charging. The antenna 142 may be one or more antennas capable of transmitting and receiving wireless communications. For example, the antenna 142 may be a Bluetooth or WiFi antenna, may be a radio frequency identification (RFID) antenna or reader, and/or a near field communication (NFC) unit. The I/O port 143 may be one or more ports for connecting additional peripherals. For example, the I/O port 143 may be a headphone jack, or may be a data port.

The antenna 142 and/or the I/O port 143 allows the smart necklace 100 to connect to another device or network for data downloads, such as updates to the smart necklace, map information or other relevant information for a particular application, and data uploads, such as status updates and updated map information. Further, the antenna 142 and/or the I/O port 143 allows the smart necklace 100 to communicate with other smart devices for distributed computing or sharing resources.

The smart necklace 100 described herein is generally a stand-alone device. However, in other implementations, the smart necklace 100 may be configured or optimized to work in conjunction with other devices. For example, smartphones, tablets, or other mobile devices may wirelessly connect to the smart necklace 100 for shared resources and processing. The mobile device may act as a display unit for the smart necklace 100. The smart necklace 100 may further have specific protocols for interacting with mobile devices or other smart necklaces. Additionally, the smart necklace 100 may connect over the internet to remote processing and/or remote storage, such as a cloud.

The smart necklace 100 is a lightweight, wearable smart device that is worn around the user's neck for environmental awareness, navigation, social interactions, and obstacle avoidance through real-time feedback. The smart necklace 100 is capable of recognizing objects around the user, in order to alert the user. For example, the smart necklace 100 may be used by a blind person to aid in environmental awareness and navigate safely around obstacles. The smart necklace 100 provides the user audio and haptic feedback through the speaker 132 and/or the vibration unit 133 based upon input, such as camera input from the stereo cameras 121 and the camera 122.

Stereo cameras provide depth information in both indoor and outdoor environments. The stereo cameras 121 may face forward, in front of a user, to establish a field of view (FOV). The stereo cameras 121 may have, for example, an FOV between around 90 degrees and around 130 degrees. The stereo cameras 121 provide 3D information such as depth in front of the user. Stereo cameras 121 having different focal lengths may be provided. In various embodiments, one set of stereo cameras 121 may be positioned a relatively small distance apart (such as on a single side of the smart necklace 100) and another pair of stereo cameras 121 may be positioned a relatively large distance apart (such as positioning one of the pair of stereo cameras 121 on a first side of the smart necklace 100 and the other pair of stereo cameras 121 on a second side of the smart necklace 100). The pair of stereo cameras 121 having the relatively small distance apart can have a relatively short focal length, and thus provide detailed depth information for objects that are relatively close to the user. The pair of stereo cameras 121 having the relatively large distance apart can have a relatively long focal length, and thus provide detailed depth information for objects that are relatively far away from the user.

One or more additional camera 122 may be placed to the sides of the stereo cameras 121 or on an opposite side of the smart necklace 100 from the pair of stereo cameras 121. Camera 122 may have a field of view between 90 degrees and 130 degrees. In various embodiments, the cameras 122 may be placed where needed, such as behind the user's neck to provide data for an area behind the user.

Although the one or more camera 122 may be monocular, it can provide simple recognition, even without depth or distance information. For example, the cameras 122 can detect moving objects in the user's periphery. The pair of stereo cameras 121 and the camera 122 may continuously passively recognize objects in the environment. The smart necklace 100 may compare the image data of the object to image data stored in a local or cloud-based memory in order to identify the object. Working in conjunction with the other sensors in the sensor array 120, the smart necklace 100 can provide the user with guidance and navigation commands by way of audio and haptic feedback. In a preferred embodiment, the pair of stereo cameras 121 are utilized in part because they can advantageously provide depth information. In another embodiment, one or more omnidirectional cameras may be utilized in addition to or in lieu of the pair of stereo cameras 12 and the camera 122.

The GPS 124 provides location information, which works with the inertial guidance information, including velocity and orientation information, provided by the IMU 123 to help direct the user. The GPS 124 and/or the IMU 123 may be considered a positioning sensor, as either device may detect positioning information. The memory 112 may store, for example, map information or data to help locate and provide navigation commands to the user. The map data may be preloaded, downloaded wirelessly through the antenna 142, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the stereo cameras 121 and/or cameras 122 may passively recognize additional points of interest and update the map data.

For example, the user may give a voice command, "Take me to building X in Y campus." The smart necklace 100 may then download a relevant map if not already stored, or may navigate based on perceived images from the pair of stereo cameras 121 and the camera 122. As the user follows the navigation commands from the smart necklace 100, the user may walk by a coffee shop in the morning, and the smart necklace 100 would recognize the coffee shop and the time of day, along with the user's habits, and appropriately alert the user. The smart necklace 100 may verbally alert the user through the speaker 132. The user may use the input device 134 to adjust settings, which for example may control the types of alerts, what details to announce, and other parameters which may relate to object recognition or alert settings. The user may turn on or off certain features as needed.

When navigating indoors, the standalone GPS units may not provide enough information to a blind user to navigate around obstacles and reach desired locations or features. The smart necklace 100 may recognize, for instance, stairs, exits, and restrooms and appropriately store them in the memory 112. In another example, the smart necklace 100 may determine empty seats for the user to navigate to, or may remember the user's specific seat in order to navigate away and subsequently return to the same seat. Other points of interest may be potential hazards, descriptions of surrounding structures, alternate routes, and other locations. Additional data and points of interest can be downloaded and/or uploaded to mobile devices and other devices, social networks, or the cloud, through Bluetooth or other wireless networks. With wireless connectivity, local processing can be reduced, as high level data and processing may be available from the cloud or other remote data centers.

The smart necklace 100 may determine paths for navigation, which may be further modified for the user's needs. For example, a blind person may prefer routes that follow walls. Using the IMU 123 and/or the GPS 124 and other sensors, the smart necklace 100 can determine the user's location and orientation to guide them along the path, avoiding obstacles. The vibration unit 133 and the speaker 132 provide audio and haptic cues to help guide the user along the path.

For example, the speaker 132 may play a command to move forward a specified distance. Then, special audio tones or audio patterns can play when the user is at a waypoint, and guide the user to make a turn through additional tones or audio patterns. A first tone, audio pattern or vibration can alert the user to the start of a turn, such as a single tone or a vibration from the left side of the smart necklace may indicate a left turn. A second tone, audio pattern or vibration can alert the user that the turn is complete such as two tones, or the vibration may stop, such as the left side ceases to vibrate when the turn is complete. Different tones, patterns or vibrations may also signify different degrees of turns, such as a specific tone for a 45 degree turn and a specific tone for a 90 degree turn. Alternatively or in addition to tones and vibrations, the smart necklace 100 may provide verbal cues, similar to a car GPS navigation command.

High level alerts may also be provided through audio feedback. For example, as the smart necklace 100 reaches a predetermined distance—such as a foot or other value which may be stored in the memory 112 and may be adjusted—from an obstacle or hazard, the speaker 132 and/or the vibration unit 133 may provide audible alerts. As the smart necklace 100 gets closer to the obstacle, the audible alerts may increase in intensity or frequency.

The vibration unit 133 may include a left vibration motor in the left portion of the smart necklace 100 and a right vibration motor in the right portion of the smart necklace 100 for providing stereo haptic feedback to the user. Vibration patterns on the left portion can be different than vibration patterns on the right portion. In this manner, different combination of left/right vibration patterns can convey more variety of useful information to the user (as opposed to outputting the same pattern in both left and right vibration). For example, certain vibration patterns on the left that are lacking on the right may be used to signal to the user that the user should turn left.

The microphone 131 may detect additional environmental data, such as sounds of moving cars or other possible hazards. The microphone 131 may work in conjunction with the speaker 132, and may be placed away from the speaker 132 to prevent interference. The microphone 131 may alternatively work in conjunction with an attached audio device, such as bone conduction devices, to provide the user with audio feedback without broadcasting the audio feedback.

The smart necklace 100 may improve social interactions. For example, the smart necklace 100 may recognize faces in a room to identify potential friends, and provide the user with audio feedback identifying friends. The stereo cameras 121 and/or the camera 122 may be further able to determine additional details about persons, such as moods or expressions, or if they are engaging in physical activities, in order to alert the user. For example, the potential friend may extend a hand for a handshake or a "high five," and the smart necklace 100 may use audio or haptic feedback to notify the user. The microphone 131 may recognize voices of other persons to identify and appropriately notify the user, or may recognize a new voice to save for future identification.

Although the smart necklace 100 is described with respect to a blind user, the smart necklace 100 may be used in other applications. For example, the smart necklace 100 may be used by peace officers and law enforcement officers as a recorder which provides additional environmental awareness. The smart necklace 100 may be further used by athletes to record sports in a real-time, first person view. For example, performing certain actions such as a swing can be recorded, including inertial motions, to analyze the motions. The smart necklace 100 may also be used in hazardous environments to provide additional safety warnings. For example, the smart necklace 100 may be used in a factory to provide a factory worker additional warning about possible hazardous conditions or obstacles. The smart necklace 100 can be a memory device to aid persons, such as Alzheimer's patients. The smart necklace 100 can aid in shopping or otherwise navigating inventories by helping to keep track of goods.

In such applications, the sensor 125 may be specifically chosen to provide particularly relevant measurements. For instance, in an environment with harmful gas, the sensor 125 may detect dangerous levels of gas and accordingly alert the user. The sensor 125 may provide low-light viewing, or the stereo cameras 121 and/or the camera 122 may be capable of night vision, to provide the user with additional environmental awareness and social interaction in low-light conditions, such as outdoors at night or photo-sensitive environments. The sensor 125, the stereo cameras 121 and/or the camera 122 may be adapted to detect a light spectrum other than the visible light spectrum. The antenna 142 may be an RFID or NFC reader capable of identifying RFID or NFC tags on goods.

In certain embodiments, the smart necklace 100 is designed to accommodate blind or partially blind users. In such embodiments, a low-light viewing or night-vision camera (e.g., infrared camera) may also be utilized. For example, one camera 122 may be directed to normal lighting and another camera 122 directed to night vision. For example, a blind user may be more likely to turn off the lights because he/she does not depend on the lighting. A night vision camera of the smart necklace 100 may detect image data in the dark and provide the image data to the processor 111 for processing.

In some embodiments, the sensor 125 may be a light sensor for detecting an ambient light around the smart necklace 100. The processor 111 may receive the detected ambient light from the light sensor and adjust the stereo cameras 121 and/or the camera 122 based on the detected light, such as by adjusting the metering of the camera(s). This would allow the camera(s) to detect image data in most lighting situations.

Because the smart necklace 100 may be used for environmental awareness and social interaction, data detection of different light spectrums may be useful. The visible light spectrum allows humans to detect certain details that other light spectrums may not provide. However, other light spectrums may provide certain details that human visible light spectrum cannot provide. For example, details of certain objects may not be easily detected by the visible light spectrum during a cloudy or foggy day. Another spectrum of light may provide better details of objects during these types of conditions. Spectrums in which the pair of stereo cameras 121 and/or the camera 122 may be adapted to detect may include extreme ultraviolet, near infrared, mid infrared, far infrared, etc. For maximum efficiency and object detection, different sensors 125, stereo cameras 121 and/or cameras 122 may be provided for detecting various light spectrum data. In some embodiments, a single camera 122 is provided that detects a spectrum of light other than the visible light spectrum, while the pair of stereo cameras 121 detects objects within the visible light spectrum.

Figure 1B:
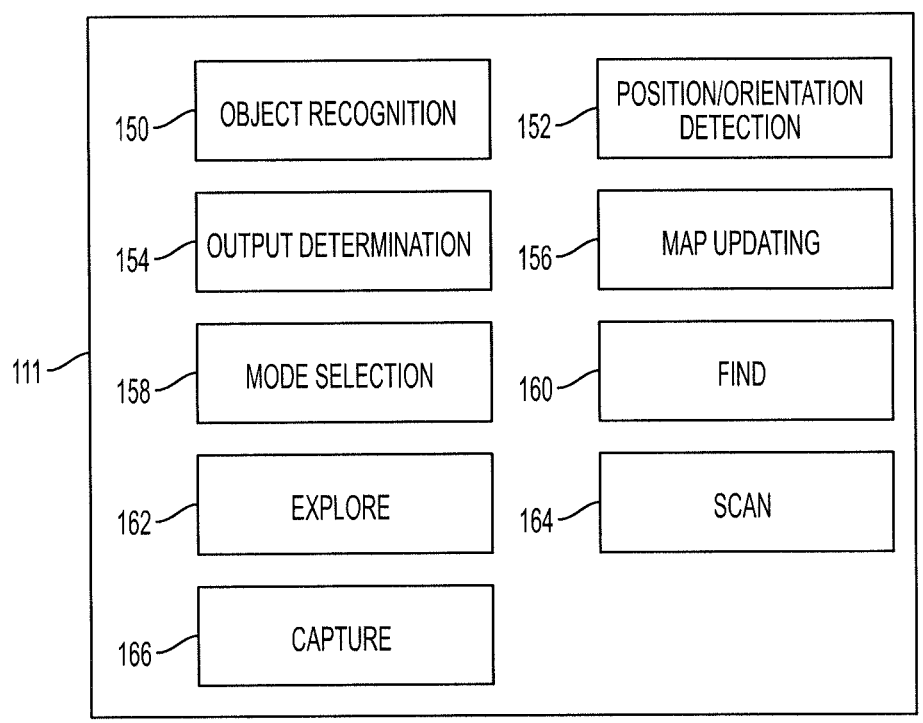
FIG. 1B illustrates modules within a processor of the smart necklace of FIG. 1A according to an embodiment of the present invention.

FIG. 1B illustrates the processor 111 including multiple modules. Each of the modules may perform a particular function, as will be described herein. The processor 111 may include an object recognition module 150, a positioning/orientation detection module 152, an output determination module 154, a map updating module 156, a mode selection module 158, a find module 160, an explore module 162, a scan module 164 and a capture module 166. The processor 111 may include all or some of these modules and may include additional modules not illustrated in FIG. 1B. For example, the methods performed in the output determination module 154 may be performed within the find module 160, the explore module 162, the scan module 164 and/or the capture module 166. The functionality of the modules will be described with reference to FIG. 12 through FIG. 22.

FIGS. 1A and 1B describe components of a smart necklace. One skilled in the art will realize that the components described in FIG. 1A, as well as any discussion thereof, may be applicable to other smart devices, such as a smart earpiece, smart glasses or the like. Similarly, any discussion of the modules of FIG. 1B are applicable to a smart necklace or other smart devices, such as a smart earpiece, smart glasses or the like.

Figure 2:
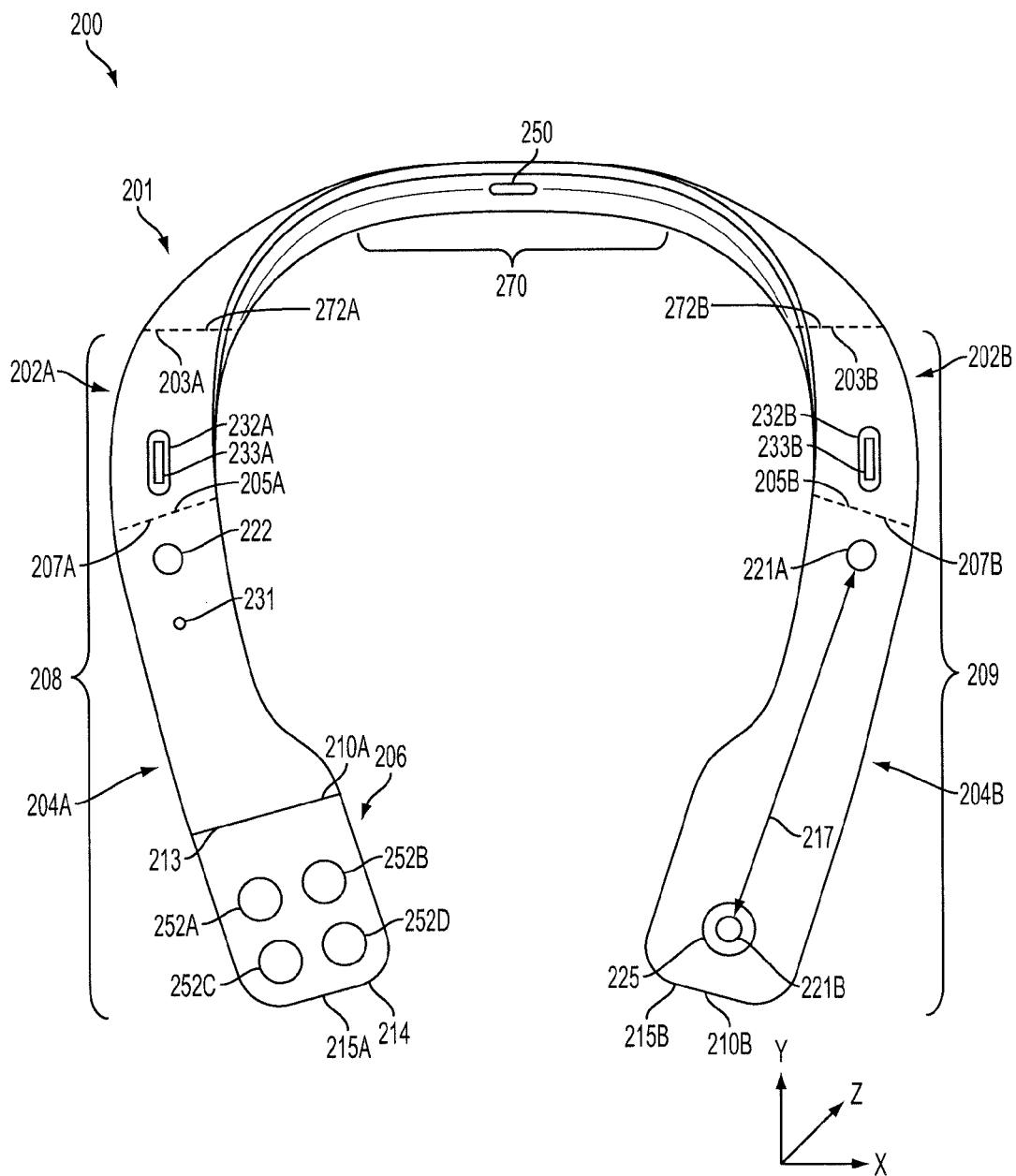
FIG. 2 illustrates an embodiment of a smart necklace as viewed from a front of the smart necklace according to an embodiment of the present invention.

FIG. 2 illustrates an embodiment of a smart necklace 200 viewed from the front (i.e., along the Z axis). An XYZ axis is shown to illustrate the shape and relative position of components within the smart necklace 200. The smart necklace 200 includes an upper portion 201, a right portion 208 and a left portion 209. The smart necklace 200 is to be worn around a neck of a user. When worn on a user, upper portion 201 may rest on the back of a person's neck. The right portion 208 may extend over the user's right shoulder such that a right end 215A of the smart necklace 200 is positioned on or above the user's right chest. Similarly, the left portion 209 may extend over the user's left shoulder such that a left end 215B of the smart necklace 200 is positioned on or above the left side of the user's chest.

The right portion 208 may include a right middle portion 202A, a lower right portion 204A, and a button portion 206. In various embodiments, the right portion 208 may not be separated into the right middle portion 202A, the lower right portion 204A and/or the button portion 206. In various embodiments, the lower right portion 204A and the button portion 206 are combined into a single piece. The left portion 209 may include a left middle portion 202B and a lower left portion 204B. In various embodiments, the left portion may not be separated into the left middle portion 202B and the lower left portion 204B.

The upper portion may have a middle 270, a left end 272B and a right end 272A. The upper portion 201 may be substantially straight at the middle 270 and curved between the middle 270 and the ends 272 such that the middle and lower portions may extend over the user's shoulder. The curve towards the left end 272B and the right end 272A may be such that the curves substantially mimic the user's neck and shoulders. This design allows the upper portion 201 to rest comfortably on the user's neck. The upper portion 201 may be rigid, meaning that the upper portion 201 will not bend or flex under normal pressure. This allows sensitive components such as batteries, processors, memories or the like to be housed in the upper portion 201 without concern of the components becoming damaged. The upper portion 201 may be at least partially hollow such that components may be housed within the upper portion 201.

The upper portion 201 may include a power button 250. The power button 250 may be positioned in the middle 270 of the upper portion 201. Where used herein, if a component is positioned on a portion of the smart necklace, then the component may be internal with reference to the portion, the component may be partially internal and partially external with reference to the portion or the component may be external to and coupled to the portion. The power button 250 may be connected to a processor, such as processor 111, such that the power button may toggle the smart necklace 200 between an ON position and an OFF position. When in an ON position, components of the smart necklace 200 may receive power from a power source, such as the battery 141.

In various embodiments, the processor may be adapted to determine a status of the power supply. For example, the processor may be able to determine a remaining operational time of the smart necklace 200 based on the current battery status. In various embodiments, the processor may be able to determine a percentage of power remaining in the battery. The power button 250 may be configured to send a power status request to the processor. For example, a user may depress and immediately release the power button 250 to cause the processor 111 to determine a status of the power source. In order to turn the smart necklace 200 to an OFF state, the user may depress and hold the power button 250 for a predetermined amount of time. In various embodiments, a press and release may result in an OFF state while a press and hold sends a request for power supply status. In various embodiments, a double click or any other click pattern may be substituted for the press and release or press and hold.

The right middle portion 202A includes an upper end 203A coupled to the right end 272A of the upper portion 201 and a lower end 205A. The left middle portion 202B includes an upper end 203B coupled to the left end 272B of the upper portion 201 and a lower end 205B. The middle portions 202 may be permanently coupled to the upper portion 201 or they may be removably coupled to the upper portion 201. When the middle portions 202 are removably coupled to the upper portion 201, the connection may be such that the middle portions 202 will not detach from the upper portion 201 under normal wearing conditions.

The middle portions 202 may be curved. This allows the middle portions 202 to rest against the user's neck and/or shoulders. In some embodiments, the middle portions 202 may be constructed of a semi-rigid material, such as rubber, silicone or the like. The semi-rigid material may bend or flex under certain forces but will return to its original shape when the force has been removed. The semi rigid material may allow the middle portions 202 to conform to the contours of an individual user's shoulders. Thus, the semi rigid material of the middle portions 202 allows the smart necklace 100 to fit comfortably to different users.

The right middle portion 202A may include a speaker 232A and a vibration unit 233A. In various embodiments, the speaker 232A and the vibration unit 233A may be the same device, such that a single device provides vibration data and audio data. In various embodiments, a cavity is formed in the right middle portion 202A such that a separate vibration unit 233A and speaker 232A are positioned in the same cavity. In various embodiments, the speaker 232A and the vibration unit 233A are positioned in separate locations on the smart necklace.

The left middle portion 202B similarly may include a speaker 232B and a vibration unit 233B. The speaker 232B and the vibration unit 233B may be positioned in a similar fashion as the speaker 232A and the vibration unit 233A. By providing a speaker and/or a vibration unit on both sides of the user, stereo information can be provided to the user. For example, a vibration by vibration unit 233A may indicate that the user is to turn right and a vibration by vibration unit 233B may indicate that the user is to turn left. Alternatively, a vibration on vibration unit 233A may instead indicate that the user is traveling too far to the user's right and should therefore turn left and a vibration by vibration unit 233B may indicate that the user should turn right.

The lower right portion 204A includes an upper end 207A coupled to the lower end 205A of the right middle portion 202A and a lower end 210A. The lower right portion 204A may be permanently coupled to the right middle portion 202A or may be removably coupled to the right middle portion 202A. When the lower right portion 204A is removably coupled to the right middle portion 202A, the connection may be such that the lower right portion 204A will not detach from the right middle portion 202A under normal wearing conditions.

The lower right portion 204A may be substantially straight. Proximal to the right end 215A, the lower right portion 204A may become larger in the X direction as it approaches the right end 215A. This provides additional surface area for components, such as buttons 252, to be positioned towards the right end 215A of the smart necklace. The lower right portion 204A may be constructed of a rigid material. The rigid material may be at least partially hollow or contain a cavity such that components may be housed within the lower right portion 204A.

The lower right portion 204A may include a camera 222 and a microphone 231. The camera 222 may be a single camera capable of detecting image data. The camera 222 may be adapted to detect image data of any light spectrum including, but not limited to, the visible light spectrum, the infrared spectrum, the near ultraviolet spectrum, etc. The camera 222 may be a wide angle camera such that it can detect data at about 120 degrees. The microphone 231 may be adapted to detect audio information. For example, the microphone 231 may detect speech of a user, speech of another person or speech of an environment of a user.

The lower left portion 204B includes an upper end 207B coupled to the lower end 205B of the left middle portion 202B and a lower end 210B that is the same as the left end 215B of the smart necklace 200. The lower left portion 204B may be permanently coupled to the left middle portion 202B or may be removably coupled to the left middle portion 202B. When the lower left portion 204B is removably coupled to the left middle portion 202B, the connection may be such that the lower left portion 204B will not detach from the left middle portion 202B under normal wearing conditions.

The lower left portion 204B may be similar to the lower right portion 204A. The lower left portion 204B may become larger in the X direction as it approaches the left end 215B. This may provide a greater surface area for additional external-mounted components and/or a greater volume for housing internal components. The lower left portion 204B may be constructed of a rigid material and be at least partially hollow such that components may be housed within the lower left portion 204B.

The lower left portion 204B may include a pair of stereo cameras 221. A stereo camera 221A may be positioned proximal to the left middle portion 202B while another stereo camera 221B is positioned proximal to the left end 215B. The pair of stereo cameras 221 may be separated from each other by a distance 217. The distance 217 may be selected based upon an optimal range. For example, if it is determined that depth information is most important between 5 and 10 feet, the distance 217 may be smaller than if it is determined that an optimal distance for that depth information is between 10 and 15 feet. The stereo camera 221A and/or the stereo camera 221B may be wide angle cameras such that they can detect image data at a range of about 120 degrees. The stereo cameras 221 may be capable of detecting image data at various light spectrums, including, but not limited to, the visible light spectrum, the infrared spectrum, the near ultraviolet spectrum, etc.

The lower left portion 204B may also include a light sensor 225. In various embodiments, a single device may comprise the light sensor 225 and the stereo camera 221B. In various embodiments, the lower left portion 204B includes a cavity such that both the light sensor 225 and the stereo camera 221B are positioned within the same cavity. In various embodiments, the light sensor 225 and the stereo camera 221B may be positioned at separate locations on the smart necklace 200. In various embodiments, the light sensor 225 is coupled to each camera and stereo camera of the smart necklace 100. Coupling between the cameras and the light sensor 225 may allow each camera to adjust its sensitivity to light based on an ambient amount of light sensed by the light sensor 225, such that each camera may detect an optimal quality of image data. In various embodiments, the processor may be coupled to the light sensor 225 such that the processor may adjust image data received from the cameras based on the detected ambient light.

Between the lower right portion 204A and the right end 215A may be a button portion 206. The button portion 206 has an upper end 213 coupled to the lower end 210A of the lower right portion 204A and a lower end 214 that is the same as the right end 215A of the smart necklace 200.

The lower right portion 204A may be permanently coupled to the button portion 206 or may be removably coupled to the button portion 206. When the lower right portion 204A is removably coupled to the button portion 206, the connection may be such that the lower right portion 204A will not detach from the button portion 206 under normal wearing conditions. In various embodiments, the lower right portion 204A and the button portion 206 are a single portion and/or the button portion 206 may simply be an extension of the lower right portion 204A. In various embodiments, the button portion 206 is removable such that a new or updated button portion may be attached to the smart necklace 200. In this manner, functionality may be added to the smart necklace 200 by inclusion of the new button portion. The button portion 206 may be at least partially hollow and constructed of a rigid material and the button portion may house components.

The button portion 206 may include a plurality of buttons. In the embodiment illustrated in FIG. 2, the button portion 206 includes a button 252A, a button 252B, a button 252C and a button 252D. The buttons 252 may be used as input to the smart necklace 200. The buttons 252 may allow a user to select a mode of operation of the smart necklace 200. For example, each button may correspond to an operational mode of the smart necklace 200, such that when a user depresses button 252A the smart necklace 200 operates in a first mode, when a user depresses the button 252B, the smart necklace 200 operates in a second mode, etc.

Using the one-button-per-mode system provides simplified user input. In many situations, it may be preferred for the user to be able to switch modes without drawing attention to herself. By learning the location of the buttons 252 and which mode of operation is associated with each button, the user can quietly and easily select a preferred operating mode without drawing attention of other people around him. Situations may also arise where it may be difficult for the smart necklace 200 to understand the user's voice over the ambient noise. This one-button-per-mode system prevents this issue, as no speaking may be required of the user.

The smart necklace 200 may operate in at least four modes: explorer mode, scan mode, find mode and capture. While in the explorer mode, the smart necklace 200 provides data to the user associated with the surroundings of the user. In some embodiments, the smart necklace 200 may describe data collected by the stereo cameras 221, the camera 222 and/or any other sensor to the user. In some embodiments, the smart necklace 200 may only described data that is collected while the user is moving (i.e., the field of view of the stereo cameras 221 and/or the camera 222 is changing). The data may only be certain data, such as hazard data, whether a friend of the user is passing by, whether a user's favorite restaurant is detected, etc.

While in the scan mode, the smart necklace 200 may describe everything that is in the field of view of the stereo cameras 221, the camera 222 and/or any other sensor. For example, the smart necklace 200 may describe everything in the field of view, such as by telling the user that object X is at your 10:00, object Y is at your 11:00, objects Z and W are at your 12:00, etc. The smart necklace 200 may operate in the scan mode even if it is not in motion and/or being worn. For example, the user could place the smart necklace 200 in a charging dock or in any other position in which the smart necklace 200 could capture data with the stereo cameras 221 and/or the camera 222. The smart necklace 200 could then continue to describe information that is in the field of view of the stereo cameras 221 and/or the camera 222.

While in the find mode, the smart necklace 200 can navigate the user to a desired object, place, person, etc. The user can provide data about the desired object, place, person, etc., such as by speaking the name of the object, place, person, etc. The smart necklace 200 can then determine the location of the object, place, person, etc. and provide navigation directions to the user.

The capture mode may allow the smart necklace 200 to store its current position in the memory 112 so that it can guide the user back to the same location at a later time. The capture mode may include 2 instructions—capture and return. Capture stores the position information (and possibly any obstacles that may arise during a return trip to the position) while return causes the smart necklace 200 to provide navigation instructions to the user for a return to the position. In various embodiments, a single press of the capture button may indicate the capture instruction and a double click indicates the return instruction.

This description of the modes of operation is not meant to be limiting. Explanation of the various modes and uses will be discussed in detail below with reference to FIGS. 18 to 26.

The smart necklace 100 illustrated in FIG. 2 is one embodiment of a smart necklace. One skilled in the art will realize that components of a smart necklace may be positioned other than illustrated in FIG. 2.

Figure 3:
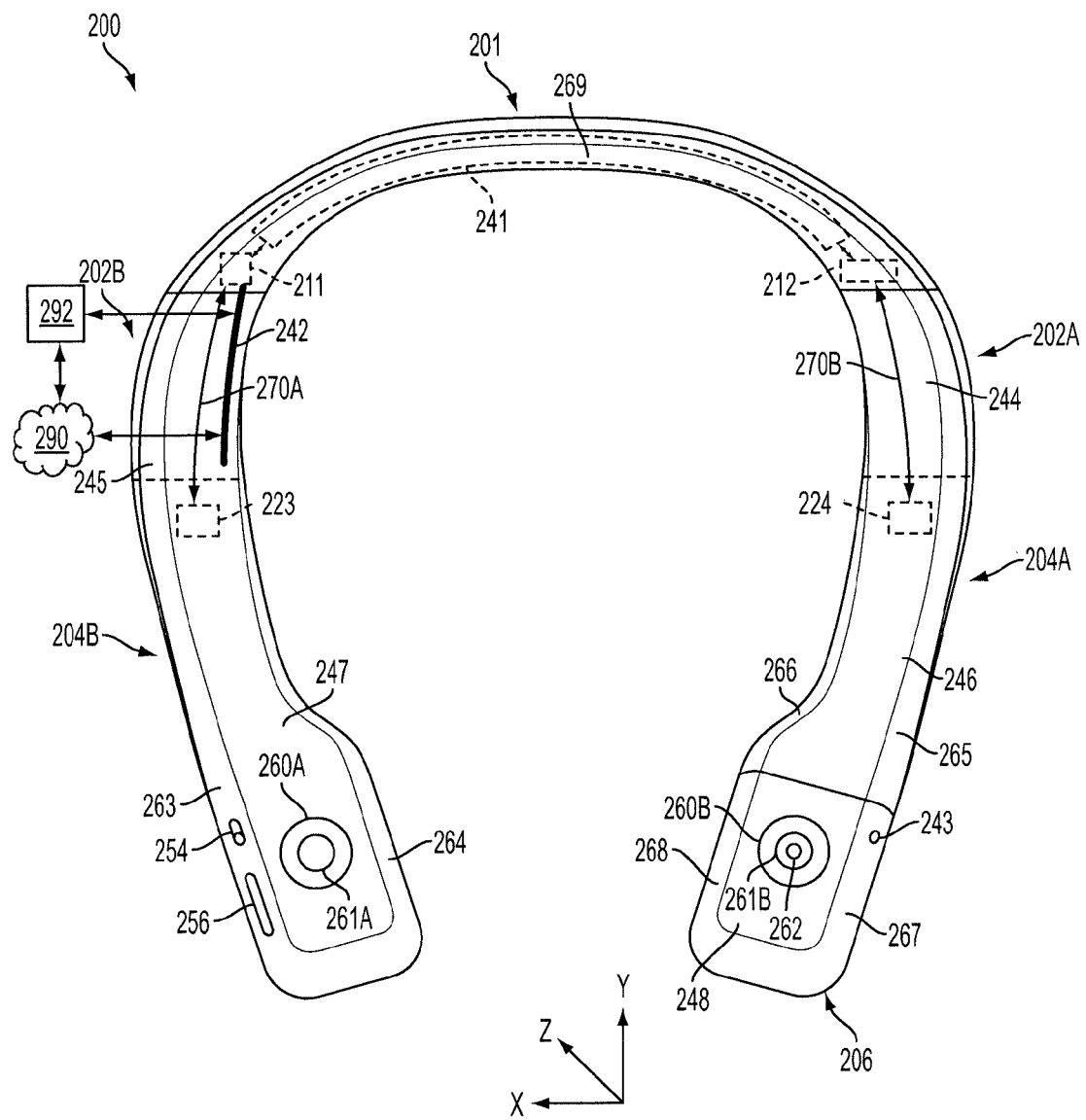
FIG. 3 illustrates the smart necklace of FIG. 2 from a back of the smart necklace according to an embodiment of the present invention.

FIG. 3 illustrates the smart necklace 200 of FIG. 2 from the back (i.e., along the Z axis). In FIG. 3, the smart necklace 200 is illustrated from the opposite side of the Z axis than illustrated in FIG. 2.

The upper portion 201 includes a back surface 269 substantially opposite a front surface (such as the front surface 368). The right middle portion 202A includes a back surface 244 substantially opposite a front surface (such as the front surface 385). The left middle portion 202B includes a back surface 245 substantially opposite a front surface (such as the front surface 384). The lower right portion 204A includes a back surface 246 substantially opposite a front surface (such as the front surface 388). The lower right portion 204A also includes an inner surface 266 and an outer surface 265 substantially opposite the inner surface 266. The lower left portion 204B includes a back surface 247 substantially opposite a front surface (such as the front surface 370). The lower left portion 204B also includes an inner surface 264 and an outer surface 263 substantially opposite the inner surface 264. The button portion 206 includes a back surface 248 substantially opposite a front surface (such as the front surface 389). The button portion 206 also includes an inner surface 268 and an outer surface 267 substantially opposite the inner surface.

The upper portion 201 of the smart necklace may include a battery 241. In various embodiments, the battery 241 may be centered within the upper portion 201 on the X axis. The battery 241 may be coupled to all of the electronic devices within the smart necklace 200 such that the battery can provide power to all electrical components within the smart necklace 200.

The upper portion 201 may also include a processor 211. The processor 211 may be coupled to all electronic components of the smart necklace 200 such that the processor 211 can receive inputs and provide outputs from/to the electronic components. The upper portion 201 may also include a memory 212. The memory 212 may be coupled to the processor such that the processor 211 can store and retrieve data from the memory 212. The memory 212 and the processor 211 may be positioned on the same side or on opposite sides of the upper portion 201. It is preferred that weight distribution of the upper portion 201 is centered in the middle of the upper portion 201 in the X direction. This will cause the weight of the upper portion 201 to be evenly distributed on the user, increasing the comfort of the smart necklace 200.

The lower left portion 204B may include an IMU 223, a binary switch 254, a toggle switch 256, an indent 260A and a connector 261A. The IMU 223 may be similar to the IMU 123. The binary switch 254 may control a mute function of the smart necklace 200 such that when disengaged, the speakers 232 can provide audio output and when engaged, the speakers 232 may not provide audio output. The toggle switch 256 may correlate to a volume function of the smart necklace 200 such that when toggled in a first direction, volume of audio from the speakers 232 becomes greater and when toggled in a second direction, volume of output from the speakers 232 becomes lower. The indent 260A may be an indent on the back side of the smart necklace 200. The indent 260A may include a connector 261A. The connector 261A may be a snap connector, a magnetic connector or other type of connector capable of physically and/or electrically connecting the connector 261A to another device.

The lower right portion 204A may include a GPS 224. The GPS 224 may be similar to the GPS 124.

The button portion 206 may include an I/O port 243, an indent 260B similar to the indent 260A, a connector 261B similar to the connector 261A and a charging contact 262. In various embodiments, the lower left portion 204B may include a charging contact within the indent 260A. The I/O port 243 may be a 9 mm audio port, a USB port, a mini USB port or the like. The charging contact 262 may be coupled to the battery 241 such that the charging contact 262 may receive power and transfer that power to the battery 241 for storage. The charging contact 262 may be adapted to receive power via magnetic charging, inductive charging, direct charging or the like. In various embodiments, the charging contact 262 may be coupled to the processor 211 such that electronic data may be transferred via the charging contact 262 in addition to or instead of power.

The middle portions 202 may or may not include additional components than those illustrated in FIG. 2. If no additional components are present in the middle portions 202, a connection 270A and a connection 270B may exist within the middle portions 202 in order to electrically couple the lower portions 204 to the upper portion 201. The connections 270 may include a data bus, a power line, or any other electrical connection. In some embodiments, the connections 270 may be replaced with wireless connectivity between the lower portions 204 and the upper portion 201.

Because the upper portion 201 and the lower portions 204 may be hollow and rigid, electronic components may be safely positioned within these portions. It may be desirable for bulky components such as the battery 241 to be positioned in the upper portion 201. Because the upper portion 201 is positioned adjacent a user's neck, additional weight may be more easily and comfortably supported in the upper portion 201 than the lower portions 204. It is desirable that weight be evenly distributed between the left middle portion 202B and the lower left portion 204B and the right middle portion 202A, the lower right portion 204A and the button portion 206. An even distribution of weight improves the comfort of the smart necklace 200.

The left middle portion 202B and the right middle portion 202A may house certain components. For example, the smart necklace 200 includes vibration units 233 and speakers 232 in the middle portions 202. Similarly, the smart necklace 200 may have an antenna 242 extend into the left middle portion 202B. The antenna 242 may be coupled to the processor 211 such that the processor 111 may transmit and receive wireless signals via the antenna 142.

The antenna 242 may be wirelessly coupled to a device or devices remote from the smart necklace 200, such as a cloud 290, a mobile device 292, a laptop, a tablet or the like. In various embodiments, the cloud 290 may include storage and/or processing that the smart necklace 200 may utilize. For example, the smart necklace 200 may transmit certain data to the cloud 290 such that the cloud stores the data or processes the data. The smart necklace 200 may later retrieve the stored and/or processed data from the cloud 290. In various embodiments, the smart necklace 200 is designed to perform some functions locally, such as by the processor 211, and is designed such that other functions are performed remotely, such as by the cloud 290.

The mobile device 292 may be coupled to the smart necklace 200 such that the mobile device may perform some processing and storage functions for the smart necklace 200. The mobile device 292 may also be connected to the cloud 290 such that the mobile device 292 may perform some storage and/or processing functions and transmit additional storage and/or processing functions to the cloud 290. In various embodiments, processing and/or storage may be performed by any combination of the smart necklace 200, the mobile device 292 and the cloud 290.

Figure 4:
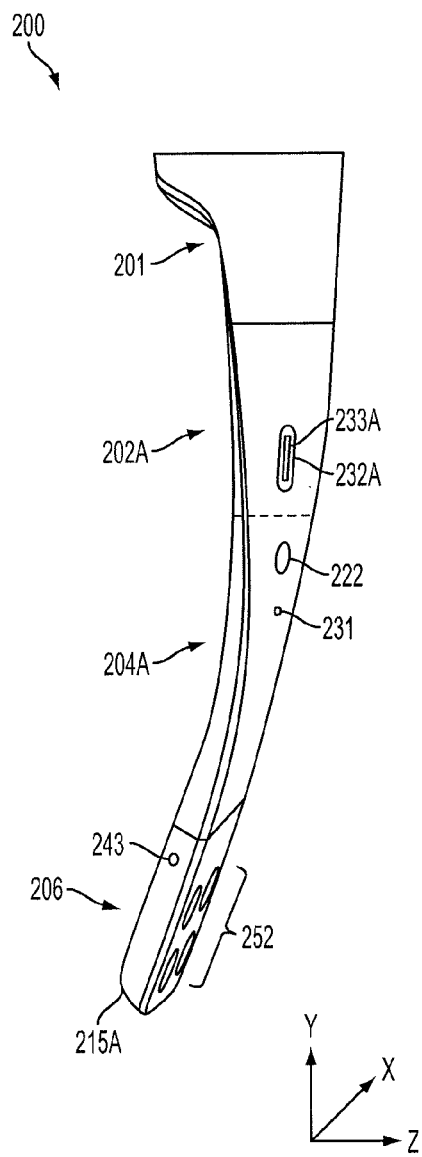
FIG. 4 illustrates a portion of the smart necklace of FIG. 2 including part of an upper portion 201, a right middle portion and a lower right portion according to an embodiment of the present invention.

FIG. 4 illustrates a portion of the smart necklace 200 including some of the upper portion 201, the right middle portion 202A, the lower right portion 204A and the button portion 206. The portion of the smart necklace 200 is illustrated along the X direction. As illustrated, the smart necklace 200 curves substantially 90 degrees about the Y axis between the upper portion 201 and the right end 315A. The button portion 206 includes the I/O port 243 positioned on a surface that is substantially perpendicular to the surface to which the buttons 252 are attached.

Figure 5:
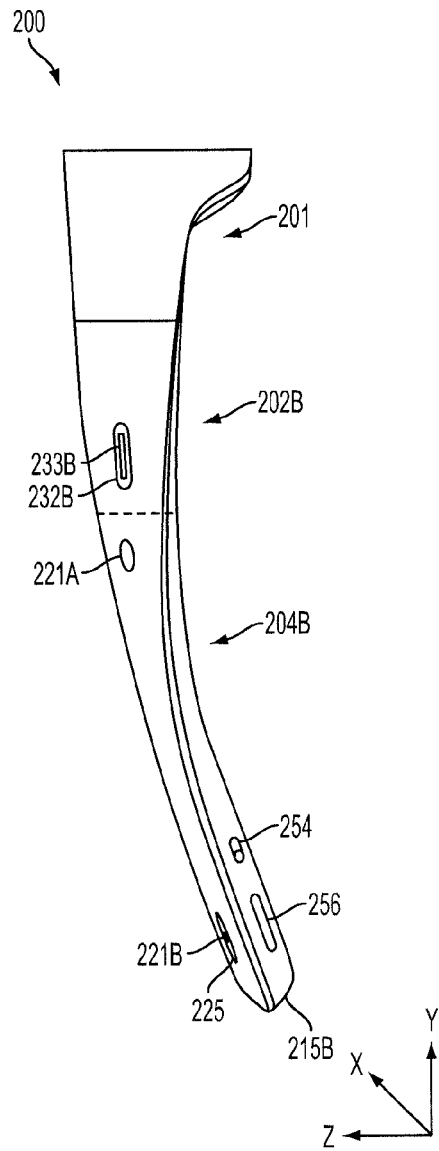
FIG. 5 illustrates a portion of the smart necklace of FIG. 2 including part of an upper portion, a left middle portion and a lower left portion according to an embodiment of the present invention.

FIG. 5 illustrates a portion of the smart necklace 200 including some of the upper portion 201, the left middle portion 202B and the lower left portion 204B. The portion of the smart necklace 200 is illustrated along the X direction. As illustrated, the smart necklace 200 is curved about 90 degrees about the Y axis between the upper portion 201 and the left end 315B. The curve about the Y axis allows the smart necklace 200 to become substantially flush with the back of the user's neck and simultaneously with a user's shoulders and chest. As illustrated, the binary switch 254 and the toggle switch 256 are positioned on a plane substantially perpendicular to the plane on which the stereo camera 221B and the light sensor 225 are positioned. This allows for easy access of the binary switch 254 and/or the toggle switch 256 by the user.

Figure 6:
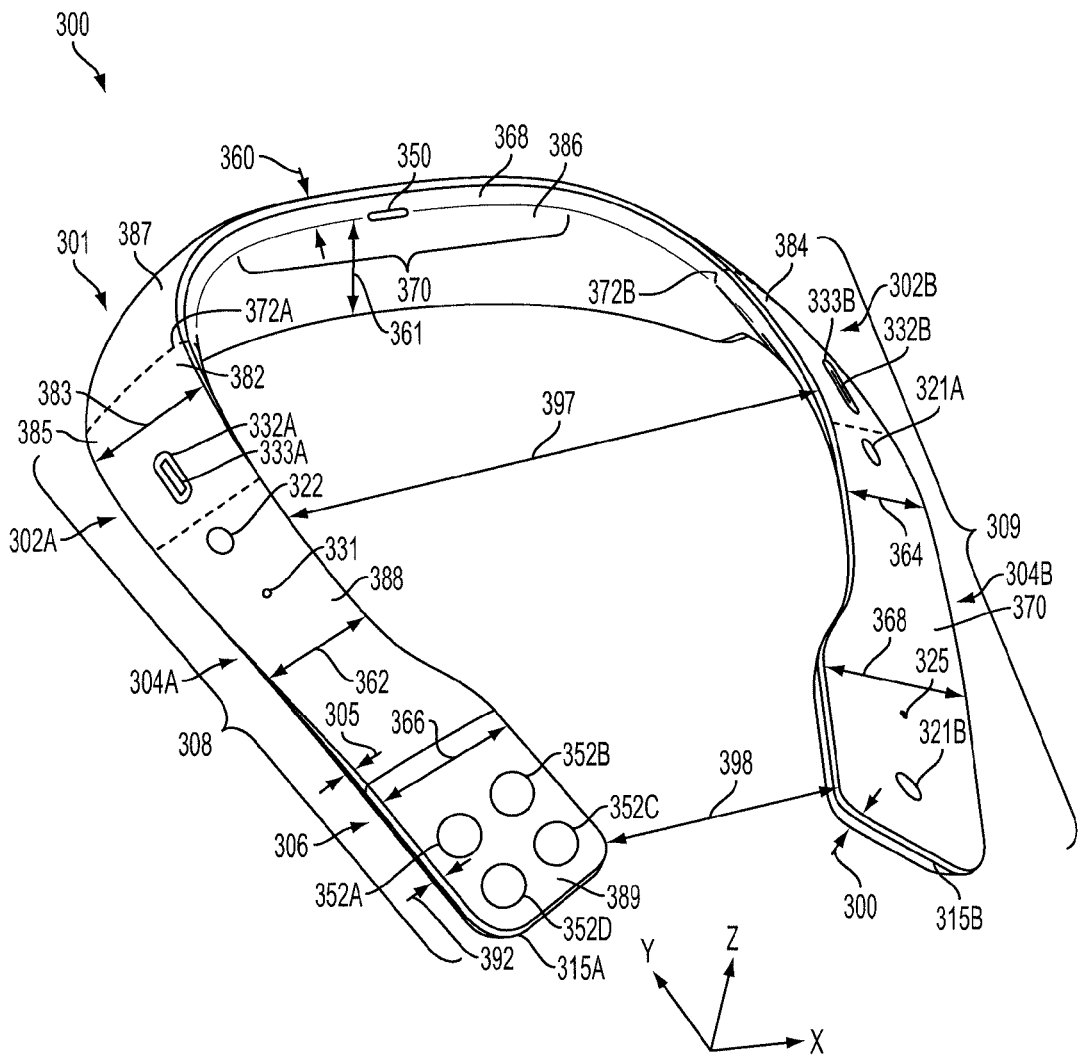
FIG. 6 illustrates a smart necklace according to an embodiment of the present invention.

FIG. 6 illustrates a smart necklace 300 according to various embodiments. The smart necklace 300 may have the same or similar dimensions and shape as the smart necklace 200. The smart necklace 300 includes an upper portion 301, a right middle portion 302A, a lower right portion 304A, a button portion 306, a left middle portion 302B and a lower left portion 304B. The smart necklace 300 is similar to the smart necklace 200 except that a light sensor 325 is positioned near but separate from a stereo camera 321B. In FIG. 6, the XYZ axis is again shown to illustrate the shape of the smart necklace 300 and the relative positioning of components.

The upper portion 301 includes a bottom surface 386 and a top surface 387 substantially opposite the bottom surface 386. A front surface 368 may be substantially perpendicular to the bottom surface 386 and the top surface 387. A back surface may exist substantially opposite the front surface. The bottom surface 386 and/or the top surface 387 may be substantially smooth. The upper portion 301 is curved such that the bottom surface 386 may rest against a user's neck when the smart necklace 300 is worn by the user. The bottom surface 386 and the top surface 387 have a distance 361, which may be considered a width. The distance 361 may be substantially even across the upper portion 301 or it may vary depending on the location of the upper portion 301. The bottom surface 386 and the top surface 387 may be separated by a distance 360, which may be considered a thickness. The distance 360 may be substantially even across the upper portion 301 or it may vary depending on the location of the upper portion 301. The distance 361 may be greater than the distance 360. This allows the smart necklace 300 to be worn more comfortably by a user.

The right middle portion 302A includes a front surface 385. The front surface 385 has a distance 383, which may be considered a width. The front surface 385 may be a continuation of the top surface 387 such that they are the same surface. A back surface substantially parallel to the front surface 385 is positioned a distance 382 (a thickness) from the front surface 385. The distance 382 is smaller than the distance 383. This allows the back surface of the right middle portion 302A to comfortably rest against a user's shoulders. Because the distance 382 is less than the distance 383, the smart necklace 300 may have a larger surface area in contact with a user's shoulders, increasing the comfort level of wearing the smart necklace 300.

The distance 382 may be similar to the distance 360, such that a thickness of the smart necklace 300 is substantially similar throughout the smart necklace 300. The distance 383 may be substantially the same as distance 361, such that the smart necklace 300 has a similar width throughout. In various embodiments, the distance 383 may be smaller or larger than the distance 361. The left middle portion 302B may be similar to the right middle portion 302A, and have a front surface 384 and a back surface substantially parallel to the front surface 384. As with the smart necklace 200, the middle portions may include speakers 332 and vibration units 333.

The lower right portion 304A may have a front surface 388. A back surface substantially parallel to the front surface 388 may exist a distance 305 (a thickness) from the front surface 388. The back surface is positioned against the user's body. The front surface 388 may have a distance 362 (a width). In various embodiments, the distance 362 may be substantially the same throughout the lower right portion 304A or the distance 362 may increase as the lower right portion 304A approaches the button portion 306. The distance 362 may be similar to the distance 383. The distance 305 may be similar to the distance 382. Accordingly, the distance 305 may be less than the distance 362. Thus, the back surface may be larger than a side surface, increasing the comfort of the smart necklace 300. As with the smart necklace 200, the lower right portion 304A includes a camera 322 and a microphone 331.

The button portion 306 may include a front surface 389. A back surface substantially parallel to the front surface 389 may exist a distance 392 (a thickness) from the front surface 389. The button portion 306 may include a distance 366 (a width). The distance 366 may be larger than the distance 362. This may allow more area on the front surface 389 for externally-positioned components, such as buttons 352. The distance 366 may be larger than the distance 392. This allows a larger surface area of the button portion 306 to be positioned against a user, increasing comfort of the smart necklace 300. As with smart necklace 200, the button portion 306 includes four buttons 352. In various embodiments, the button portion 306 may include more or less buttons.

In some embodiments, two buttons are raised from the button portion 306 (in the positive Z direction) and two buttons are lowered from the button portion (in the negative Z direction). For example, the button 352A and the button 352B may be positioned above (in the Z direction) a plane defined by a surface of the button portion 306 and the button 352C and the button 352D may be positioned below (in the negative Z direction) a plane defined by the surface of the button portion 306. This allows users to easily distinguish each button. Similarly, a notch is present in between each of the buttons 352 to increase the ability of the user to distinguish each button.

The lower left portion 304B may have similar dimensions to the combination of the lower right portion 304A and the button portion 306, including a front surface 370 and a back surface substantially parallel to the front surface 370. In various embodiments, the dimensions of the lower left portion 304B may vary from the dimensions of the combination of the lower right portion 304A and the button portion 306. As with the smart necklace 200, the lower left portion 304B includes a stereo camera 321A positioned proximal to the left middle portion 302B and a stereo camera 321B positioned distal to the left middle portion 302B. The lower left portion 304B also includes a light sensor 325 positioned distal to the left middle portion 302B. The lower left portion 304B differs from the lower left portion 204B in that the light sensor 325 is positioned separate from the stereo camera 321B.

In various embodiments, some or all components may be switched between the lower right portion 304A and the button portion 306 and the lower left portion 304B. In various embodiments, the button portion 306 may be positioned adjacent the lower left portion 304B instead of the lower right portion 304A. The button portion 306 is such named because buttons 352 are positioned on the button portion 306. In various embodiments, the button portion 306 may include additional components and/or may not include the buttons 352.

A distance 397 exists between the lower right portion 304A and the lower left portion 304B proximal to the middle portions 302. A distance 398 exists between the right end 315A and the left end 315B. In various embodiments, the distance 398 and the distance 397 may vary based on forces applied to the semi-rigid middle portions 302. Accordingly, the distance 397 and the distance 398 may increase in order to allow a user to put the smart necklace 300 around the user's neck and then the distances may decrease once the smart necklace 300 is positioned on the user's neck. In a resting position (i.e., without external force applied to the smart necklace 300), the distance 397 may be greater than the distance 398. This may allow the right end 315A to begin to approach the left end 315B, thus allowing the smart necklace 300 to become more secure to a user.

In various embodiments, each of the portions of the smart necklace 300 may have a width that is substantially larger than a thickness. For example, the width of each part may be between two and twenty times as large as the thickness of each part. In various embodiments, the width of each part may be between 3 and 6 times as large as the thickness of each part. The ratio of width to thickness results in each part being substantially flat, causing the smart necklace 300 to be comfortable when worn by the user.

Figure 7:
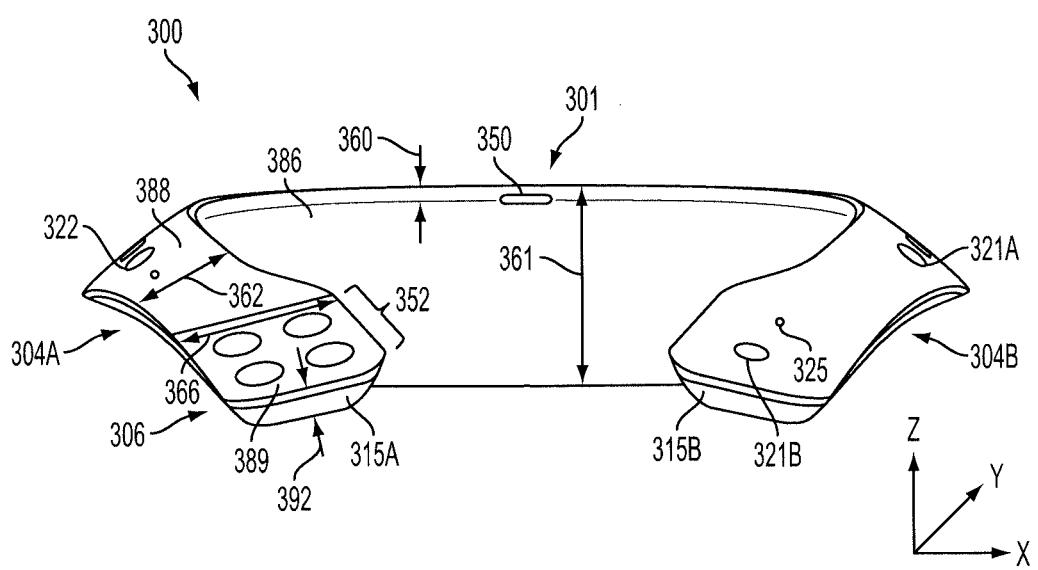
FIG. 7 illustrates a view of the smart necklace of FIG. 6 from a bottom of the smart necklace according to an embodiment of the present invention.

FIG. 7 illustrates a view of the smart necklace 300 from the bottom (i.e., along the Y axis). As illustrated in FIG. 5, the distance 366 is greater than the distance 392. In various embodiments, the distance 366 may be two, three, four or more times as large as the distance 392. The same or a similar relationship may exist between distance 361 and distance 360. In various embodiments, the distance 361 may be greater than the distance 366. This allows larger (and thus potentially heavier) components to be positioned in the upper portion 301 than the button portion 306. This may be ideal for optimal comfort and balancing of components within smart necklace 300.

The distance 366 may be greater than the distance 362. It may be easier for a user to interact with the smart necklace 300 at the right end 315A and/or the left end 315B than a position more proximal to the upper portion 301. Because of this, the larger distance 366 may provide more surface area for user interaction proximal to the right end 315A and/or the left end 315B.

Figure 8A:
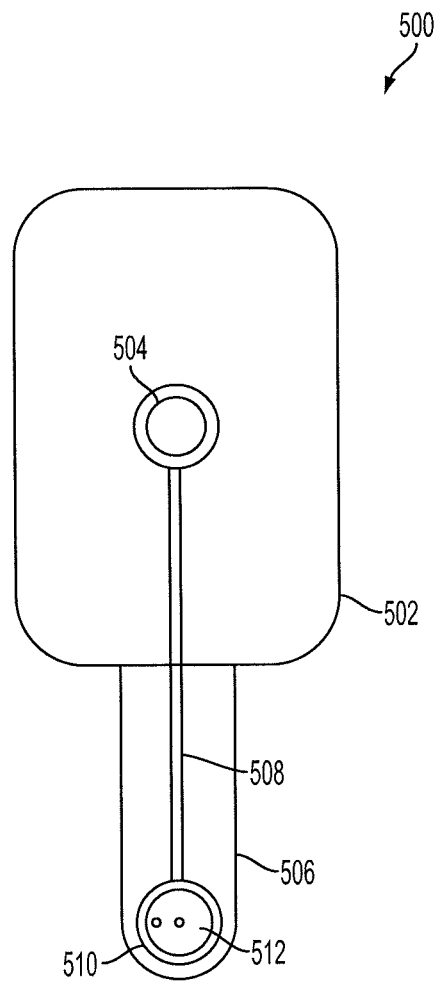
FIG. 8A illustrates a portable charging unit for use with a smart necklace according to an embodiment of the present invention.

FIG. 8A illustrates a portable charging unit 500 for use with a smart necklace, such as smart necklace 100, 200 and/or 300. The portable charging unit 500 may be relatively lightweight such that a user of a smart necklace may also easily carry the portable charging unit 500 in a purse or pocket. The portable charging unit 500 may be used to recharge a battery of the smart necklace or provide additional power to the smart necklace. The portable charging unit 500 includes a battery 502, a strap 506 coupled to the battery 502, a connector 512 and a charging contact 510 coupled to the strap 506, a connection 508 coupled to the charging contact 510 and the battery 502, and an indent and connector 504.

The battery 502 may be adapted to receive, store and discharge energy. The charging contact 510 may be positioned on a charger such that energy may be received by the charging contact 510 and travel to the battery 502 for storage via the connection 508. The connector 512 may be a snap connector, a magnetic connector or the like, and may be adapted to attach the strap 506 to a charging device. The indent and connector 504 may include a snap connector, a magnetic connector or the like such that the connector 512 may attach to the indent and connector 504 for ease of storage. The battery 502 may be any type of battery capable of storing a charge. The strap 506 may be a malleable material such that the connector 512 and the charging contact 510 may be easily positioned adjacent a connector and charging contact of the smart necklace.

Figure 8B:
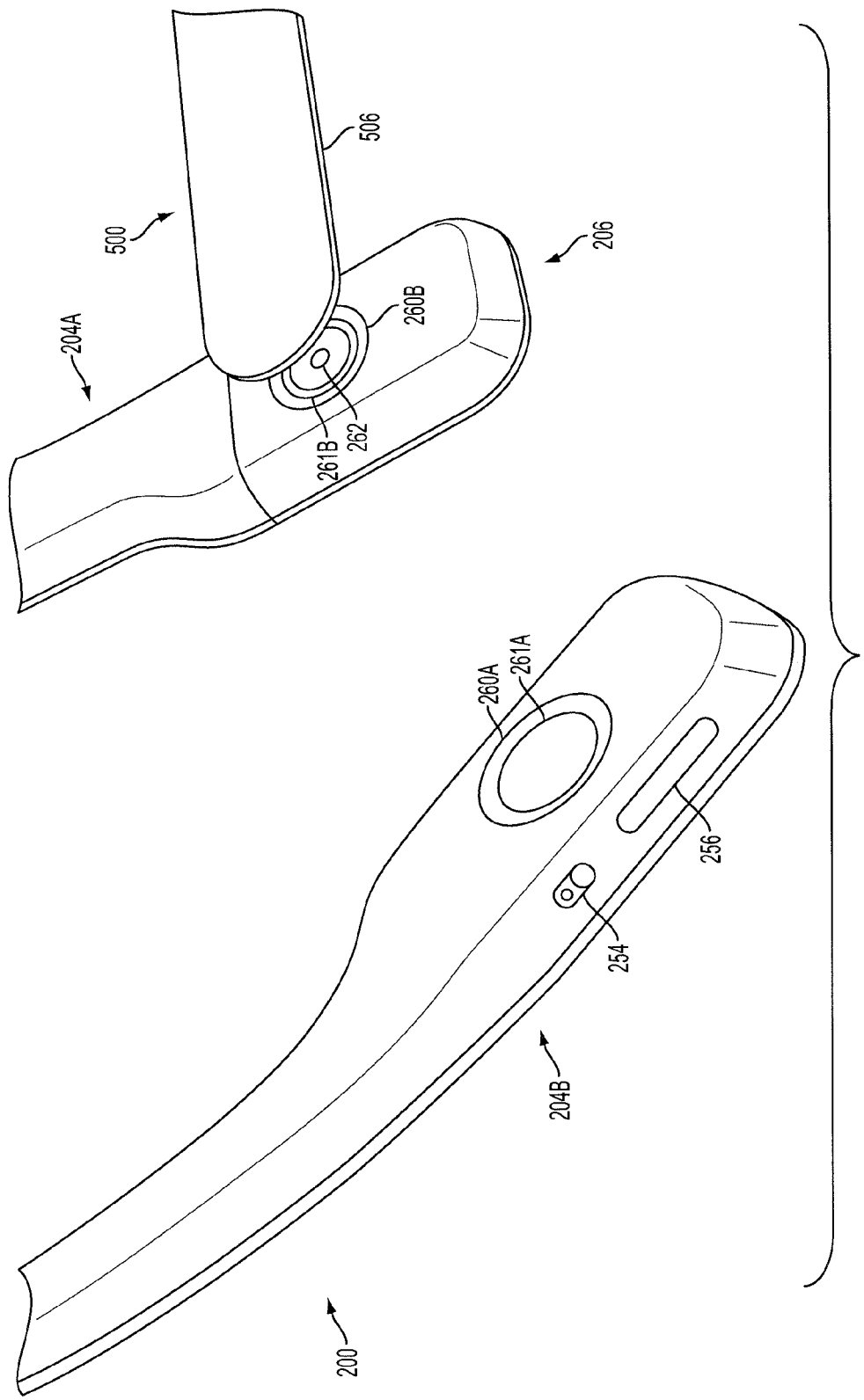
FIG. 8B illustrates the portable charging unit of FIG. 8A connected to a smart necklace according to an embodiment of the present invention.

FIG. 8B illustrates how the portable charging unit 500 may connect to and charge a smart necklace 200. As illustrated, the button portion 206 includes the indent 260B, the connector 261B and the charging contact 262. The charging contact 262 of the smart necklace may contact the charging contact 510 of the portable charging unit 500. Power may be transferred between the portable charging unit 500 and the smart necklace 200 via the charging contact 262 and the charging contact 510. The connector 512 of the portable charging unit 500 is adapted to attach to the connector 261B of the smart necklace 200 such that the charging contact 262 remains adjacent to or in contact with the charging contact 510. The connector 512 is adapted to be positioned within the indent 260 to accommodate a better physical connection between the smart necklace 200 and the portable charging unit 500. This increases the likelihood that the portable charging unit 500 will not separate from the smart necklace 200 until so desired.

In various embodiments, the charging contact 262 may be electrically coupled to the processor 211 and be adapted to receive and transmit data signals. This allows the smart necklace 200 to connect to a mobile device, a computer, a tablet or the like via the charging contact 262. The smart necklace 200 may be adapted to transmit data to and receive data from the mobile device, laptop, tablet, portable charging unit 500 or the like via the charging contact 262.

In various embodiments, it may be desirable for the ends of a smart necklace to be attached together to provide a more secure fit of the smart necklace to a user. In various embodiments, this connection may include an electrical connection such that data may transfer between the two ends without traveling through the upper portions.

Figure 9A:
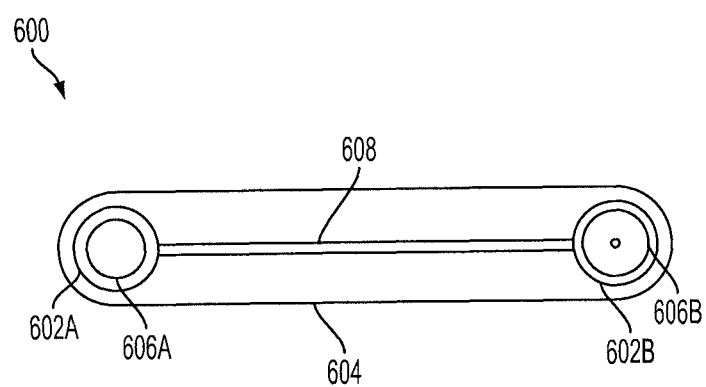
FIG. 9A illustrates a strap attachment that is adapted to attach distal ends of a smart necklace to each other according to an embodiment of the present invention.

FIG. 9A illustrates a strap attachment 600 that is adapted to attach the distal ends of a smart necklace to each other. The strap attachment 600 includes a strap 604, a connector 602A and a connector 602B. In various embodiments, the connectors 602 may include communication contacts 606. In these embodiments, a connection 608 may exist between the communication contacts 606. The connectors 602 may be snap connectors, magnetic connectors or the like. The strap 604 may be made of any flexible, semi-rigid or rigid material. The communication contacts 606 may be a contact of capable of transmitting and receiving data signals. The connection 608 may be a cable, a wire, a wireless connection or the like that is capable of facilitating data transfer.

Figure 9B:
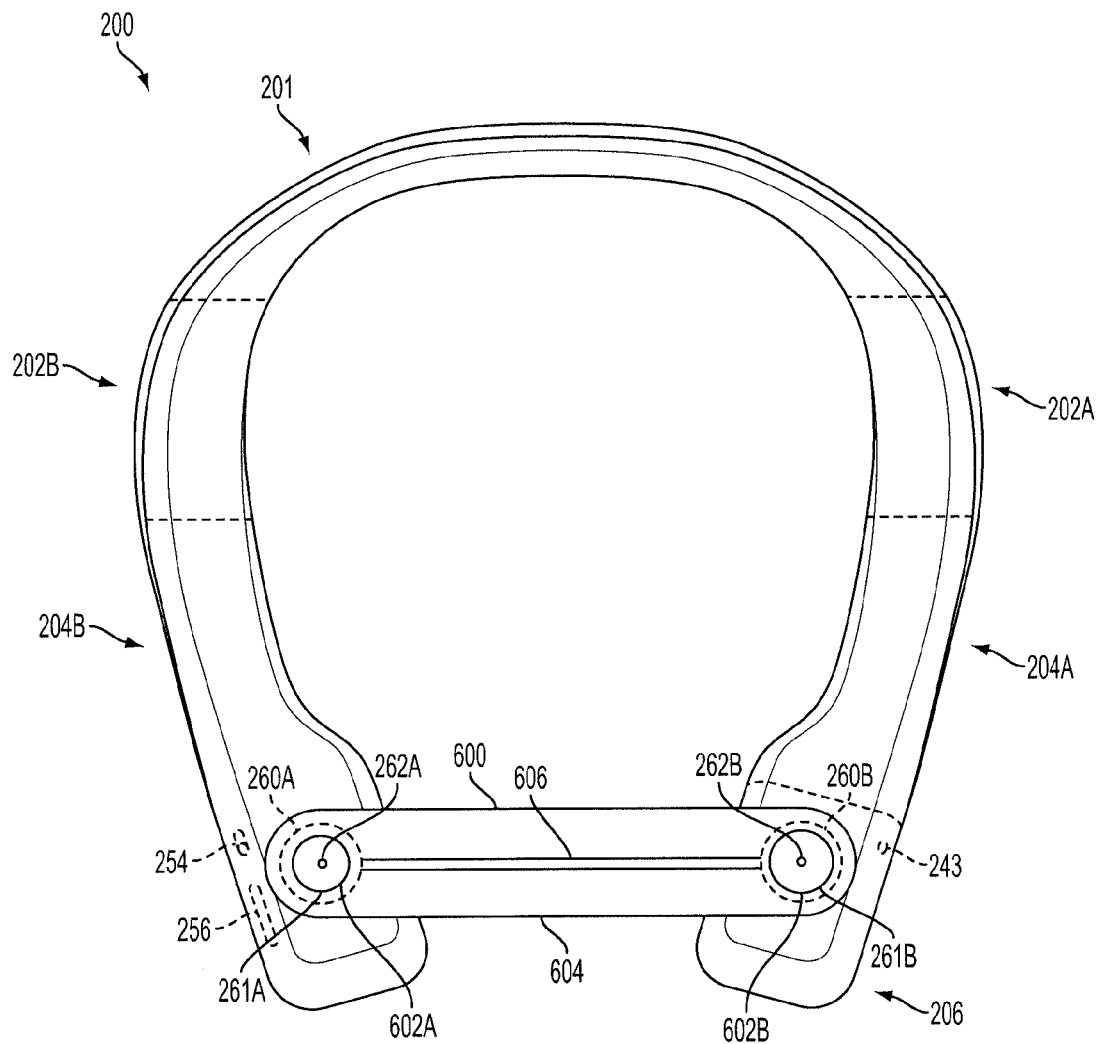
FIG. 9B illustrates the strap attachment of FIG. 9A connected to a smart necklace according to an embodiment of the present invention.

FIG. 9B illustrates strap attachment 600 connected to the smart necklace 200. In the embodiment illustrated in FIG.

9B, a charging contact 262A is positioned within the indent 260A. As illustrated, the connector 602A may attach to the connector 261A and the connector 602B may attach to the connector 261B. In this manner, the strap attachment 600 may provide additional support to increase the likelihood that the smart necklace 200 will remain in the desired position on a user.

In various embodiments, the communications contact 606B may become in contact with the charging contact 262B, and the communication contact 606A may be in contact with the charging contact 262B. In this manner, the charging contacts 262 may transmit and receive data via the communication contacts 606. This data may transfer between the charging contacts 262 via the connection 608 of the strap attachment. This may allow components at the ends of the smart necklace 200 to transfer data over a shorter connection distance, allowing faster communications between the components.

Figure 10A:
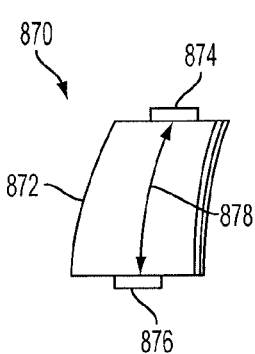
FIG. 10A illustrates a first insert that is configured to be attached to a smart necklace in order to enlarge the size of the smart necklace according to an embodiment of the present invention.

It may be desirable to change the size of a smart necklace in order to better fit people having different dimensions. FIG. 10A illustrates a first insert 870 that is configured to be attached to a smart necklace in order to enlarge the size of the smart necklace. The first insert 870 includes a body 872 that may have the same dimensions in the X direction and the Z direction as a middle portion and/or a lower portion. The first insert 870 may have a relatively small distance in the Y direction such that it does not drastically alter the dimensions of the smart necklace when attached.

The first insert 870 also includes a proximal connector 874 and a distal connector 876. A connection 878 may exist between the proximal connector 874 and the distal connector 876 such that data may transfer between the proximal connector 874 and the distal connector 876 via the connection 878. In various embodiments, the proximal connector 874 and the distal connector 876 may include a mechanical connector and an electrical connector, such that the proximal connector 874 and the distal connector 876 may allow the transfer of data as well as secure the first insert 870 to the smart necklace. In various embodiments, separate electrical and mechanical connectors may exist instead of the proximal connector 874 and the distal connector 876.

Figure 10B:
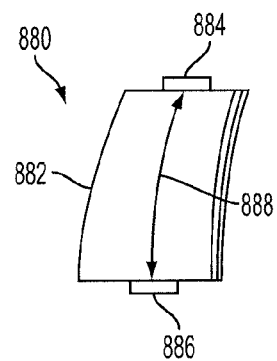
FIG. 10B illustrates a second insert that is configured to be attached to a smart necklace in order to enlarge the size of the smart necklace according to an embodiment of the present invention.

FIG. 10B illustrates a second insert 880. The second insert 880 is similar to the first insert 870 except the second insert 880 has a larger distance in the Y direction. The second insert 880 includes a proximal connector 884, a distal connector 886, a body 882 and a connection 888. The second insert 880 may have a larger distance in the Y direction than the first insert 870 so that a smart necklace may be more accurately constructed to fit a user. Otherwise, the second insert 880 is similar to the first insert 870.

Figure 10C:
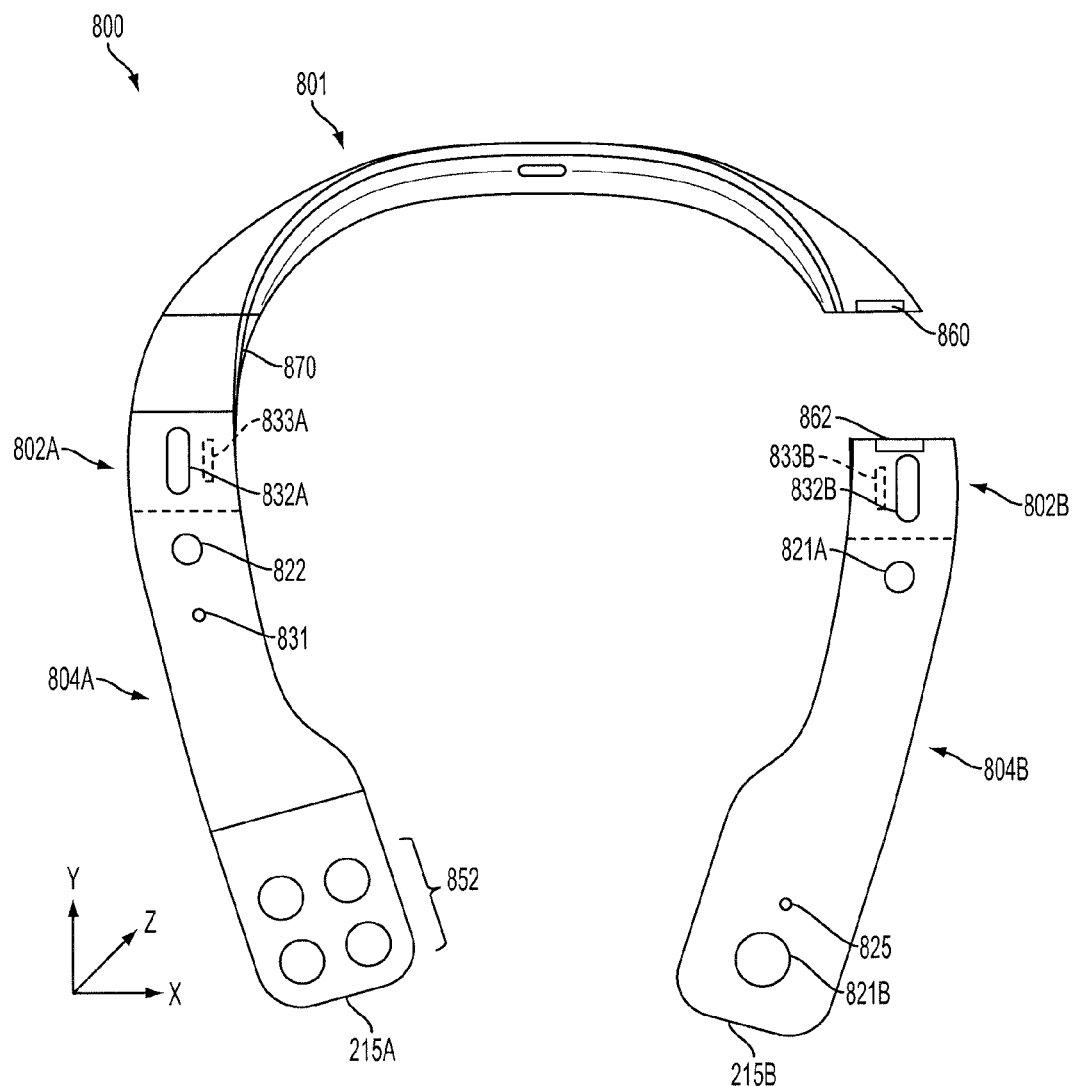
FIG. 10C illustrates a smart necklace including the first insert of FIG. 10A and where a upper portion of the smart necklace is disconnected from a left middle portion of the smart necklace according to an embodiment of the present invention.

FIG. 10C illustrates a smart necklace 800 including a first insert 870 and where the upper portion 801 is disconnected from the left middle portion 802B. As illustrated, the first insert 870 is positioned between the upper portion 801 and the right middle portion 802A. This allows a distance from the upper portion 801 to the right end 215A to be larger, enabling the smart necklace 800 to be worn by a person having larger dimensions. In various embodiments, the first insert 870 may attach to the upper portion 801 and/or the right middle portion 802A via screws, snap connectors or the like. It is preferred that the proximal connector 874 and the distal connector 876 provide a sufficiently strong connection such that the right middle portion 802A and the upper portion 801 do not disconnect from the first insert 870 during normal use of the smart necklace 800.

The upper portion 801 and the left middle portion 802B are disconnected to illustrate how an insert, such as the first insert 870, can attach to the smart necklace 800. The upper portion includes a proximal connector 860 at one or both ends of the upper portion 801. The left middle portion 802B includes a distal connector on the upper end of the left middle portion 802B. The proximal connector 860 and/or the distal connector 862 may be mechanical and/or electrical connectors. In various embodiments, separate mechanical and/or electrical connectors may exist instead of the proximal connector 860 and the distal connector 862.

The proximal connector 874 of the first insert 870 is adapted to attach to the proximal connector 860. The distal connector 876 of the first insert 870 is adapted to attach to the distal connector 862. Data may transfer between the proximal connector 860 and the distal connector 862 via the proximal connector 874, the distal connector 876 and the connection 878. In this manner, the first insert 870 provides a mechanical and electrical connection between the upper portion 801 and the left middle portion 802B.

Similarly, when no insert is included with the smart necklace 800, the left middle portion 802B may attach to the upper portion 801 via the proximal connector 860 and the distal connector 862.

The smart necklace 800 differs from the smart necklace 200 and the smart necklace 200 in that separate speakers 832 and vibration units 833 are provided. In the smart necklace 800, the vibration unit 833A is positioned substantially adjacent the speaker 832A. In various embodiments, the vibration unit 833A may be positioned closer or farther to the speaker 832A than illustrated in FIG. 10C. The smart necklace 800 also differs from the smart necklace 200 and the smart necklace 200 in that no button portion is present on the smart necklace 800. The smart necklace 800 may include the same dimensions as the smart necklace 200 and the buttons may be positioned on the lower right portion 804A.

Figure 11A:
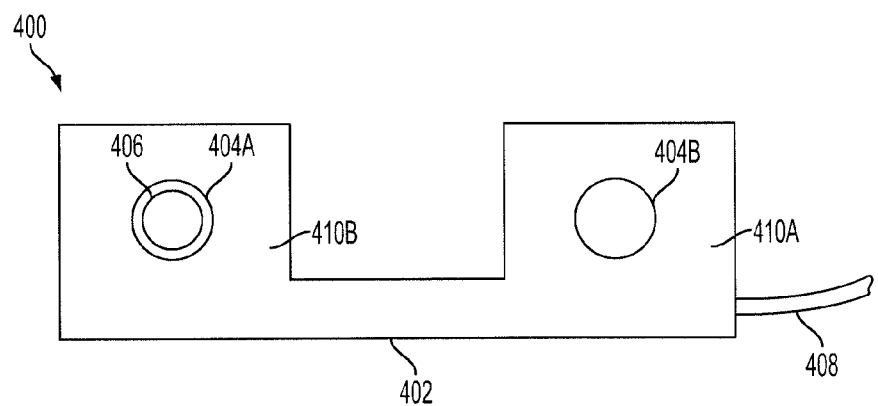
FIG. 11A illustrates a charging unit configured to charge a smart necklace according to an embodiment of the present invention.

FIG. 11A illustrates a charging unit 400 configured to charge a smart necklace, such as smart necklace 200. The charging unit 400 includes a base 402, a post 410A and a post 410B. The posts 410 extend away from the base and each include a connector 404. The connectors 404 may be snap connectors, magnetic connectors or the like. The post 410B includes a charging contact 406 that is adapted to charge the smart necklace. The charging unit 400 also includes a power line 408 that is adapted to transmit power from a source, such as a wall outlet, to the charging contact 406. The base 402 is adapted to rest on a substantially flat surface such that the posts 410 extend upward from the substantially flat surface. The base provides sufficient support that when a smart necklace is charging on the charging unit 400, the charging unit 400 remains in the upright position.

Figure 11B:
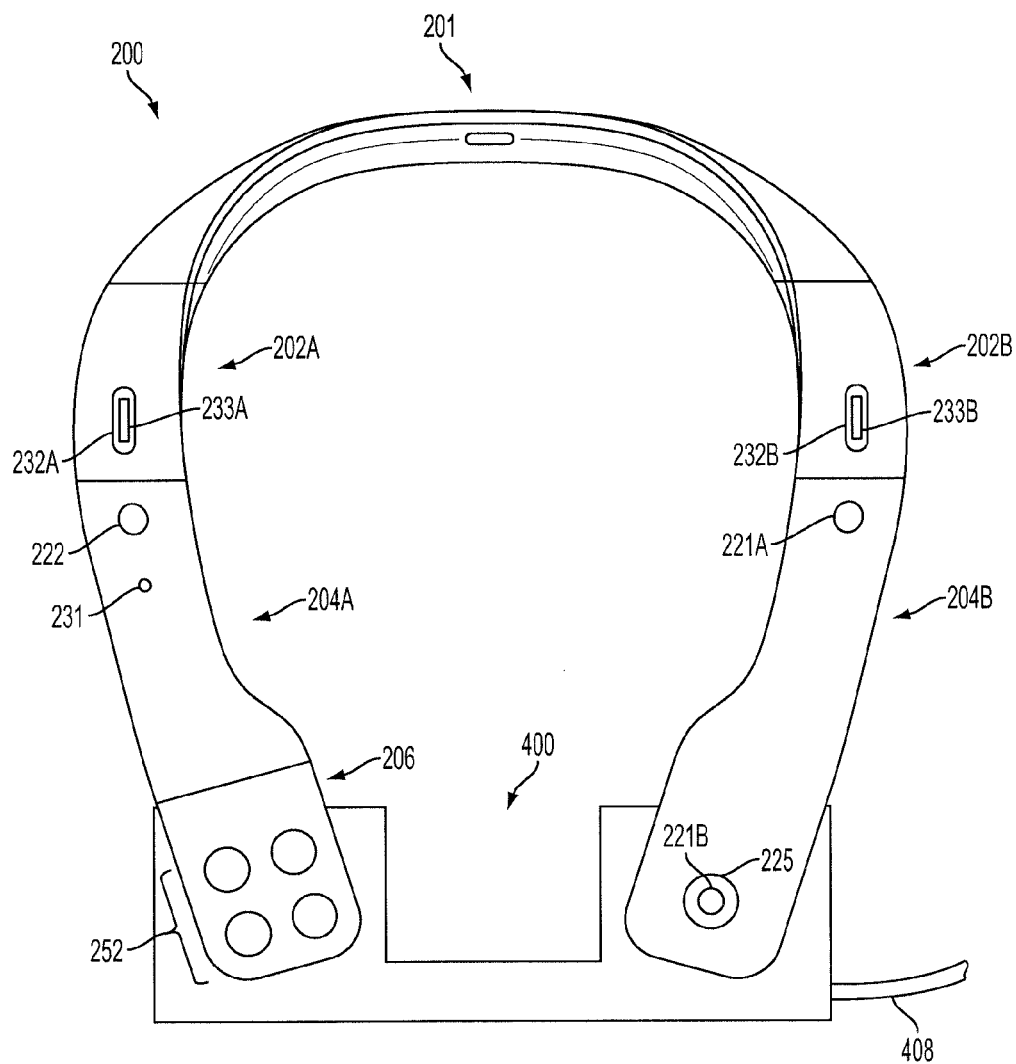
FIG. 11B illustrates a smart necklace positioned on the charging unit of FIG. 11A according to an embodiment of the present invention.

FIG. 11B illustrates the smart necklace 200 positioned on the charging unit 400. The connector 404A of the charging unit 400 is adapted to attach to the connector 261B, and the connector 404B of the charging unit 400 is adapted to attach to the connector 261A. This allows the smart necklace 200 remain attached to the charging unit 400 while charging. In preferred embodiments, the base 402 is adapted to hold the smart necklace 200 in an upright position, as illustrated in FIG. 11B. The charging contact 406 is adapted to allow power to transfer from the power line 408 to the smart necklace 200 via the charging contact 262. In various embodiments, the charging unit 400 may attach to another device, such as a mobile device, a computer, or the like, via the power line 408 or another electrical connection. In this manner, data may transfer between the portable device, computer, or the like and the smart necklace 200 via the charging contact 406 of the charging unit 400 and the charging contact 262.

In various embodiments, the charging unit 400 is adapted to cause the smart necklace 200 to be positioned in an upright position such as that illustrated in FIG. 11B. A user may leave the smart necklace in an ON position while the smart necklace is connected to the charging unit 400. In this manner, the smart necklace 200 may provide environmental awareness and social interaction to a user while positioned on the charging unit 400.

Figure 12:
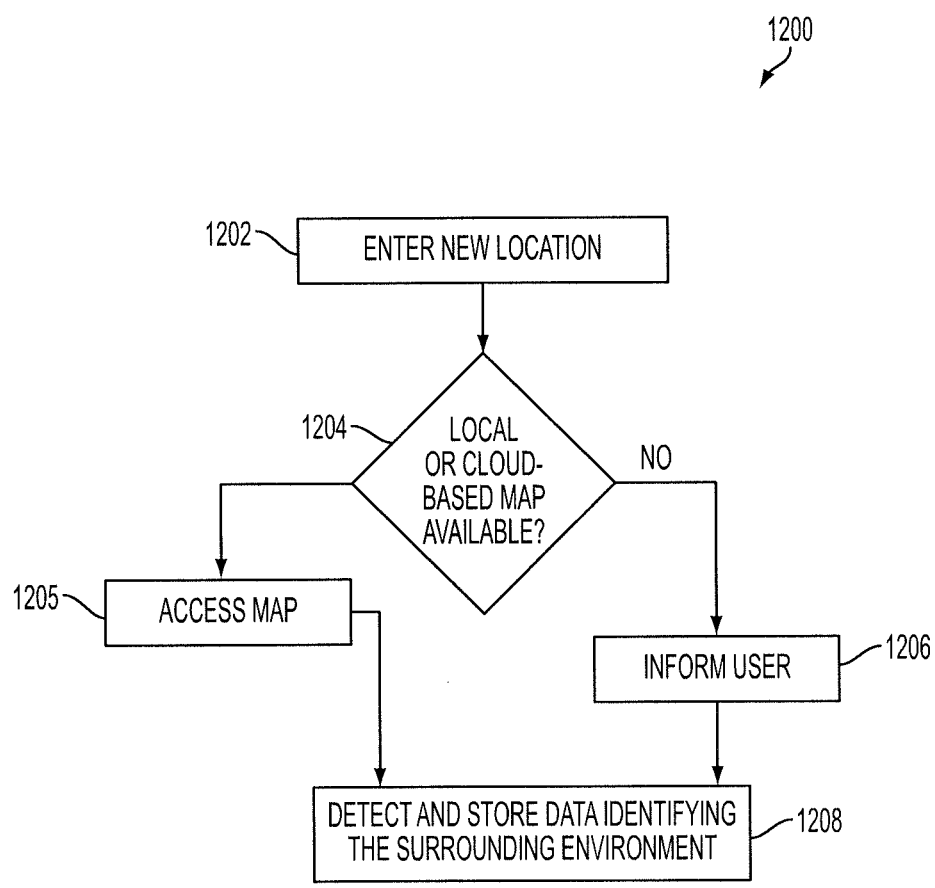
FIG. 12 illustrates a method for updating location information in a memory of a smart device according to an embodiment of the present invention.

FIG. 12 illustrates a method 1200 for updating location information in a memory, such as memory 112. The method 1200 may be performed by a processor, such as processor 111. The method 1200 may be performed within the map updating module 156. The method 1200 may be performed on a smart device, such as the smart necklace 100, or another smart device, such as a smart clip, smart glasses or the like.

In block 1202, the smart necklace 100 may arrive at a new location. The location may be an outdoor region, an indoor facility such as a mall or shopping center, or the like. In block 1204, it is determined whether a map of the new location is available. The processor 111 may search the memory 112 to determine if a map is available within the memory 112. If a map is not available in the memory 112, then the processor 111 may, via the antenna 142, search a remotely-connected device and/or the cloud for a map of the new location. The map may include any type of location information, such as image data corresponding to a location, GPS coordinates or the like.

In block 1205, if a map is available, then the processor 111 may retrieve the map. In various embodiments, the processor 111 may store the map in the memory 112 if the map was retrieved from a remote device or the cloud. If no map is available, the processor may inform the user via the interface array 130 that no map is available in block 1206. In this way, the user can know that no map data is available. This allows the user to search for a map of the area if he so desires.

In block 1208, data such as location information, such as from the IMU 123 and/or the GPS 124, and/or image data, such as from the pair of stereo cameras 121 and/or the camera 122, may be detected. This data may be used to identify the current location and the surrounding environment. For example, image data can be parsed into detectable shapes such as doors, store signs or the like, and the data may be associated with a position on a map. If a map of the location had been found, this newly detected data may be compared to data associated with the retrieved map. The processor 111 may compare the detected image data to the image data associated with the map. If the detected image data matches the stored image data, then the processor 111 may determine the position of the smart necklace 100 based on the match. If the smart necklace is moved to a new location, the processor 111 may receive positioning data from either the IMU 123 or the GPS 124. The processor 111 may be able to determine the new location of the smart necklace 100 based on the previous location and the positioning data.

If the data associated with the position on the retrieved map is incorrect, the processor 111 may replace the incorrect data with the newly detected data. The smart necklace 100 and other smart devices may share a map. For example, the map may be accessible via the cloud. As each smart device detects objects in an area covered by a shared map, each smart device may update the map, such that the aggregation of updates by the smart devices results in an accurate map.

If no map is available, the processor 111 may create a map within the memory 112, the cloud and/or the remote device. The new map may be continuously updated as new data is detected, such that a map of the location including associated data can be generated based on the detected data.

In some embodiments, a physical map of the new location may be present. For example, some malls include directories having map information. The smart necklace 100 may detect this visual map and create a new map within the memory 112 or the cloud based off of the physical map. In various embodiments, the physical map may also include instructions for downloading a virtual map of the area. For example, the instructions may include a web address, a quick response code (QR code), or the like. A smart necklace 100 may access the web address, scan the QR code, etc. to cause the map to be downloaded to the memory 112 or the cloud such that the smart necklace 100 can access the new map.

Figure 13:
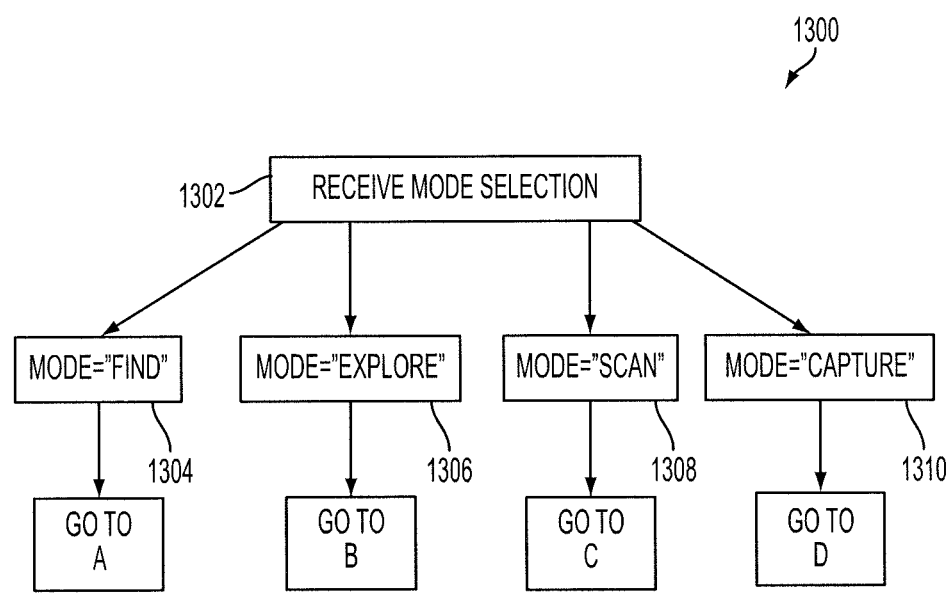
FIG. 13 illustrates a method for selection of a mode of a smart device according to an embodiment of the present invention.

FIG. 13 illustrates a method 1300 for selection of a mode of a smart device, such as smart necklace 100. The method 1300 may be performed within the mode selection module 158. In block 1302, a mode selection is received. This mode selection may be received via the input device 134. For example, the smart necklace 100 may include a plurality of buttons such that each button is associated with a mode. The user may depress a particular button to cause the associated mode to operate. In various embodiments, the mode selection is performed based on input from the microphone 131. For example, the user may say a command that is associated with a particular mode or sub-mode. In response to receiving the command, the smart necklace 100 may operate in the associated mode or sub-mode. In various embodiments, the smart necklace 100 may include a touch screen such that mode selection may be performed using the touch screen. In various embodiments, mode selection may be determined based on visual data from the stereo camera 121 and/or the camera 122. For example, a particular gesture by the user may indicate selection of a mode or sub-mode, such that upon detection of the gesture, the smart necklace will operate in the associate mode.

In block 1304, if the selected mode is the find mode, the method may proceed to Location A. In block 1306, if the selected mode is explore mode, the process may proceed to Location B. In block 1308, if the selected mode is the scan mode, then the process may proceed to Location C. In block 1310, if the selected mode is the capture mode, then the process may proceed to Location D.

Figure 14:
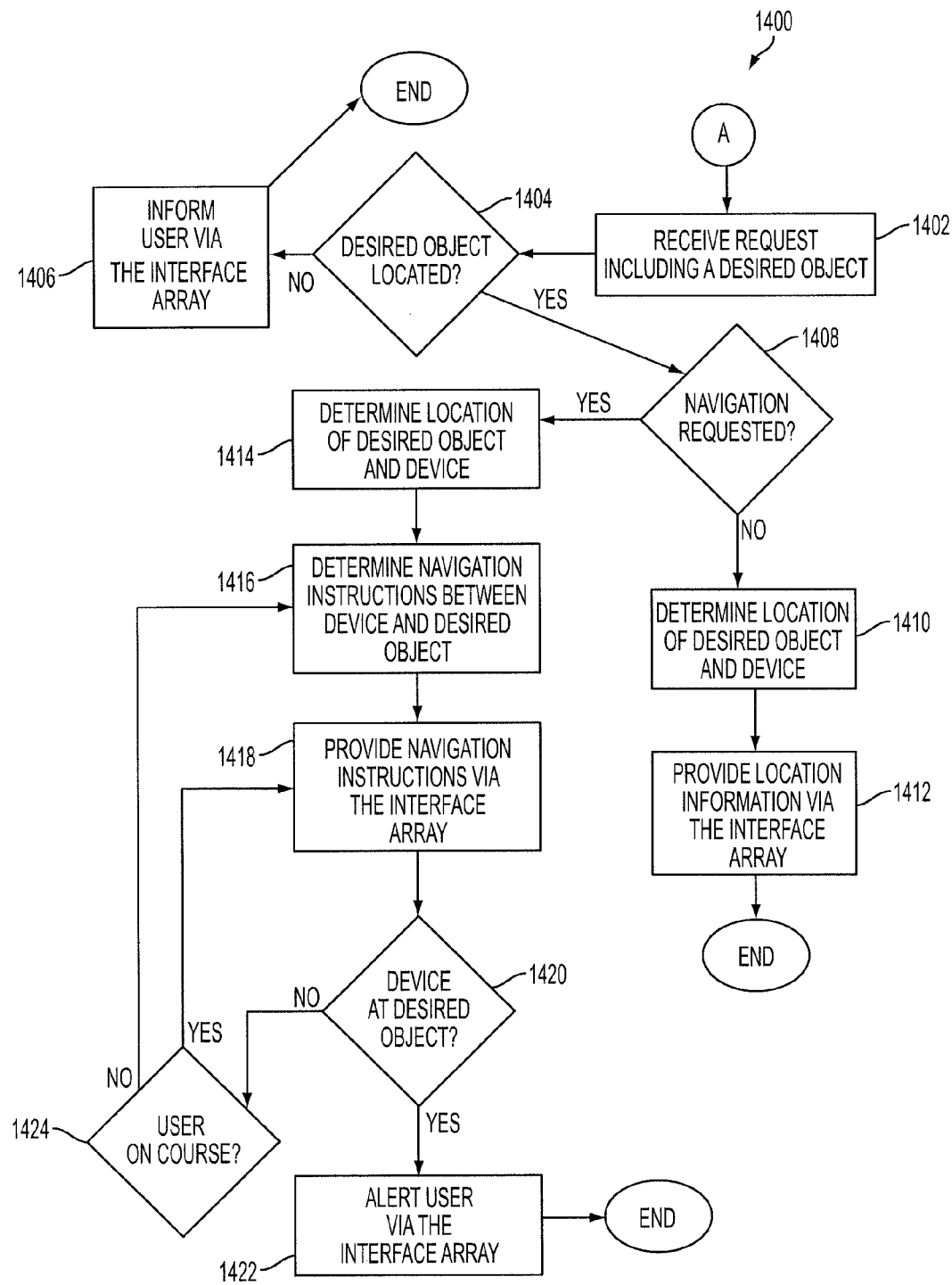
FIG. 14 illustrates a method to be performed if a selected mode of a smart device is a find mode according to an embodiment of the present invention.

FIG. 14 illustrates a method 1400 to be performed if the selected mode is the find mode. The method 1400 may be performed in the find module 160. In block 1402, a request is received that includes a desired object, place, or person. This request may be a verbal command, such as "navigate to Macy's," "where is Belks," "take me to the exit," or the like. In various embodiments, the request may be input by the user via the input device 134, such as by typing on a keypad or a touchscreen.

In block 1404, the processor 111 determines whether the desired object has been located in the memory 112. In order to locate the desired object, person, or place, the processor 111 may search data in an accessible memory for the object, person or location. For example, the data may include a store directory within a mall. If the desired object is a store, such as Sears, the desired object is found if a map including data associated with Sears is found. Additionally, the processor may access the memory 112 and/or the cloud to determine any information associated with the desired object, person or place, such as image data, location data, or the like. For example, the data may include an image of Sears. If the desired object has been located in memory, data associated with the desired object, person or place will be retrieved by the processor 111. The data may include any map data, image data, location data or the like.

In block 1406, if the desired object is not located, then the processor 111 may inform the user via the interface array 130. For example, a particular combination of tones and/or vibrations may be provided to the user. Also, the speakers 132 may output audio, such as "[the desired object] is not found." In various embodiments, the smart necklace 100 may request additional information from the user. For example, the smart necklace 100 may request another name for the desired object, person or place. In various embodiments, the processor 111 may search a memory in the cloud or may search the internet for map data or other data indicating the location of the desired object, person or place.

In block 1408, if the desired object, person or place has been located, then the processor 111 determines whether navigation has been requested. In some embodiments, this may be determined based on the request from block 1402. For example, if the user says "navigate to Macy's," it may be determined in block 1408 that navigation is requested. However, if the user says "where is Belks," the smart necklace 100 may determine that navigation is not requested. The smart necklace 100 may be designed such that certain words indicate navigation requests and certain words indicate no navigation request.

The smart necklace 100 may also learn preference data of the user. For example, during previous iterations of method 1400 within a particular area, the user may have never requested navigation. After a certain number of iterations within the particular area without navigation requests, the processor 111 may determine that the user does not desire navigation within this particular area.

In block 1410, if navigation was not requested, then the smart necklace 100 may determine the location of the desired object, person or place on a map. The smart necklace 100 may also determine the location of the smart necklace on the map such that directional instructions between the smart necklace 100 and the object, person or place may be determined. In various embodiments, the smart necklace 100 may determine the location of the object, person or place relative to the smart necklace 100 instead of or in addition to utilizing the map.

In block 1412, the location information may be provided to the user via the interface array 130. The location information may be considered angular information, as the location information includes a direction (angular) in which the desired object, person or place is located. The directional information may be provided in a clock-face type, directional type or the like. This information may be provided via the speaker 132 and/or the vibration unit 133. The location information may be provided in multiple manners, and the particular manner may be determined based on user preferences. For example, the smart necklace 100 may provide output such as "Macy's is 200 yards to your 2 o'clock," "Belks is upstairs to your left," "Sears is 100 yards forward and 200 yards to the left," a particular vibration pattern or the like.

Returning to block 1414, if it is determined that navigation is requested, the location of the desired object, person or place is determined and the location of the smart necklace 100 is determined. The processor 111 may search data in the memory 112, such as map data, to determine the location of the desired object, person or place. In some embodiments, the processor 111 may recognize objects within the FOV of the pair of stereo cameras 121 and/or the camera 122. The processor 111 may determine if the desired object, person or place is one of the recognized objects.

The location of the smart necklace may be determined using a map and positioning data, such as from the IMU 123 and/or the GPS 124. Image data from the pair of stereo cameras 121 and/or the camera 122 may be utilized instead of or in addition to the positioning data. In some embodiments, a map may include image data such that the processor 111 may compare detected image data to the image data associated with the map and determine the location of the smart necklace 100 based on the image data. In various embodiments, the processor 111 may determine positioning based on any combination of positioning data from the GPS 124, positioning data from the IMU 123, image data from the pair of stereo cameras 121, image data from the camera 122 and sensed data from the sensor 125. Inertial movement data, such as from the IMU 123, may be used by the processor 111 to track the current location of the smart necklace as the user moves.

In addition, data collected using the GPS 124 can enhance identification of data collected by the camera 122. For example, if the camera 122 provides an image of the building, the processor 111 can determine if the building is detected correctly by utilizing data regarding the location of the user in the world, because building types differ in different parts of the world.

The GPS information may be inadequate because it may not provide sufficiently detailed information about the surrounding environment. However, the GPS information can be utilized along with visual data from the camera 122 to draw inferences that are helpful to the user. For example, if the GPS information indicates that the smart necklace 100 is currently inside a building, and the camera 122 provides information regarding an object, the processor 111 can limit its search to objects that would rationally be inside the building. For example, if an image provided by the camera 122 appears like a truck, the processor 111 can rule out the possibility that the object is a truck based on the GPS information. In other words, it is more likely to be an image of a poster of a truck, because the poster can rationally be within a building and a truck cannot. The GPS 124 provides location information, which along with the inertial guidance information, including velocity and orientation information provided by the IMU 123, allows the processor 111 to help direct the user.

In block 1416, the smart necklace 100 may determine navigation instructions between the smart necklace 100 and the desired object, person or place. The navigation instructions may be referred to as angular information because they include at least one direction (an angle) in which the user should move to reach the desired object, person or place. The angular information may be given in a clock-face format, an angular format (e.g., 20 degrees to the right) and/or directional format. The navigation instructions may be determined based on map data and/or data detected by the sensor array 120. In block 1416, non-traversable regions may be detected. These regions may be stored in the map data and/or may be detected by the sensor array 120. An example of a non-traversable region would be an area in which a wall exists.

The navigation instructions include a path over which the user may travel, and exclude the non-traversable regions if the processor has detected these regions. The navigation instructions may be further modified for the user's needs. For example, a blind person may prefer routes that follow walls. Using the IMU 123 and/or the GPS 124 and other sensors, the smart necklace 100 can determine the user's location and orientation to guide them along the path, avoiding obstacles.

In block 1418, navigation instructions may be provided to the user via the interface array 130. While travelling along the path, the smart necklace 100 may inform the user about signs or hazards along the path. The vibration unit 133 and/or the speaker 132 provide audio and haptic cues to help guide the user along the path. For example, the speaker 132 may play a command to move forward a specified distance. Then, special audio tones or audio patterns can play when the user is at a waypoint, and guide the user to make a turn by providing additional tones or audio patterns. A first tone, audio pattern or vibration can alert the user to the start of a turn. For example, a single tone or a vibration from a left smart necklace may indicate a left turn. A second tone, audio pattern or vibration can alert the user that the turn is complete. For example, two tones may be provided, or the vibration may stop so that a left device ceases to vibrate, when the turn is complete.

The navigation instructions may be provided in various manners. For example, all instructions may be initially provided to the user and then updated or corrected as the user proceeds along the route. In some embodiments, instructions are provided as the user traverses the route. In some embodiments, navigation instructions may be provided using clock face directions, such as "turn to your 2 o'clock, proceed 20 yards, turn to your 11 o'clock, proceed 10 yards," or by providing direction information, such as "turn to your right, proceed 20 yards, turn to your left, proceed 5 yards," or the like. In various embodiments, navigation instructions may be provided via tones and/or vibrations. For example, the smart necklace 100 may vibrate and/or play a tone on the right to indicate a right turn. In various embodiments, the smart necklace 100 may vibrate and/or play a tone on the right to indicate a left turn. In these embodiments, the vibrations and/or tones may act like bumpers to keep the user on a desired path.

Different tones or patterns may also signify different degrees of turns, such as a specific tone for a 45 degree turn and a specific tone for a 90 degree turn. Alternatively or in addition to tones and vibrations, the smart necklace 100 may provide verbal cues, similar to a car GPS navigation command. High level alerts may also be provided through audio feedback. For example, as the smart necklace 100 reaches a predetermined distance—such as a foot or other value which may be stored in the memory 112 and may be adjusted—from an obstacle or hazard, the speaker 132 and/or the vibration unit 133 may provide audible alerts. As the smart necklace 100 gets closer to the obstacle, the audible alerts and/or vibrations may increase in intensity or frequency.

In block 1420, it is determined whether the smart necklace 100 is at the desired object, person or place. This may be determined by comparing detected location data, positioning data and image data to data stored in the memory 112. If the detected data matches the data stored in the memory, the processor 111 may determine that the smart necklace 100 is at the desired object, person or place.

In block 1422, if the processor 111 has determined that the smart necklace 100 is at the desired object, person or place, then the smart necklace 100 may alert the user via the interface array 130. For example, the smart necklace 100 may output audio that says "arrived at Macy's." In various embodiments, the smart necklace 100 may output a special vibration pattern and/or tone to indicate that the user has arrived at the desired object, person or place.

In block 1424, it is determined whether the user is still on the navigation route. If the user is still on the navigation route, then the process may return to block 1418. If the user is not still on the navigation path, then the process may return to block 1416 where new navigation instructions between the smart necklace 100 and the desired object, person or place may be determined.

While navigating the user to the desired object, person or place, the processor 111 may determine obstacles in the path of the user. The processor 111 may use positioning data to determine the path of the user and image data and/or positioning data and map data to determine the obstacle. The processor 111 may determine that an obstacle is in the path of the user by identifying an object based on image data and determining that the current path of the user will cause the user to collide with the obstacle. The processor 111 may also compare the current position and path of the user to map data. The map data may indicate an obstacle along the current path.

In response, the smart necklace 100 may alert the user to these obstacles in the user's path and/or navigate the user around the obstacles. For example, the smart necklace 100 may provide information to the user if an obstacle is directly in front of the user within a predetermined distance, such as 6 feet. The smart necklace 100 may, in response to determining an obstacle within the predetermined distance of the user, provide output via the speaker 132 such as "obstacle directly ahead 4 feet." In various embodiments, the navigation instructions may be altered so that the navigation instructions direct the user around the obstacle. In various embodiments, a particular tone and/or vibration pattern may be provided to the user indicating the obstacle.

Figure 15:
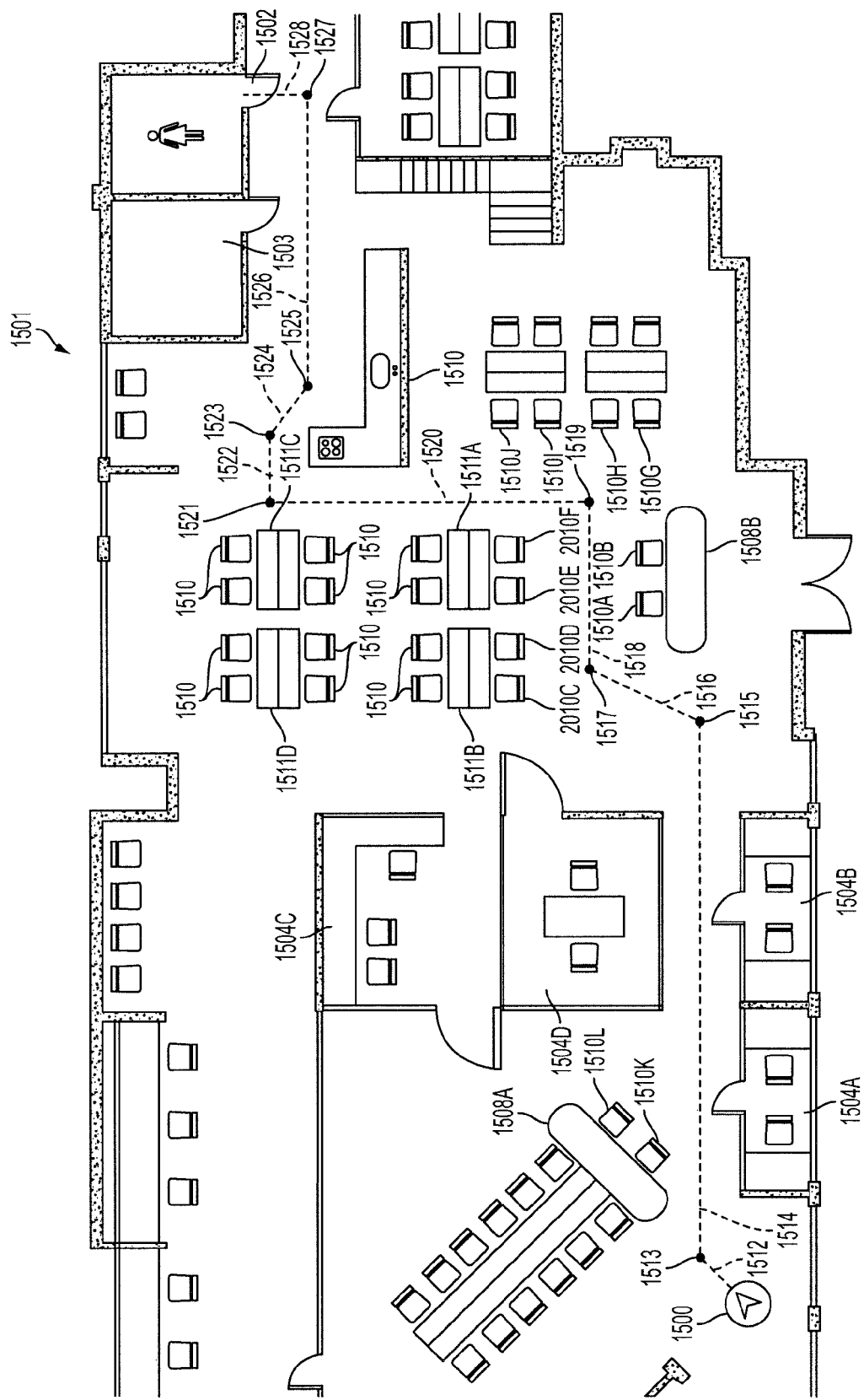
FIG. 15 illustrates an exemplary implementation of the method of FIG. 14 according to an embodiment of the present invention.

FIG. 15 illustrates an exemplary implementation of the method 1400. In FIG. 15, a user using a smart device, such as the smart necklace 100, is in a room 1501. While the user is at a location 1500, the user may select the find mode and request navigation instructions to the women's restroom. The smart necklace 100 may load a map of the room 1501 into the memory 112 such that it is accessible by the processor 111. The map may include various levels of detail. For example, the map may include the location of restrooms, sub-rooms 1504, desks 1508 and 1511, chairs 1510 and the like. In various embodiments, the map may only include fixed structures such as the sub-rooms 1504 and the restrooms.

After accessing the map, the smart necklace 100 may determine the location of the women's restroom 1502 and the location of the smart necklace 100. The processor 111 may determine navigation instructions based on the location of the women's restroom 1502 and the location of the smart necklace 100. The smart necklace 100 may then proceed to provide navigation instructions to the user. In some embodiments, the smart necklace 100 may determine a route to the women's restroom 1502 that avoids known obstacles. The smart necklace 100 may alter these navigation instructions based on detected objects along the route. In some embodiments, the smart necklace 100 may instruct the user to simply walk towards the women's restroom 1502 and alert the user to obstacles along the way.

In FIG. 15, the smart necklace 100 is aware of the sub-rooms 1504 and the restrooms 1502 and 1503. As the user begins walking along path 1512, the smart necklace 100 may detect the table 1508A directly ahead of the user. The smart necklace 100 may instruct the user to turn to the right so that the user walks along path 1514. When the user reaches position 1515, the smart necklace 100 may detect the table 1508B. In response, the smart necklace 100 may instruct the user to turn left and walk along path 1516. When the user reaches position 1517, the smart necklace 100 may detect the chairs 1510C, 1510D, 1510A, 1510B, 1510E and 1510F. In response, the smart necklace 100 may instruct the user to turn right and walk along path 1518. When the user reaches position 1519, the smart necklace may detect the chairs 1510G, 1510H, 15101, and 1510J and instruct the user to turn left and follow path 1520.

When the user reaches position 1521, the smart necklace 100 may determine that the user should turn right in order to reach the women's restroom 1502. In response, the smart necklace 100 may instruct the user to turn right and follow path 1522. When the smart necklace 100 reaches position 1523, it may instruct the user to turn right and follow path 1524.

When the user reaches position 1525, the smart necklace 100 may instruct the user to turn left and follow path 1526. When the user reaches position 1527, the smart necklace 100 may determine that the door to the women's restroom 1502 is positioned directly to the left of the user. In response, the smart necklace 100 may instruct the user to follow path 1528 and inform the user that the door to the women's restroom 1502 is immediately ahead of the user.

Figure 16:
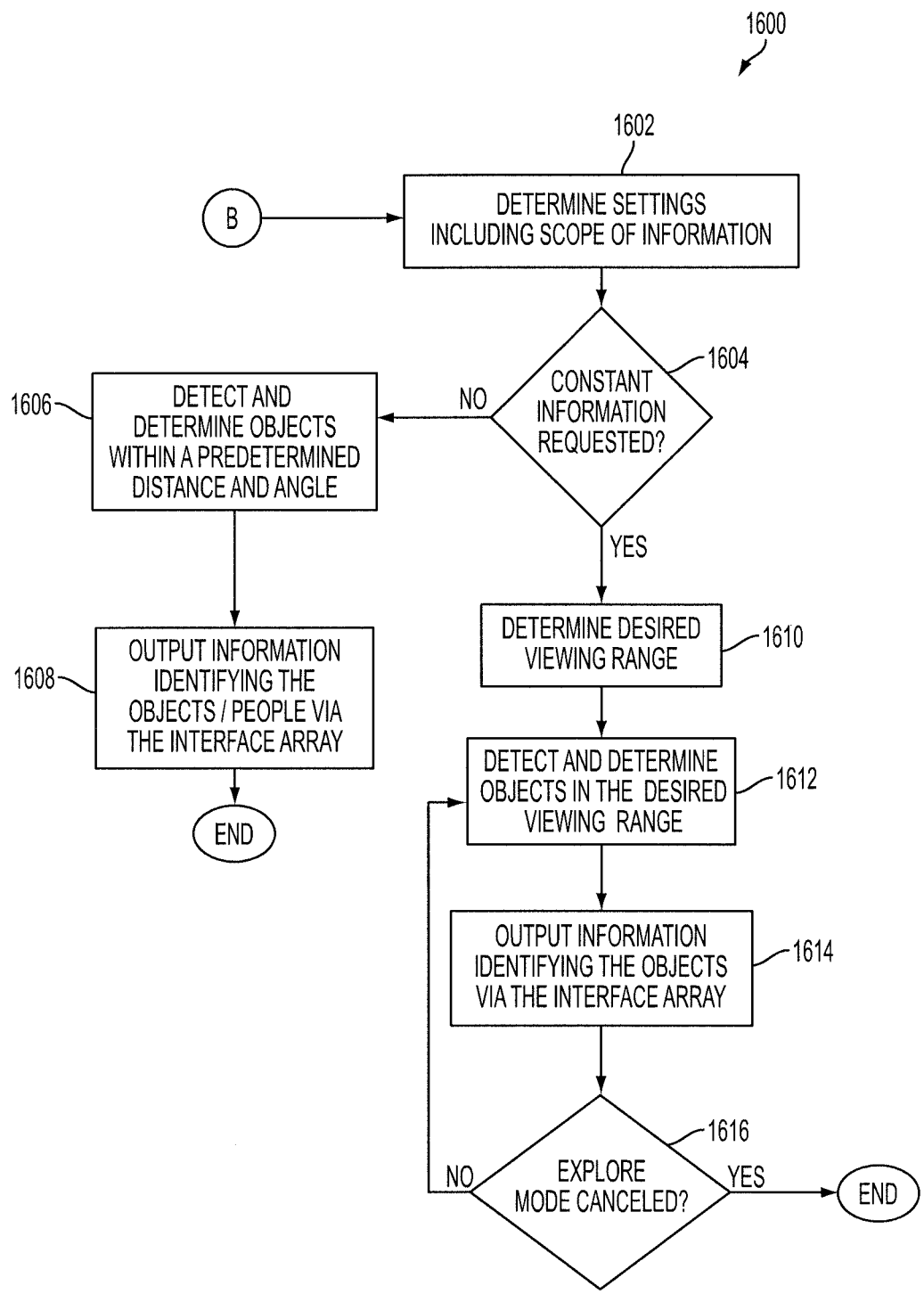
FIG. 16 illustrates a method to be performed if a selected mode of a smart device is an explore mode according to an embodiment of the present invention.

FIG. 16 illustrates a method 1600 to be performed when a smart device, such as the smart necklace 100, is in the explore mode. The method 1600 may be performed by the explore module 162.

In block 1602, the processor 111 may determine settings of the smart necklace 100. These settings may be stored in the memory 112 and will be discussed with reference to FIG. 22. The data within the settings discussed with reference to FIG. 22 may be applicable to any methods performed by the device. The settings determined by the processor 111 may include a granularity (i.e., scope of information) setting. The scope of information setting may determine an amount of granularity that the smart necklace 100 will provide to the user. For example, the user may desire to only receive information associated with large and/or important objects, may desire to receive information associated with any and all objects, or anywhere in between the two.

In block 1604, it is determined whether constant information is requested by the user. In various embodiments, the user may verbally say whether constant information is desired. This audio information may be detected by the microphone 131 such that the processor 111 can determine the desires of the user. In various embodiments, the input device 134, such as a button, may be depressed and released instantly to indicate that constant information is or is not requested and may be depressed and held to indicate the other. In various embodiments, a single click may indicate one constant information or not and a double click may indicate otherwise.

In block 1606, if it is determined that constant information is not requested, the smart necklace 100 may detect objects and/or people within a pre-determined distance and angle of the smart device. The objects and/or people may be detected by the camera 122 and/or the pair of stereo cameras 121. For example, the pre-determined distance may be 15 feet and the pre-determined angle may be 20 degrees, such that data is detected within a 20 degree view and 15 feet distance of the smart necklace 100. The predetermined distance and angle may be preloaded in the smart necklace 100 or may be a preference that the user can set. By limiting the detected objects to this predetermined distance and angle, objects may be detected within an optimal viewing range. Some distances, such as beyond 30 feet, may not be of significant importance to a blind user. Similarly, objects very far on either side of the user may not be of significant importance. By limiting the viewing range, the user may receive the more important information.

After detecting the objects within the pre-determined distance and angle, the processor 111 may compare the detected objects to image data in the memory 112 in order to identify the detected objects. The smart necklace 100 may compare the detected objects to image data from various sources. In various embodiments, the smart necklace 100 may compare a detected person to images of Facebook friends of the user to identify the detected person. In various embodiments, the smart necklace 100 may compare a detected object to objects on the internet to identify the object.

After detecting and identifying the objects and/or people within the pre-determined distance and angle, information identifying the objects and/or people is provided to the user via the interface array 130. The information provided to the user may include the name of the object and/or person, the direction of the object and/or person and/or the distance to the object and/or person. The information may vary based on the scope of information setting. For example, if the scope of information setting is highly detailed, then a lot of detailed information may be provided to the user. This detailed information may include the name of the objects and/or people and descriptions of the objects and/or people. For example, the smart necklace 100 may provide output saying "blond female 8 feet ahead at your 11 o'clock, 3 foot high table 7 feet ahead at your 12 o'clock and 3 foot diameter trash can at your 1 o'clock." If the scope of information setting is low, then the smart necklace 100 may only provide the name of the object and/or people and may or may not include direction and distance information. For example, the smart necklace 100 may provide output such as (person, desk, trash can) to indicate that within the viewing angle and from left to right is a person, a desk and a trash can.

The smart necklace 100 may be able to determine preferences of the user. For example, the user may wish to know about certain items only, such as large, bulky items and people. This may also be set within the scope of information setting. In this example, the smart necklace 100 may simply inform the user of the person and the desk and not of the trash can.

If constant information is requested in block 1604, the processor 111 may determine a desired viewing range in block 1610. The viewing range may be pre-determined or it may be selected by the user. The user may say, for example, "what is to my sides," or "what is directly ahead." In various embodiments, the user may simply single click a button to indicate that he wishes to know what is to his sides or directly ahead and may double click to indicate the other selection.

In block 1612, the smart necklace 100 may detect and identify objects and/or people within the desired viewing range. The desired viewing range may include a pre-determined distance and angle, such as in block 1606, or a user determined distance and angle.

In block 1614, information is output by the smart necklace 100 that identifies the objects and/or people via the interface array. Output determined in block 1614 may be provided in the same manner as output determined within block 1608.

In block 1616, it is determined whether the explorer mode has been cancelled. There are various ways in which the explorer mode may be cancelled. The user may depress and release the corresponding button in order to cancel the explorer mode. Similarly, the user may say "cancel explorer mode." In some embodiments, beginning a new mode will cancel the explorer mode. In various embodiments, selecting a new mode will place the explorer mode on hold until the new mode is complete.

In block 1616, if the explorer mode has been cancelled, then the method 1600 ends. If explorer mode has not been cancelled, then the process returns to block 1612 where objects are detected and determined within the desired viewing range. In various embodiments, the method 1600 may be delayed a predetermined amount of time before the method 1600 returns to block 1612. This allows all of the objects identified in the first iteration of block 1612 to be identified and output to the user before the second iteration of block 1612. Additionally, a delay of a predetermined amount of time allows new objects to enter the area in which objects will be detected.

Figure 17:
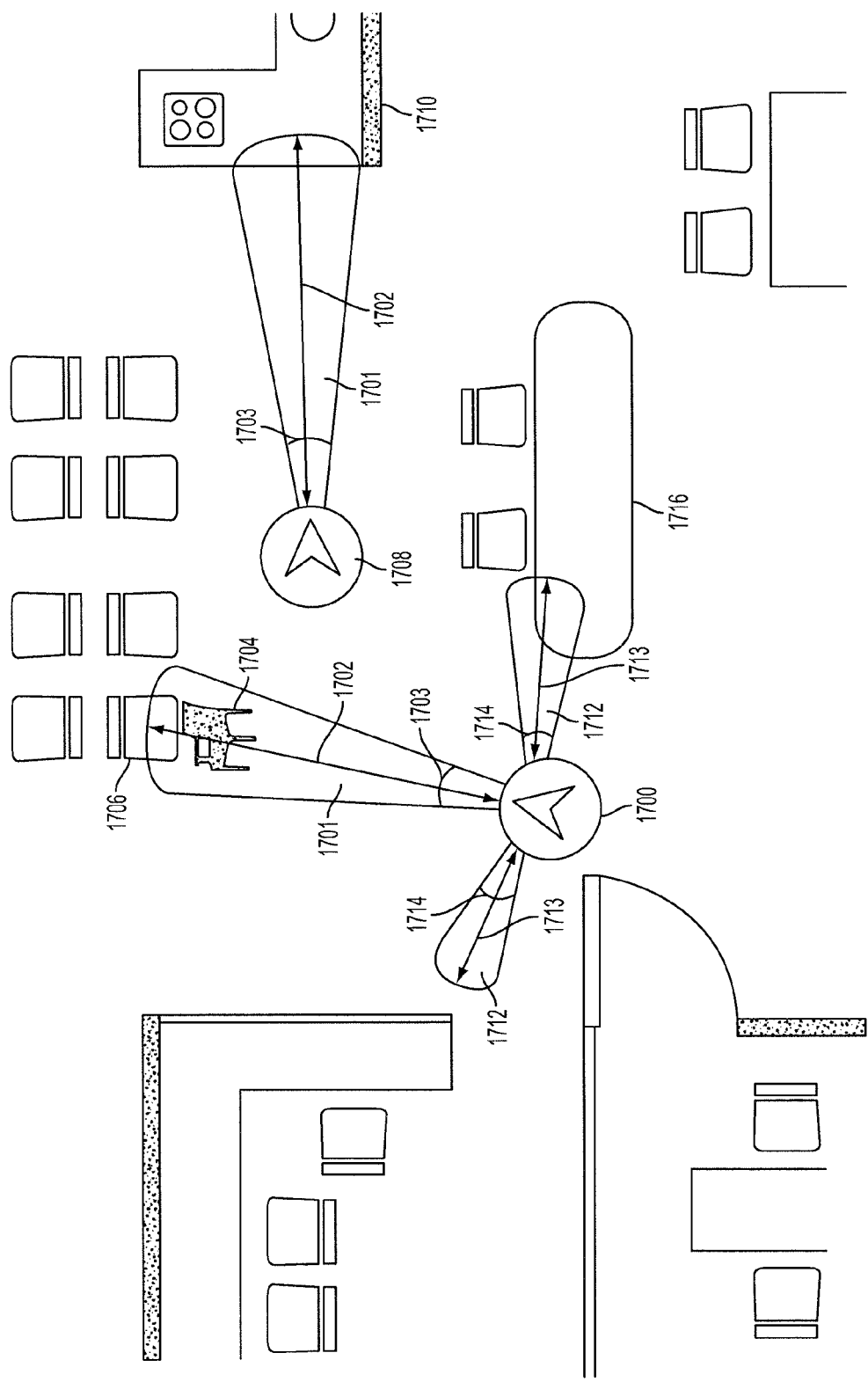
FIG. 17 illustrates an exemplary implementation of the method of FIG. 16 according to an embodiment of the present invention.

FIG. 17 illustrates two exemplary implementations of the method 1600. In FIG. 17, a user is at a location 1700. In a first implementation, the user may request non-constant information to the sides of the user. The smart necklace 100 may detect image data on both sides of the user within a pre-determined distance 1713 and a pre-determined angle 1714. An area 1711 indicates the viewing area to the right of the smart necklace 100 and an area 1712 indicates the viewing area on the left of the smart necklace 100. The smart necklace 100 may simply indicate that a table 1716 is present to the right of the user as the table 1716 is the only object within the area 1711 or 1712.

In the second implementation, the user may request constant information in front of the user. In this example, the smart necklace 100 may detect data within a pre-determined distance 1702 and a pre-determined angle 1703 of the smart necklace 100. This area relative to the smart necklace 100 may be represented by the area 1701. Within area 1701 is a chair 1704 and a desk 1706. The user may be walking as the smart necklace 100 is providing this data to the user. By the time the smart necklace 100 has indicate the presence of the chair 1704 and the desk 1706, the user may be at location 1708. In location 1708, the smart necklace 100 may again detect objects within the area 1701. At location 1708, a desk 1710 is detected within the area 1701. The smart necklace 100 may detect and identify the desk 1710 and inform the user of the presence of the desk 1710.

In various embodiments, while at location 1700, the smart necklace 100 may inform the user that the chair 1704 is a first distance away from the smart necklace 100 and the desk 1706 is a second distance from the smart necklace 100. In various embodiments, the smart necklace 100 may simply list the chair 1704 and the desk 1706 to indicate that the chair is closer to the smart necklace 100 then the desk 1706.

Figure 18:
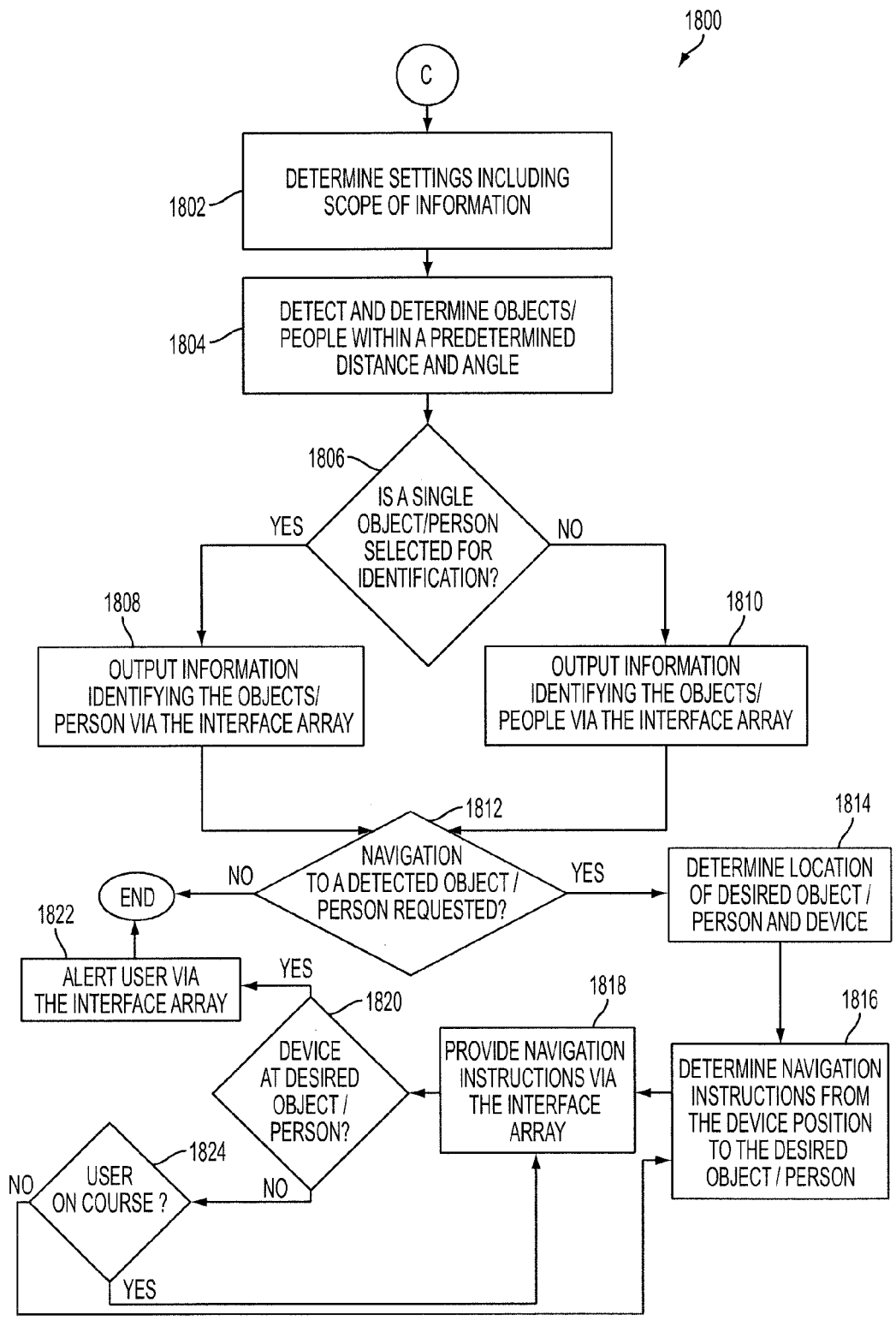
FIG. 18 illustrates a method to be performed if a selected mode of a smart device is a scan mode according to an embodiment of the present invention.

FIG. 18 illustrates a method 1800 to be performed when the selected mode is the scan mode. The method 1800 may be performed by a smart device, such as smart necklace 100. The method 1800 may be performed while the smart necklace 100 is in the scan mode and may be performed within the scan module 164 of the processor 111.

In block 1802, the processor 111 may determine settings of the smart necklace 100 by accessing the memory 112. The settings may include a scope of information setting which may include a desired granularity of information to be provided to the user.

In block 1804, the stereo camera 121 and/or the camera 122 may detect objects and/or people within a pre-determined distance and angle. The pre-determined distance and angle may be preset within the smart necklace 100 and/or may be selected by a user, such as within the settings. For example, the pre-determined distance may be 30 feet and the pre-determined angle may be greater than 90 degrees.

The stereo camera 121 and/or the camera 122 may provide the detected data to the processor 111. The processor 111 may then compare the image data to data in the memory 112 in order to identify objects and/or people within the image data. In various embodiments, positioning data from the GPS 124 and/or the IMU 123 may be detected and provided to the processor 111. The identification of objects may be based on the positioning data as well as the image data. For example, the processor 111 may determine a location based on the positioning data. The processor 111 may then compare the location to a memory to determine potential matches for the detected objects, and then verify the match based on the image data.

In block 1806, the processor 111 may determine whether a single object or person is selected for identification. This determination may be made based on user input. For example, the user may verbally say "who is this," or "what is this" to indicate that a single object or person has been selected for identification. The user may also verbally say "what is around me" to indicate that a single object or person is not selected for identification. In some embodiments, the user may depress and immediately release a button to indicate a desire to identify a single object or person and may depress and hold the button to indicate otherwise. In some embodiments, a single depression and release of the button may indicate one preference and a double click of the button may indicate the other.

In some embodiments, the processor 111 includes logic to determine whether a single object or person has been selected for identification based on image data. For example, if the stereo camera 121 and/or the camera 122 detect image data that includes a hand or hands of the user holding an object, the processor 111 may determine that the user wishes to identify the single object. Likewise, if the processor determines that a user is pointing at something or someone, the processor 111 may determine that the user wishes to identify that single object or person. Similarly, if a single large object or a person is detected immediately in front of the stereo camera 121 and/or camera 122, the processor may determine that the user wishes to identify the single object or person.

In block 1808, if a single object or person is selected for identification, the smart necklace 100 may provide information to the user via the interface array 130 that identifies the object or person.

In block 1810, if a single object or person is not selected for identification, then the smart necklace 100 may output information identifying the objects and/or people detected within the pre-determined distance and angle. The information provided by the smart necklace 100 may be limited based on the settings of the smart necklace 100. For example, if the scope of information setting is large, more information will be provided to the user than if the scope of information setting is small.

The information may be provided to the user in various manners. For example, the information may be provided to the user in a clock face manner. In this embodiment, the smart necklace 100 may output the name of the object and the clock face direction of the object, such as chair at your 10 o'clock. In various embodiments, the smart necklace 100 may also provide distance information to the objects and/or people. In various embodiments, the smart necklace 100 may list the objects and/or people in a particular order, such as left to right, right to left, closest to farthest, or farthest to closest.

In block 1812, it is determined whether navigation to a detected object and/or person is requested. The processor 111 may determine whether navigation is requested in multiple manners. In some embodiments, the user may state that he or she wants directions to a detected object and/or person. In some embodiments, the user may depress a button to request navigation to a detected object or person. For example, as the smart necklace 100 is outputting data identifying the objects and/or people, the user may press the scan button after hearing certain data to indicate that the user requests navigation to the previously outputted object or person. If navigation to the detected object or person is not requested, then the method 1800 may end.

If navigation to a detected object or person has been requested, the method may proceed to block 1814. In block 1814, the processor 111 may determine the location of the desired object or person on a map and/or relative to the smart necklace 100.

In block 1816, the processor 111 may determine navigation instructions from the smart necklace 100 to the desired object or person. The navigation instructions may be determined based on map data, image data detected by the stereo camera 121 and/or camera 122, positioning data detected by the IMU 123 and/or data detected by the GPS 124. In various embodiments, image data detected by the stereo camera 121 and/or the camera 122 may be positioning data as the processor 111 may determine a positioning of the smart necklace 100 based on a comparison of the image data to image data in memory. For example, a map in the memory 112 may include image data associated with various locations. The processor 111 may compare the detected image data to the stored image data to determine a location of the smart necklace 100. The smart necklace 100 may generate navigation instructions based on positioning on a map and/or the location of the desired object or person relative to the smart necklace 100.

In block 1818, the smart necklace 100 may provide navigation instructions to the user via the interface array 130. The navigation instructions may be provided in different manners as described above. The navigation instructions may be determined differently from above, as the desired object or person is within a detectable distance from the smart necklace 100. The navigation instructions may thus be more easily determined, as navigation instructions may be determined based on visual data from the stereo camera 121 and/or the camera 122. In various embodiments, the processor 111 may use map data and location data to determine navigation instructions.

In block 1820, it is determined whether the smart necklace 100 is at the desired object or person. If the smart necklace 100 is at the desired object or person, then the smart necklace 100 may alert the user to this via the interface array 130. If the device is not at the desired object or person, then the processor 111 may determine whether the user is on the determined navigation path in block 1824. If the user is not on the determined navigation path, then the method may return to block 1816 where new navigation instructions may be determined. If the user is on the determined navigational path, then the process may return to block 1818 where the navigation instructions may continue to be provided.

Figure 19:
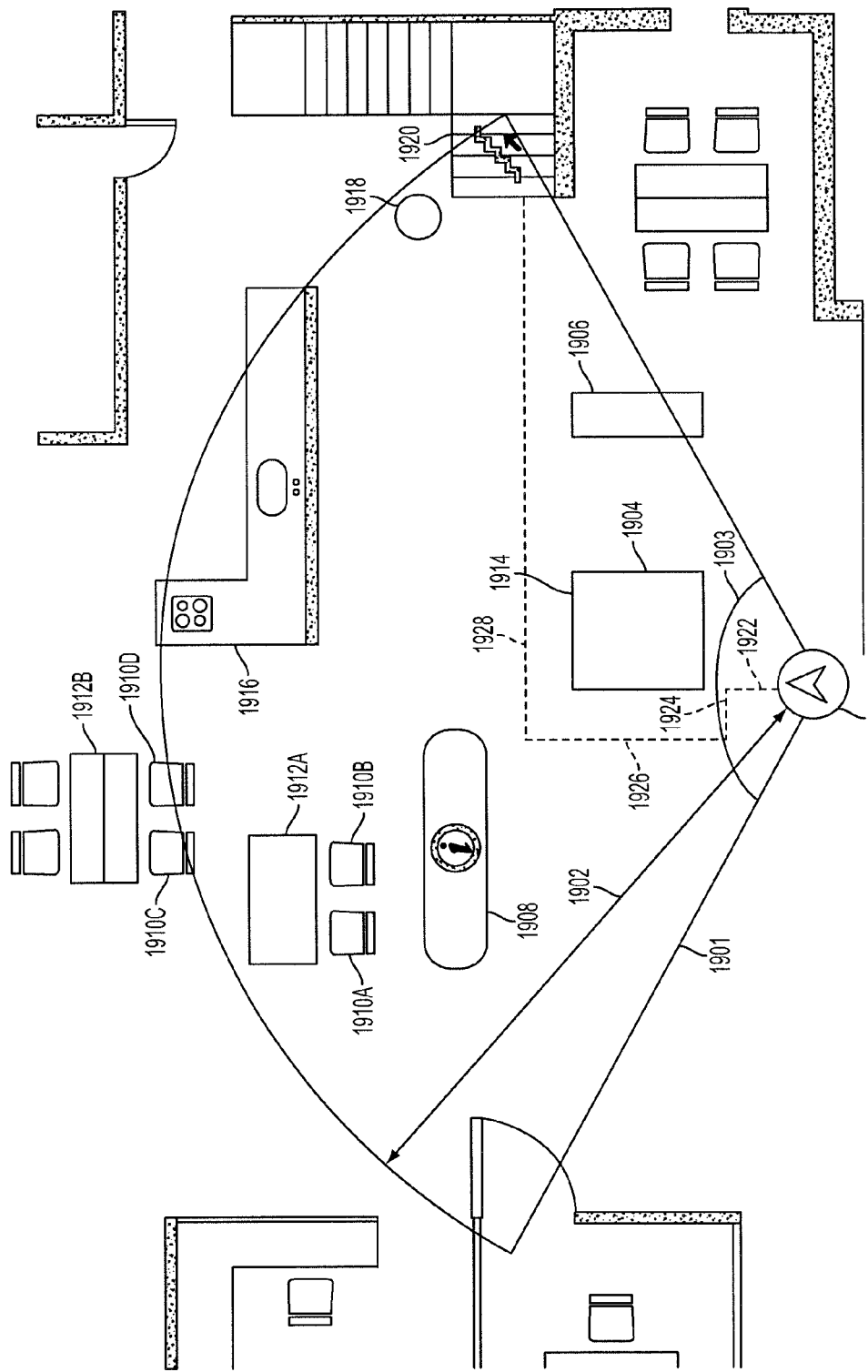
FIG. 19 illustrates an exemplary implementation of the method of FIG. 18 according to an embodiment of the present invention.

FIG. 19 illustrates an exemplary implementation of the method 1800. In FIG. 19, a user is wearing a smart device, such as the smart necklace 100. While the user is at location 1900, the user may select the scan mode. In the example illustrated in FIG. 19, a single object or person is not selected for identification. Therefore, the smart necklace 100 may detect and determine objects within a pre-determined distance 1902 and a pre-determined angle 1903 of the smart necklace 100. An area 1901 illustrates the area in which data will be detected and determined. Within the area 1901 is a table 1904, a table 1906, an information desk 1908, two chairs 1910, a desk 1912, an L-shaped desk 1916, a trash can 1918 and a staircase 1920. Depending on the scope of information setting of the smart necklace 100, the smart necklace 100 may provide identification data to the user for all or some of these objects within the area 1901. The smart necklace 100 may provide this information using a clock face type output, a direction type output, or an ordered output.

If the output is given in clock face format and the scope of information setting is medium, the smart necklace 100 may output, via the speakers 132, "information desk at your 11 o'clock, square desk at your 12:30, L-shaped desk at your 1 o'clock and staircase at your 2 o'clock." If the output is given in directional format and a low scope of information setting, the smart necklace 100 may output "information desk on the left and staircase on the right."

If the output is given in list format with a large scope of information setting, the smart necklace 100 may output "information desk, chair, chair, table, table, L-shaped table, table, trash can, stairs." This indicates that the information desk 1908 is the first item on the left side of the area 1901, that the two chairs 1910 are behind the information desk and the table 1912A is behind the chairs, that moving to the right is the table 1904, farther to the right is the L-shaped desk 1916, farther to the right is the table 1906, then the trash can 1918, then the staircase 1920. In some embodiments, the smart necklace may also output the distance to each object within the area 1901.

Figure 20:
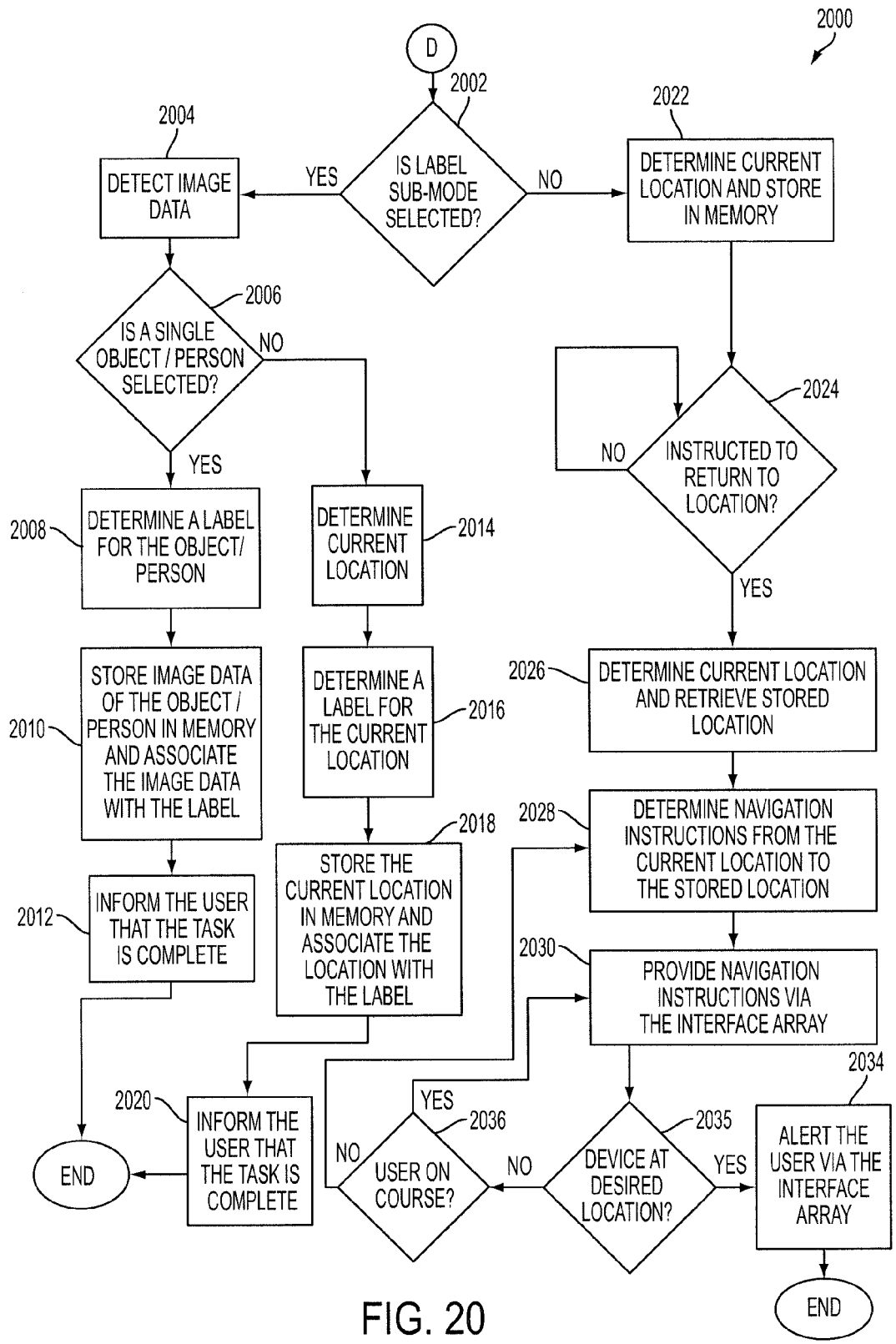
FIG. 20 illustrates a method to be performed if a selected mode of a smart device is a capture mode according to an embodiment of the present invention.

FIG. 20 illustrates a method 2000 to be performed when the capture mode is selected. The method 2000 may be performed by a smart device, such as the smart necklace 100. The method 2000 may be performed within the capture module 166. While in the capture mode, the smart necklace 100 may permanently label a person, location or object or may temporarily remember a person, location or object.

In block 2002, it is determined whether the label sub-mode is selected. This may be determined by the processor 111 in a variety of manners. For example, a user may say "this is Mary," "this is my work," "this is a cup," or the like. In some embodiments, a single click of a button may indicate the label sub-mode and a double click may indicate otherwise. In some embodiments, a depression and release of the button may indicate a label sub-mode and a longer depression may indicate otherwise.

In block 2004, if the label sub-mode is selected, the stereo camera 121 and/or the camera 122 may detect image data.

In block 2006, the processor 111 may receive the image data and determine whether a single object or person is selected. This determination may be made based on the image data. For example, if the user is pointing at a person or holding an object, the processor 111 may determine that the object or person is selected for labeling. Similarly, if a single object or person is in the field of view of the stereo camera 121 and/or the camera 122, the processor 111 may determine that that object or person has been selected for labeling. In some embodiments, the processor 111 may determine what is to be labeled based on the user's verbal commands. For example, if the verbal command includes the name of an object that the processor 111 has identified, the processor 111 may know that the label is for that object. If the label includes a human name, the processor 111 may determine that a human is to be labeled. Otherwise, the processor 111 may determine that the current location is to be labeled. Additionally, if the user states the name of a location, such as "my workplace," the processor 111 may determine that the location is selected for labeling.

In block 2008, the processor 111 may determine a label for the object or person. The user may input the label via the input device 134 or by speaking the label such that the smart necklace 100 detects the label via the microphone 131.

In block 2010, the processor 111 may store the image data associated with the object or person and the memory 112. The processor 111 may also store the label in the memory 112 and associate the label with the image data. In this way, image data associated with the object or person may be easily recalled from the memory 112 because it is associated with the label.

In block 2012, the smart necklace 100 may inform the user via the interface array 130 that the task is complete. For example, audio may be played over the speaker 132 such as "the label is stored." In various embodiments, a particular set of vibrations and/or a particular tone or tones may be provided to the user to inform the user that the task is complete.

If it is determined in block 2006 that a single object or person is not selected, the smart necklace 100 may determine the current location of the smart necklace 100 in block 2014. The location may be determined using data from the sensor array 120, such as visual data from the stereo camera 121 and/or the camera 122, the IMU 123, the GPS 124 and/or the sensor 125.

In block 2016, the processor 111 may determine a label for the current location. The label may be provided by the user via the input device 134 and/or the microphone 131.

In block 2018, the processor 111 may store the current position and the label in the memory 112. The processor 111 may also associate the location with the label such that the location information may be retrieved from the memory 112 using the label. In some embodiments, the location may be stored on a map.

In block 2020, the smart necklace 100 may inform the user that the task is complete in the same manner as in block 2012.

If it is determined in block 2002 that the label sub-mode is not selected, then the processor 111 may determine the current location using data from the sensor array 120 in block 2022. The processor 111 may also store the current location in the memory 112 such that it can be retrieved at a later time. The current location may be stored in map data of the memory 112. In various embodiments, the present location is determined based on image data alone or a combination of image data and data from the IMU 123.

In various embodiments and as the smart necklace 100 changes location, data may be continuously or periodically stored in the memory 112 as the smart necklace 100 changes location. This data may be retrieved at a later time and used to provide directions from a later location of the smart necklace 100 to the stored location of the smart necklace 100.

In block 2024, the processor 111 determines whether the smart necklace 100 has been instructed to return to the location stored in memory. In some embodiments, a user may depress the button to instruct the smart necklace 100 to return to the position. In some embodiments, the user may say a command such as "take me back" to indicate a desire to return to the previous location.

In block 2026, if the smart necklace 100 has been instructed to return to the previous location, the processor 111 may determine the current location of the smart necklace 100 using data provided from the sensor array 120. The processor 111 may also retrieve the information associated with the stored location from the memory 112.

In block 2028, the processor 111 may compare the current location to the stored location and determine navigation instructions from the current location to the stored location. The processor may use a map and/or data from the sensor array 120 to determine the navigation instructions. In various embodiments, the processor 111 may determine the navigation instructions based on a single type of data, such as positioning data or image data. For example, the processor 111 may receive image data from the start of block 2022. This image data may be stored such that the processor may later compare newly detected image data to the stored image data in order to determine directions to the stored location.

In block 2030, the smart necklace 100 may provide the navigation instructions via the interface array 130. The instructions may be provided using clock face descriptions, directional instructions, tones from the speakers 132 and/or vibrations from the vibration unit 133.

In block 2032, the processor 111 may compare the current location of the smart necklace 100 to the previous location stored in memory. If the processor 111 determines that the smart necklace 100 is at the desired location, then the smart necklace 100 may alert the user via the interface array 130.

In block 2036, the processor 111 may determine whether the user is on the determined navigation path. If the user is on the determined navigation path, the process may return to block 2030 where navigation instructions will continue to be provided to the user. If the user is not on the determined navigation path, the process may return to block 2028 where navigation instructions will again be determined from the current location of the smart necklace 100 to the stored location.

Figure 21:
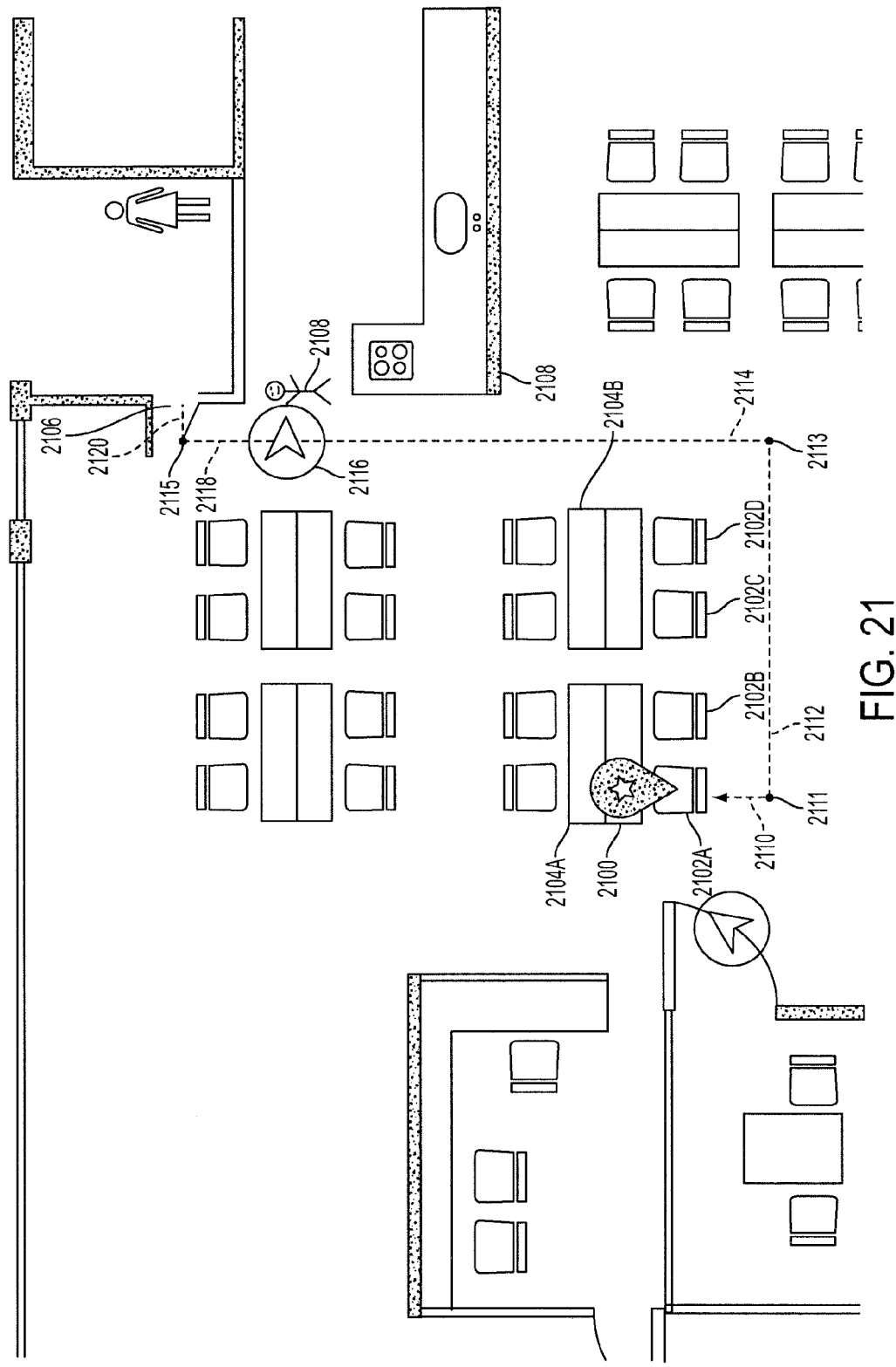
FIG. 21 illustrates an exemplary implementation of the method of FIG. 20 according to an embodiment of the present invention.

FIG. 21 illustrates an exemplary implementation of the method 1400 and two exemplary implementations of the method 2000. In FIG. 21, a user of a smart device such as the smart necklace 100 may initially be sitting in a chair 2102A. The user may desire to go to the women's restroom 2106. The user may first select the capture mode to temporarily store the location 2100 which is the location of the chair 2102A. The user may indicate a temporary location save by single clicking the capture button. The user may then select the find mode by depressing the find button and informing the smart necklace 100 that she wishes to go to the women's restroom 2106.

The processor 111 may then determine the location of the women's restroom 2106 relative to the smart necklace 100 at location 2100. The processor 111 may then determine navigation instructions from the location 2100 to the women's restroom 2106. The navigation route is indicated by paths 2110, 2112, 2114, and 2118.

As the user is walking along path 2114, the user may hear the voice of a person 2108. The user may then stop at a position 2116 near the person 2108 in order to talk to the person 2108. The user may desire that the smart necklace 100 label the person 2108. The user may then select the capture mode again and indicate that a label sub-mode is selected by depressing and holding the capture button. The processor 111 may then determine that the person 2108 is to be labeled. The user may say "this is Tom." The processor may then store image data associated with the person 2108 and the label Tom and associate the label with the image data. The user may then continue walking along path 2114 to indicate to the smart necklace 100 that the user wishes to continue the navigation instructions. In some embodiments, the user may depress the find button once to pause the navigation and depress the find button again to continue the navigation.

When the user is ready to return to the location 2100, the user may again select the capture mode. For example, the user may depress the capture button to indicate a desire to return to the stored location. In some embodiments, the user may speak a command, such as "return to previous location," to indicate a desire to return to the stored location. The smart necklace may then retrieve the stored location and determine navigation instructions from the current location of the smart necklace 100 (the women's restroom 2106) to the stored location 2100. The smart necklace 100 may then provide navigation instructions to the user such that the user can return to the location 2100 by following the directions.

Figure 22:
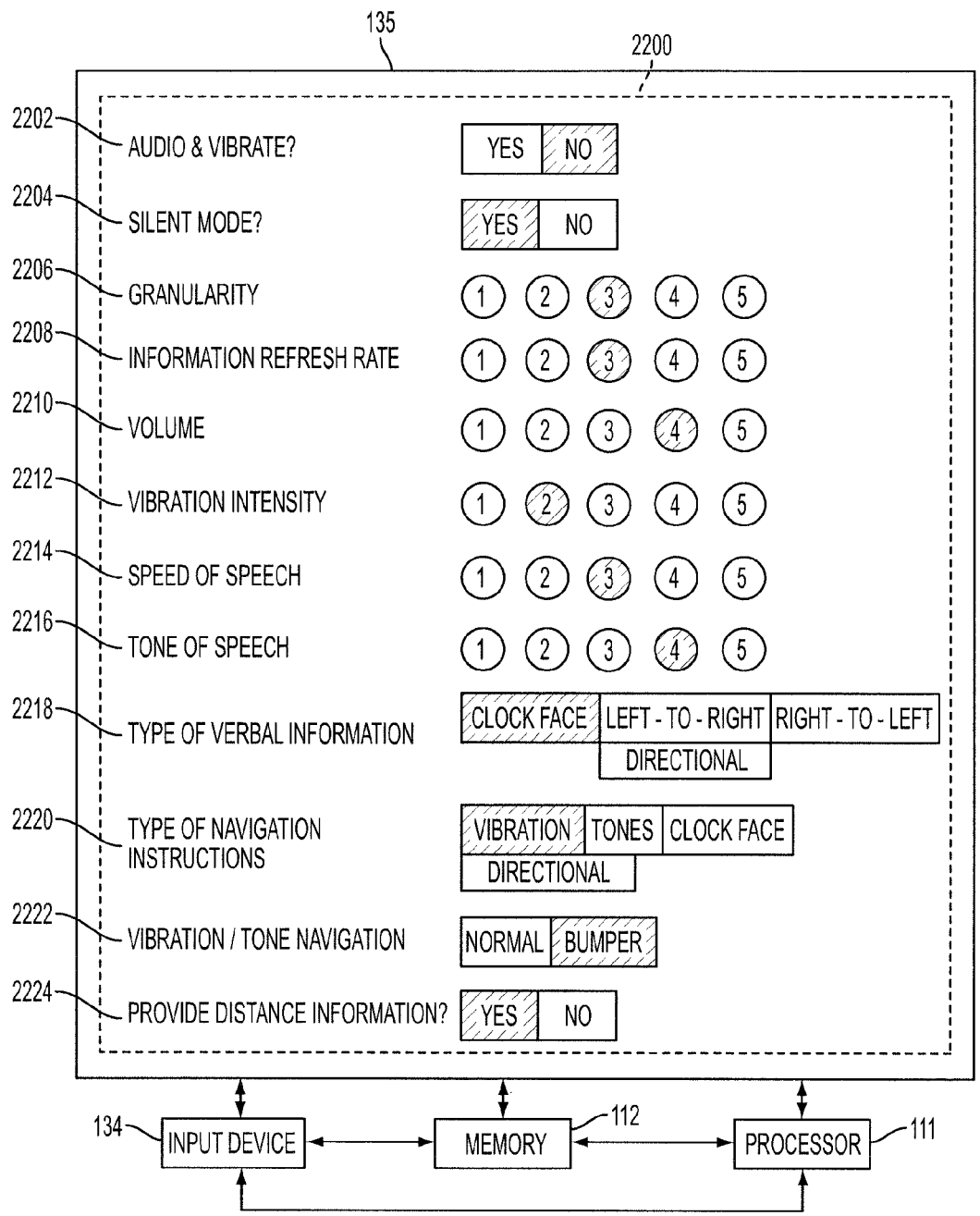
FIG. 22 illustrates a graphical user interface displayed on a display of a smart device that illustrates various settings of the smart device according to an embodiment of the present invention.

FIG. 22 illustrates a graphical user interface (GUI) 2200 displayed on the display 135 that illustrates various settings of a smart device such as the smart necklace 100. The values for the settings are exemplary only, and one skilled in the art will realize that the selectable values may be more or less inclusive than shown in FIG. 22. GUI 2200 is meant to be exemplary only and one skilled in the art will understand that the GUI 2200 may have a totally different look. In various embodiments, the settings are not displayed on a display and are simply stored in the memory 112. Various embodiments of the settings may include all or some of these setting, as well as additional settings not illustrated in FIG. 22. Additionally, some or all of these settings may or may not be selectable by a user of the smart necklace 100.

The display 135 is connected to the processor 111 such that the processor 111 may provide the data to be displayed. The current settings of the smart necklace 100 may be displayed in the GUI 2200. A user may change some or all of these settings using the input device 134 and/or voice commands. When a setting is changed, the new setting may be stored in the memory 112 and implemented by the processor 111. In some embodiments, the processor 111 may learn user preferences over a period of time. For example, if a user always selects silent mode for a particular location, the smart necklace 100 may automatically place the smart necklace 100 in silent mode in response to arriving at the particular location.

The GUI 2200 may include an audio and vibrate setting 2202. The audio and vibrate setting may indicate that the user wishes to receive both audio and haptic feedback. For example, during navigation instructions, the navigation instructions may be provided using a combination of audio and haptic cues. Similarly, audio and haptic feedback may be provided to the user in any mode of the smart necklace 100.

The GUI 2200 also includes a silent mode setting 2204. When the smart necklace 100 is in the silent mode, only haptic feedback will be provided to the user. This may be preferred if the user is in a large group setting and does not want audio feedback from the smart necklace 100 to disturb others.

The GUI 2200 also includes a granularity setting 2206. The granularity setting 2206 can be used to set the desired scope of information. When the granularity setting 2206 is set to a higher value, such as five, more detail may be provided to the user about more objects. When the granularity setting 2206 is low, such as 1, fewer details may be provided about fewer objects.

Also included is an information refresh rate setting 2208. The information refresh rate setting 2208 may indicate how often the user desires to receive new information. For example, if the user is receiving navigation instructions and the refresh rate is high, instructions may be provided to the user at a higher rate, such as every 10 seconds instead of every 30 seconds. The information refresh rate may also be used in the explorer mode. For example, if the information refresh rate is low while the user is in a constant information scan mode, the smart necklace 100 may only provide new object recognition information to the user at a slower rate than if the refresh rate were higher.

The GUI 2200 also includes a volume setting 2210. The volume setting 2210 may indicate a volume at which audio data will be provided.

Another available setting is a vibration intensity setting 2212. The vibration intensity setting 2212 may indicate a desired intensity of vibrations to be provided via the vibration unit 133.

Also included is a speed of speech setting 2214. Some users may desire to receive speech at a faster rate than other users. For example, blind users place more importance upon sounds than non-blind users, so a blind user may be able to hear and interpret speech faster than other users.

The GUI 2200 also includes a tone of speech setting 2210. Some users may be more comfortable with certain tones of voice while other users are more comfortable with other tones of voice. The tone of speech setting 2216 allows the user to change the tone of the speech to better suit his desires.

The GUI 2200 also includes a type of verbal information setting 2218. The type of verbal information setting 2218 may include a clock face type, a left to right type, a right to left type and a directional type.

The GUI 2200 may also include a type of navigation instructions setting 2230. The type of navigation instructions setting 2230 may include vibration type, tones type, clock face type and directional. In some embodiments, more than one type of navigation instructions may be selected, such as vibration and directional. If the vibration type is selected, navigation instructions may be provided via vibrations from the vibration unit 133. If the tones type is selected, the smart necklace 100 may provide navigation instructions using certain tones or combination of tones. If the clock face type is selected, the smart necklace 100 may provide navigation instructions using clock face directions, such as (proceed 10 feet and turn to your 2 o'clock, proceed 10 feet and turn to your 3 o'clock.) If the directional type is selected, the smart necklace may provide directional navigation instructions, such as (walk 20 feet and turn right, walk 10 feet and turn left.)

Also included in the settings is a vibration/tone navigation setting 2232. The vibration/tone navigation setting 2232 may include a normal type and a bumper type. If the normal type is selected, a vibration and/or tone may be played on the side to which the user should turn. If the bumper type is selected, a vibration and/or tone may be played on the side to which the user should turn away from.

The GUI 2200 may also include a provide distance information setting 2234. If yes is selected, the smart necklace 100 may provide distance information to the user. This distance information may be provided in any mode of the smart necklace 100.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for providing directions to a blind user of an electronic device, the directions being from a current location of the electronic device to a location of a desired object or a desired location, the method comprising:
   detecting, by a camera and an inertial measurement unit and in response to a selection of a find mode of the electronic device, image data corresponding to a surrounding environment of the electronic device and inertial measurement data corresponding to a movement of the electronic device, respectively;
   receiving, by an input device, user input including an identifier of the desired object or the desired location and additional input corresponding to a desired output;
   determining, by a processor, whether the desired output includes navigation instructions from the current location of the electronic device to the desired object or the desired location, or a relative location of the desired object or the desired location from the current location of the electronic device based on the additional input corresponding to the desired output;
   storing, in a memory, map data corresponding to an environment of the electronic device;
   determining, by a processor, at least one of a current location of the electronic device or a current location of the desired object or the desired location based on the image data;
   determining, by the processor, the navigation instructions from the current location of the electronic device to the desired object or the desired location based on the map data and the determined at least one of the current location of the electronic device or the current location of the desired object or the desired location;
   determining, by the processor, movement of the electronic device based on the inertial measurement data;
   updating, by the processor, the navigation instructions based on the movement of the electronic device;
   determining, by the processor, the relative location of the desired object or the desired location by comparing the current location of the electronic device to the location of the desired object or the desired location;
   providing, by an output device, the navigation instructions when the desired output includes the navigation instructions; and
   providing, by the output device, the relative location of the desired object or the desired location when the desired output includes the relative location.

2. The method of claim 1 further comprising generating, by the processor, the map data based on the image data and the inertial measurement data.

3. The method of claim 1 further comprising:
   determining, by the processor, that the desired object or the desired location fails to match data stored in the memory;
   requesting, by the processor, additional data identifying the desired object or the desired location from the blind user; and
   determining, by the processor, the navigation instructions to the desired object based on the current location of the electronic device, the map data, and the additional data identifying the desired object or the desired location.

4. The method of claim 1 wherein the output device includes a first vibration unit positioned on a first side of the electronic device and a second vibration unit positioned on a second side of the electronic device, and the directions include vibrational patterns output from the first vibration unit and the second vibration unit.

5. The method of claim 1 wherein the output device includes a speaker and the directions are provided by the speaker as speech.

6. The method of claim 1 further comprising determining, by the processor, that an obstacle exists in a current path of the electronic device based on the image data and wherein updating the navigation instructions further includes determining alternative routes that cause the blind user to avoid the obstacle.

7. A method for describing at least one object or person within a predetermined distance and angle of an electronic device, the method comprising:
   storing, in a memory, stored image data associated with a plurality of stored objects and people and a plurality of identifiers such that each identifier is associated with a stored object or person;
   receiving, by an input device, input data including a selection of identification of a single object or person within the predetermined distance and angle of the electronic device or a selection of identification of multiple objects or people within the predetermined distance and angle of the electronic device;
   receiving, by the input device, a granularity setting of the electronic device;
   detecting, by a camera and in response to a selection of an explore mode or a scan mode of the electronic device, detected image data corresponding to at least one object or person at a single point in time;
   determining, by a processor and when the input data includes the selection of the identification of the single object or person, the single object or person to be identified and a single identifier from the plurality of identifiers corresponding to the single object or person within the predetermined distance and angle of the camera based on the detected image data and the stored image data;
   outputting, via a speaker, the single identifier;
   determining, by the processor and when the input data includes the selection of identification of multiple objects or people, multiple identifiers from the plurality of identifiers including a first identifier corresponding to a first object or person of the multiple objects or people, a second identifier corresponding to a second object or person of the multiple objects or people, and a third identifier corresponding to a third object or person of the multiple objects or people, the first object, the second object, and the third object being detected at the single point in time within the predetermined distance and angle of the camera based on the detected image data and the stored image data; and
   outputting, via the speaker, the first identifier and the second identifier only when the granularity setting is a first setting, and the first identifier, the second identifier, and the third identifier when the granularity setting is a second setting indicating a greater granularity than the first setting.

8. The method of claim 7 wherein the predetermined distance and angle of the camera is less than a field of view of the camera.

9. The method of claim 7 wherein the input device includes the camera and receiving the input data that includes the selection of the identification of the single object or person includes receiving a user gesture indicating that the single object or person is selected for identification.

10. The method of claim 7 wherein:
outputting the first identifier, the second identifier, and the third identifier in an order that is based on a directional order of the first object or person, the second object or person and the third object or person.

11. The method of claim 7 wherein the camera includes a pair of stereo cameras, the detected image data includes depth information, and outputting the single identifier further includes outputting the depth information.

12. The method of claim 7 further comprising:
receiving, at the processor, a request for directions to the single object or person;
determining, by the processor, directions from a current location of the electronic device to a location of the single object or person; and
outputting, via the speaker, the directions.

13. The method of claim 7 wherein the predetermined distance and the predetermined angle vary based on whether the explore mode or the scan mode were selected.

14. A method for storing a first location of an electronic device and providing directions to a blind user from a second location of the electronic device to the first location of the electronic device, the method comprising:
determining, by a processor, whether a label mode is selected or whether a temporary location store mode is selected;
detecting, by a positioning sensor, a first positioning data corresponding to the first location of the electronic device and a second positioning data corresponding to the second location of the electronic device;
storing, in a memory and in response to a first depression of a capture button of the electronic device when the temporary location store mode is selected, the first positioning data on a map;
detecting, by the positioning sensor, additional positioning data as the electronic device moves from the first location towards the second location;
determining, by the processor and in response to a second depression of the capture button of the electronic device when the temporary location store mode is selected, directions to the first location from the second location based on the first positioning data, the second positioning data, and the additional positioning data;
providing, by an output device, the directions in response to the second depression of the capture button of the electronic device when the temporary location store mode is selected;
detecting, by the positioning sensor or a camera, additional data corresponding to a location, object, or person;
determining, by the processor and in response to a third depression the capture button when the label mode is selected, a label corresponding to the location, object, or person;
storing, in the memory, the additional data and the label corresponding to the location, object, or person; and
associating, in the memory, the additional data with the label.

15. The method of claim 14 further comprising detecting, by the camera and in response to the second depression of the capture button, image data corresponding to an environment of the user and wherein determining the directions includes determining the directions based on the image data.

16. The method of claim 15 wherein determining the directions includes:
determining a route between the first location and the second location;
determining an obstacle along the route based on the image data; and
determining an alternate route based on the obstacle.

17. A method for describing at least one object or person within a predetermined distance and angle of an electronic device to a blind user of the electronic device, the method comprising:
storing, in a memory, stored image data associated with a plurality of stored objects and people and a plurality of identifiers such that each identifier is associated with a stored object or person;
detecting, by a camera and in response to a selection of an explore mode or a scan mode of the electronic device, detected image data corresponding to the at least one object or person;
determining, by a processor, at least a first identifier from the plurality of identifiers corresponding to the at least one object or person within the predetermined distance and angle of the camera based on the detected image data and the stored image data;
outputting, via a speaker, the at least first identifier;
determining, by the processor and in response to the selection of the explore mode, if the explore mode has been canceled;
detecting, by the camera and in response to the explore mode not being canceled, a second image data of at least another object or person after a predetermined period of time;
determining by the processor, at least a second identifier from the plurality of identifiers corresponding to the at least another object or person within the predetermined distance and angle of the camera based on the second image data and the stored image data; and
outputting, via the speaker, the at least second identifier.

* * * * *